US008886497B1

(12) United States Patent
Vold

(10) Patent No.: US 8,886,497 B1
(45) Date of Patent: Nov. 11, 2014

(54) COMPUTER SIMULATION OF ELECTROMAGNETIC FIELDS

(75) Inventor: Terje Graham Vold, Anacortes, WA (US)

(73) Assignee: Terje Graham Vold, Anacortes, WA (US)

(*) Notice: Subject to any disclaimer, the term of this patent is extended or adjusted under 35 U.S.C. 154(b) by 160 days.

(21) Appl. No.: 13/136,010

(22) Filed: Jul. 19, 2011

Related U.S. Application Data

(60) Provisional application No. 61/365,366, filed on Jul. 19, 2010.

(51) Int. Cl.
*G06F 7/60* (2006.01)
*G06F 17/10* (2006.01)

(52) U.S. Cl.
USPC .............................................. 703/2

(58) Field of Classification Search
None
See application file for complete search history.

(56) References Cited

U.S. PATENT DOCUMENTS

2013/0289955 A1  10/2013  Vold

OTHER PUBLICATIONS

Evans et al. "The optical—mechanical analogy in general relativity: New methods for the paths of light and of the planets" 1996.*
Hestenes, D. (1966). "Space-Time Algebra." Gordon and Breach, Science Publishers, Inc. 93 Pages.
Harrington, Roger F. (1968). "Field Computation by Moment Methods." Robert E. Krieger Publishing Company, Inc.. 229 pages.
Jackson, John David. (1975). "Classical Electrodynamics." John Wiley & Sons Inc., 848 Pages.
Bailey, Ian et al. (1975). "Lagrangian Dynamics of Spinning Particles and Polarized Media in General Relativity." Commun. math Phys. 42, 65-82 Springer-Verlag.
Vold, Terje G. (1993). "An introduction to geometric calculus and with an application in rigid body mechanics." American Association of Physics Teachers American Journal of Physics, 61( 6), Jun. 1993. pp. 491-504.
Vold, Terje G. (1993). "An introduction to geometric calculus and its application to electrodynamics." American Association of Physics Teachers American Journal of Physics, 61( 6), Jun. 1993. pp. 505-513.
Jin, Jian-Ming. (2002). "The Finite Element Method in Electromagnetics." 2nd Edition, John Wiley & Sons Inc. 753 pages.
Gibson, Walton C. (2008). "The Method of Moments in Electromagnetics." Chapman & Hall / CRC. Taylor and Francis Group. 272 Pages.
Vold, Terje G. (Sep. 17, 2013) "Computing Electromagnetic Fields by the Method of Least Action." Advances in Applied Clifford Algebras. 2013, Springer Basel. DOI 10.1007/s00006-013-0417-1. 19 Pages.
Doran, Chris et al. (2003). "Geometric Algebra for Physicists." Cambridge University Press, 2003. 589 pages.

* cited by examiner

*Primary Examiner* — Saif Alhija
(74) *Attorney, Agent, or Firm* — David Lewis

(57) ABSTRACT

A system and method for numerically computing electromagnetic fields that is based on extremizing the action integral. The scalar and vector potentials are parameterized. The electromagnetic fields that result from those scalar and vector potentials are derived, and then the parameters are varied to extremize the action integral. In an embodiment, a Lagrangian density is constructed from the electromagnetic fields and potentials. The variation of the action integral is computed as a series of equations in which each equation is the result of taking a derivative of the action integral with respect to a parameter of a Lagrangian density. Solving for the values of the parameters yields the electromagnetic fields.

19 Claims, 50 Drawing Sheets

COMPUTER SIMULATION OF ELECTROMAGNETIC FIELDS

CROSS-REFERENCE TO RELATED APPLICATIONS

This Application claims priority benefit of U.S. Provisional Application Ser. No. 61/365,366, entitled Improved Computer Simulations of Electromagnetic Fields, by Terje Vold, filed Jul. 19, 2010, which is incorporated by reference in its entirety.

BRIEF DESCRIPTION OF DRAWINGS

FIG. 34, is at 45 degrees to the x and y axes.

DETAILED DESCRIPTION

Description without Equations

Introduction

Figure 1:
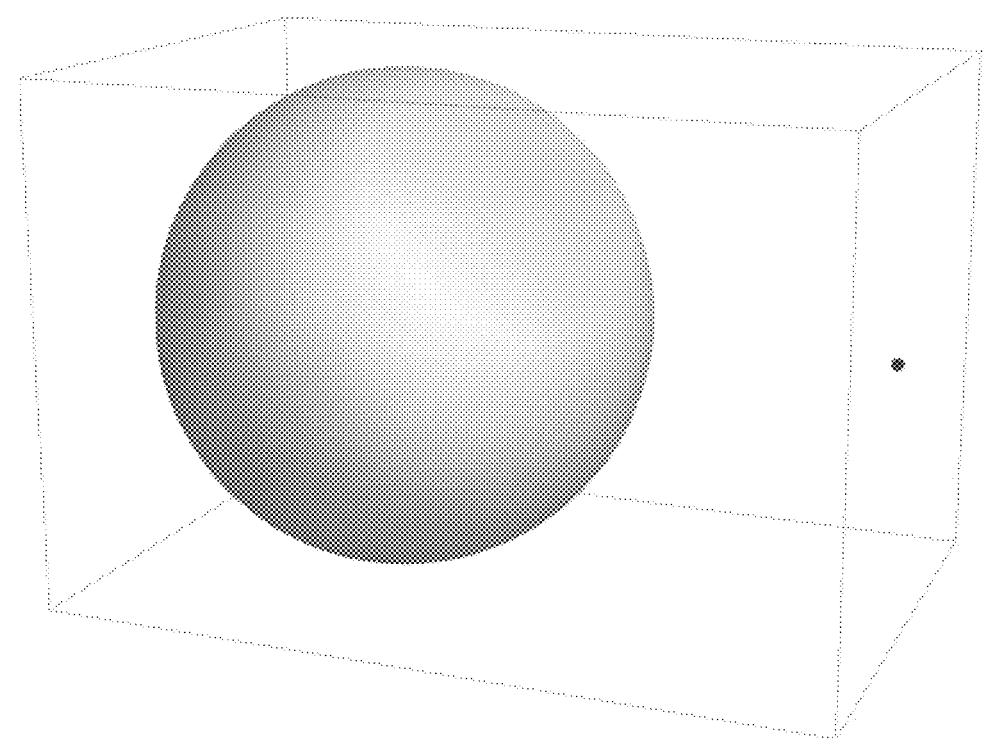
FIG. 1 shows a sphere with a nearby physical point dipole, represented as a dot.

Much of engineering, including electrical, electronic, and optical engineering, is based on physics and mathematical physics. Physics identifies, or aims to identify, rules or laws of nature using a mathematical language. These general laws of how the world behaves may be used in an infinite number of ways to create or help create specific practical results. Neither the laws of nature nor the language of nature (mathematics) are patentable, while practical inventions that are created by using, combining, and applying them in novel specific ways are patentable.

But the dividing line between these is not always clear. In development of the methods described in this provisional patent application, I have used some very well established laws of nature (Maxwell's equations of electrodynamics) and some less well known mathematics (geometric algebra) to write or derive some mathematical relationships between physical quantities of electrodynamics (mostly first written by other authors, some possibly first written by me). In the course of explaining my method, I have written down many unpatentable results of mathematical physics that may be unfamiliar to most computer programmers, physicists, and engineers. It is important to note that I am not claiming these results, but rather I am claiming a new method of computer simulation of electromagnetic fields, an eminently practical and specific engineering task, that I feel is best described by including information on these less familiar topics.

Since this is a provisional patent application, my primary goal is to describe and explain these new methods with sufficient clarity and detail to allow someone practiced in the relevant arts to use them. This may have resulted in some repetition, and descriptions of methods or informal claims that do not meet the requirements of formal claims for a regular patent application. A proper regular patent application will be submitted by the required date.

A person skilled in the arts relevant to this provisional patent application may be a person a) with good command of electrodynamics at the level of the classic textbooks "Classical Electrodynamics" by Jackson (2nd ed, Wiley, 1975) and "The Classical Theory of Fields" by Landau and Lifshitz (Pergamon Press, 1975), b) skilled at programming in the Mathematica computer language, version 7, in order to easily and clearly understand the numerical implementation example, and c) familiar with the use of geometric algebra and calculus at the level of "Geometric Algebra for Physicists" by Doran and Lasenby (Cambridge University Press, 2003) and preferably also familiar with "Space-Time Algebra" by Hestenes (Gordon and Breach, 1966) in order to clearly understand how the calculations done in the numerical implementation example can be correctly applied to other electromagnetic simulations.

Description

I have invented methods of calculating electric and magnetic field values in a computer simulation. These may be used separately, in combination with each other, or in combination with other methods. There are two main or most important methods, that I am calling the method of least action and the method of least squared response error, and at least two additional methods that may be used with the main methods or with methods of prior art.

The first method or claim is to choose the parameters in a parameterized expression of the potential and associated field so as to extremize the electromagnetic action with variation of those parameters. I call this the Method of Least Action.

Although extremization of the action is a well known idea in mathematical physics, typically called the principle of least action, it has never before been directly applied to practical numerical calculations of this type, and its application results in qualitatively different calculations and quantitatively better results compared with prior art. Also, although the statement above is simple and includes a large range of application and embodiments, it is very precisely stated and clearly limited in its scope. In particular, none of the many varieties of methods of prior art are included in this method.

This method may be viewed as a boundary element method, or a method of moments, that uses unknowns, operators, weighting functions, and an inner product that are different from those used in prior art. This method has improved numerical results for the same computational time compared with prior art, and a simpler, more precisely defined structure which allows easier application and extension to cases that are more complex than the simple case used here for illustration.

The detailed description of the basic model in this paper assumes that time dependence is harmonic, with arbitrarily varying time-dependent electromagnetic quantities represented as Fourier components in the frequency domain, but this description may be recast in the time domain.

This method may be especially usefully applied to simulate electromagnetic fields when space may be modeled as consisting substantially of piecewise homogeneous bulk regions of space filled with media that is electrically polarizable, electrically conductive, magnetically polarizable, or some combination.

"Bulk regions" means bounded volumes that are not thin; more quantitatively, we might say that bulk regions are bounded volumes such that the ratio of volume to surface area is sufficiently large, typically not much smaller than the distance between points or vertices on the region's boundary used to describe the boundary. Bounded volumes that are not bulk regions may be called thin regions or objects, or regions or objects with negligible thickness, or points or particles, or wires, or sheets. Often a thin surface layer of a bulk region is treated as a separate thin region; for example, in many cases almost all charge and current of a good electrical conductor is very close to the surface of the conducting object, and a bulk volume conductor may be replaced, either or both in physical reality and in the computer simulation, by a thin conducting surface or sheet object that is coincident with the boundary of the original conducting object.

The space may contain additional material, such as polarizable or conductive point, wire, or sheet or other thin objects; these can be analyzed by combining the method of least action with prior art methods, or, preferably, with the method of least squared response error described below and in later sections.

Any charge and current source functions, including sources at infinity, or their resulting fields, may also be specified. These are often called "incident" or possibly "applied" fields.

A simple particular application of my method for computer calculation of electromagnetic fields is to a) specify a substantially continuous electromagnetic space-time potential as a sum of coefficients times potential basis functions, b) choose the coefficients and potential basis functions to minimize the classical action with variation of the coefficients, and then c) calculate any desired field values as sums of these coefficients times the field basis functions that correspond to the potential basis functions.

A "substantially continuous electromagnetic space-time potential" refers to a scalar potential and 3D vector potential that are continuous at all non-boundary points, and such that the scalar potential and the components of the vector potential that are tangential to the boundary are continuous at all boundary points within an acceptable numerical error.

Some convenient choices are to i) choose the potential basis functions, and any of the coefficients as necessary, so that the integrand of the variation of the action is zero for all non-boundary points, and then ii) choose the coefficients of the linear combination so that the action integral over all boundary points is minimized.

The continuous potential requirement of Item a) ensures that the two homogeneous Maxwell equations are satisfied at all non-boundary points, and that the usual homogeneous electromagnetic boundary conditions are satisfied at all boundary points.

Item i) ensures that the two Inhomogeneous Maxwell equations are satisfied at every non-boundary point.

Item ii) ensures that the usual Inhomogeneous electromagnetic boundary conditions are satisfied. This item results in an equation of the type used by a method of moments or by boundary element methods as applied to electromagnetism in prior art, but with an inner product, weighting functions, equation, and unknowns that have not been used in prior art, and it results in significant improvement in performance and results over prior art. This may be the most important and novel part of my method of least action.

There are various ways to implement a). Three possibilities are:

1) Specify three degrees of freedom of the potential on the boundary of each homogeneous region, and calculate any needed potential or field value at any interior point of a region by using an appropriate Green's function for the region and the Lorenz condition; this is a clear concept for this method, but is generally computationally intensive and therefore may not be practical. This is a well known and studied method.

2) Specify an "equivalent" parameterized conserved charge and current surface source density on the boundary of each region, use a Green's function to calculate any needed potential or field value from this charge and current in each region, and constrain the equivalent sources so that desired boundary conditions are met. This is a generally applicable, though moderately computationally intensive, method, often used in prior art. In prior art methods, the same equivalent source is generally used for fields on both sides of a boundary, and it is generally necessary to choose equivalent sources that include nonphysical magnetic charge and current; in the present method, different boundary virtual sources are used for fields on the different sides of a boundary, and using only electric charge and current, not magnetic, is allowed and may be preferred.

3) Specify a "virtual" parameterized conserved charge and current source density that is outside the region for which the fields are being calculated, calculate the potential and fields from this virtual charge and current, and then constrain the virtual sources so that the desired boundary conditions are met. Such virtual source density is similar to virtual images in optics, in that the virtual object does not really exist but is a convenient fiction for calculating desired field values in a region that is free of the virtual object. If the charge-current source density is simple, such as consisting of a finite number of point electric and magnetic dipoles, and the sources are well chosen, such as point dipoles at distances from the boundary that are comparable to the distance between dipoles, and the fields are well chosen, such as both retarded and advanced fields, this method can generate a good approximation to a wide range of potential values on boundaries between bulk regions with relatively little computation. Using virtual sources allows much greater freedom in choosing good basis functions. These virtual sources can be a combination of boundary and non-boundary virtual sources, as may be useful for a region boundary with one part that comes close to but does not directly connect with another part of the boundary (since in this case the non-boundary virtual sources that should be on one side of the boundary may end up on the other side, so boundary virtual sources might be a better choice). This new method of including non-boundary virtual sources may be used here and has not been used in prior art, and indeed cannot be used in much if not all prior art since the source is used as the "weighting" or "testing" function for essential integrals over boundaries in prior art. Use of virtual sources is illustrated in detail in the computer program in the "Numerical implementation example" section.

This method of least action can be expressed in detail and with precision in various ways, including using conventional 3D vector algebra, relativistic tensor algebra, the geometric algebra of space, and the geometric algebra of space-time. Despite the simplicity of its statement and its advantages, it has not previously been applied in the art of numerical electromagnetic calculation or computer simulation. Details of this method are given in later sections.

A second method or claim of this patent is the determination of the coefficients of source basis functions for thin objects or regions, such as thin wires or thin sheets, that are electromagnetically responsive (e.g., electrically conductive or electrically or magnetically polarizable, or some combination) by choosing coefficients that minimize the integrated squared error between the source given by the sum of coefficients times basis functions, and the source predicted by the electromagnetic response rule (e.g., Ohm's "Law") as a linear function of the field, with the field calculated due to all charge-current sources, typically using integrals and Green's functions. I call this the Method of Least Squared Response Error. This is similar to but distinct from the method of moments as used in prior art, and generates better results; it may be viewed as a method of moments, but with weight functions given by an expression not used in prior art. Again, although the mathematical ideas used in this method are not new, application of them to numerical computer simulation of electromagnetic fields as taught by this method is new. Further details are give in the "Description of Wires and Sheets" section.

A third method or claim of this patent is the application of a new type of wire-like or sheet-like charge-current source basis function set. This type of set of source basis functions can be obtained from a more conventional set of more localized conserved charge-current source basis functions, such as RWO basis functions, as follows. We begin by choosing to parameterize each basis function by the amplitude of the charge density. We then replace one charge-current source basis function in each topological loop of the wire or sheet network with a linear combination of the original basis functions of the loop so that they represent a current loop, with coefficients chosen so that the charge density is zero everywhere, and then divide the resulting function by the frequency. The resulting set of source basis functions works without problem at all frequencies (with the usual restriction that the domain of the basis function is small compared with the wavelength of radiation in the surrounding medium), including low frequencies and zero. In contrast, the original set of source basis functions is problematic at low frequencies because the linear combination of basis functions described above has a common factor of frequency, so this combination vanishes at zero frequency, resulting in complete loss of this degree of freedom for zero frequency (with a corresponding completely incorrect solution to the simulation problem) and serious numerical problems for small frequencies. This may be used in combination with the method of least action, the method of least squared response error, or prior art methods. Further details are give in a "Description of Wires and Sheets" section.

A fourth method or claim of this patent is the use of both retarded and advanced potential and field functions as basis functions in computer simulations of electromagnetic fields. Again, although advanced and retarded functions are well studied and understood in mathematical physics, use of advanced functions in the practical task of numerically simulating electromagnetic fields has not been considered in prior art, despite great advantages in their use. Especially useful is to use
a) both retarded and advanced field solutions for each or some of the given charge-current source basis functions or
b) both the retarded field solution for a source basis function and the advanced field solution for the time-reversed version of the same source basis function, for each or some of the given charge-current source basis functions. Possibilities a) and b) may be equivalent.

Advanced functions are usually not appropriate unless they are enclosed by a finite boundary.

This may be used in combination with the method of least action, the method of error minimization, or prior art methods.

This method is illustrated in detail in the computer program in the "Numerical implementation example" section.

The explicit identification in this provisional patent application of distinct methods or claims above is not meant to be exhaustive. I expect but am not sure that these methods will be written as independent claims in the subsequent patent application. I believe that the details of these methods given in the remainder of this provisional patent application communicate the content of my invention in a way that is proper and acceptable, allowing a person skilled in the relevant arts (i.e., computer programming with expertise in the Mathematica computer language, physics with expertise in electrodynamics, and mathematics with familiarity with geometric algebra) to implement these methods.

Comparison of the Method of Prior Art for Bulk Regions (Method of Moments) with Method of Least Action The following table gives a typical sequence of steps that lead to and specify the computer calculations performed in the prior art method of moments and in the method of least action, with corresponding steps compared.

| The Method of Moments applied to Bulk Regions | The Method of Least Action |
| --- | --- |
| We start with Maxwells' equations of electrodynamics | We start with the classical electrodynamic action and the principle of least action |
| Equivalent electric and magnetic charge and current sources are used to define basis functions for expansions, and these i) must be on boundaries and ii) are not physically possible because magnetic charge does not exist | Virtual electric charge and current sources are used to define basis functions for expansions, and these i) may be on or off boundaries and ii) are physically possible, but virtual like a virtual image in optics |
| Fields on both sides of a boundary are calculated from the same fictitious sources on the boundary, which implies normal E and B components are correct if tangential components are correct | Fields on the two sides of a boundary are calculated from sources that ardifferent but are chosen to result in the same potential on the boundary, which implies tangential E and normal B components are always correct |
| Boundary condition equations constrain tangential E and B components and are derived from Maxwell's equations | Boundary condition equations constrain normal D and tangential H and can be directly read from the least action equation |
| Fields in the boundary condition equations are expanded as linear combinations of basis functions | Fields in the least action equationa re expanded as linear combinations of basis functions |
| Matrix equations are obtained by choosing arbitrary testing functions (usually the fictitious boundary sources), choosing an arbitrary inner product (usually the sum of the inner products of the vector current part of the source, electric and magnetic, with the corresponding vector field, electric or magnetic, integrated over the boundary), and taking the inner product of each testing function with each term in the boundary condition equations | Matrix equations are the same as the least action equation with variation of the parameters of the potential expansion, uniquely determined with no choices available |
| The matrix equation elements are usually chosen to be boundary integrals of dot products in 3D space between fictitious vector currents and vector electric field values, but there is great freedom in choosing this | The matrix equation elements are always required to be boundary integrals of dot products in 4D spacetime between the potential, the vector normal to the boundary, and the field tensor |
| The matrix: equations are solved | The matrix equations are solved |

Comparison of Characteristics of Prior Art for Bulk Regions (Method of Moments) and the Method of Least Action The following table lists and compares characteristics of the prior art method of moments and the method of least action, and of the resulting computer simulations.

| The Method of Moments applied to Bulk Regions | The Method of Least Action |
| --- | --- |
| There is great freedom in choosing the form of matrix elements (including allowing those of the method of least action); choices have been made in prior art by ad hoc guesses of what might give good numerical results | There is no freedom in choosing the form of matrix elements (although one may choose any set of basis functions); it is uniquely determined by the principle of least action to best possible results |
| The concepts are complex and potentially confusing with fictional quantities, such as magnetic charge, playing central roles | The concepts are simple with only real physical quantities playing central roles |
| The requirement that the fictitious sources are located on the boundary results in complicated and slow integrals | The allowance of virtual sources that are located not on the boundary can result in simple and fast integrals |
| There generally are serious problems for all regions (electrically polarizable, magnetically polarizable, and electrically conductive) for frequencies that are small or equal to zero | There are no problems for electrically or magnetically polarizable regions, or for conductors as long as the region has no specified current sources, for any frequency from zero through high frequencies |
| Generally good performance but not optimal numerical results for any given set of basis functions | Excellent performance and provably optimal numerical results for the same set of basis functions |

Comparison of the Methods of Prior Art for Thin Regions (Method of Moments) and of the Method of Least Squared Response Error The following table gives a typical sequence of steps that lead to and specify the computer calculations performed in the prior art method of moments as applied to thin regions, and in the method of error minimization, with corresponding steps compared. The first several steps are identical, but included for clarity. The equations are written in equivalent but slightly different form from others in this paper, in order to more easily compare with prior art.

| The Method of Moments applied to Thin Regions | The Method of Least Squared Response Error |
|---|---|
| We start with Maxwells' equations of electrodynamics Real electric charge and current sources are used to define basis functions for expansions Fields are calculated from the physical sources on the sheet Phenomenological constraint equations (e.g., Ohm's law) are used Sources and fields in the constraint equations are expanded as linear combinations of basis functions Matrix equations are obtained by choosing arbitrary testing functions (typically the real sources), choosing an arbitrary inner product (typically the inner product of the current part of the source with the electric field, integrated over the boundary), and taking the inner product of each testing function with each term in the constraint equations | We start with Maxwells' equations of electrodynamics Real electric charge and current sources are used to define basis functions for expansions Fields are calculated from the physical sources on the sheet Phenomenological constraint equations (e.g., Ohm's law) are used Sources and fields in the constraint equations are expanded as linear combinations of basis functions Matrix equations are obtained by minimizing the integrated squared error of the constraint equation with respect to coefficients $c_j$ |
| Resulting equation for Ohm's law: $$0 = \int \vec{j}_i \cdot \left( (\vec{E}[j_j] - R\vec{j}_j)c_j + \vec{E}_{incident} \right) d\Sigma$$ | Resulting equation for Ohm's law: $$0 = \int (\vec{E}[j_i] - R\vec{j}_i) \cdot \left( (\vec{E}[j_j] - R\vec{j}_j)c_j + \vec{E}_{incident} \right) d\Sigma$$ |
| For zero resistance R: $$0 = \int \vec{j}_i \cdot (\vec{E}[j_j]c_j + \vec{E}_{incident}) d\Sigma$$ | For zero resistance R: $$0 = \int \vec{E}[j_i] \cdot (\vec{E}[j_j]c_j + \vec{E}_{incident}) d\Sigma$$ |
| Solve these matrix equations for $c_j$ | Solve these matrix equations for $c_j$ |

Comparison of Characteristics of Prior Art for Thin Regions (Method of Moments) and the Method of Least Squared Response Error The following table lists and compares characteristics of the prior art method of moments and the method of error minimization, and of the resulting computer simulations; for clarity, this is done for the case of electrical conductors, though the case of electrically or magnetically polarizable wires and sheets is similar.

| The Method of Moments applied to Thin Regions | The Method of Least Squared Response Error |
|---|---|
| The weight functions are chosen by following the 'reaction concept,' in which weights are chosen to equal the current basis functions $\vec{j}_i$. | The weight functions are chosen by minimizing the integrated squared error, resulting in weights equal to the electric field $\vec{E}(j_i)$ due to charge-current basis functions $j_i = \{\rho_i, \vec{j}_i\}$, minus the current basis function $5i$ times a resistivity R (R for the common case of negligible resistivity). |
| The weight functions are typically localized, and are nonzero on only a small part of the object. | The weight functions are only weakly localized, and are nonzero at every point of the object. |
| The motivation appears to be to follow prior use of 'the reaction concept,' as a simple definite recipie | The motivation is to minimize the numerical error of a well established physical relationship (e.g., Ohm's law) |
| Calculation of matrix elements requires N electric field values for N basis functions, so goes like N. | Calculation of matrix elements requires the outer product of N electric field values, so goes like N if multiplication is fast compared with calculation of field values (the usual case). |
| The result is not optimal because weights are chosen for simplicity instead of best performance | The result is optimal by construction |

Description of the Method of Least Action by Way of Illustration with a Simple Example Introduction to the Simple Application My method can be applied to complex geometries and to models with conductive or polarizable wires and sheets, and there is great freedom in the choice of a myriad of details while still following this method. But to explain my method I will apply it to a simple case of one bounded bulk region of polarizable material surrounded by the rest of space filled with another polarizable material, with a real or physical nearby point dipole source that is the source of an "incident" or "applied" field. For simplicity and ease of drawing figures, I will take the bounded bulk region to be a sphere. I will imagine that the sphere is filled with some solid material such as glass, silicon, or (magnetically soft) iron, and the surrounding region is filled with air, though the mechanical properties of these regions does not enter into this simulation. Such a sphere with a nearby physical point dipole, represented as a red dot, are illustrated in FIG. 1.

The first task is to define a set of continuous potential basis functions. We do this by a) first defining a set of potential basis functions that are discontinuous across the boundary but such that they satisfy appropriate versions of Maxwell's equations at every non-boundary point, and b) then finding linear combinations of these discontinuous functions that are continuous, or approximately continuous, at all boundary points.

Each discontinuous potential basis function is defined to be zero either at all points inside the sphere, or at all points outside the sphere. In the region, interior or exterior, where the discontinuous potential is nonzero, we define each dis continuous potential basis function as the potential due to an associated source, either i) a virtual source such as a point electric or magnetic dipole, that may be located anywhere except at interior points of the region (i.e, is located at interior points of other regions or at boundary points), or ii) a physical source such as a point electric or magnetic dipole or a wire source or a sheet source.

We use the term "virtual source" to refer to source functions that do not represent any real source in the simulation, but rather are just convenient tools for calculating potentials with desired properties. Using virtual sources, we define useful source-free potentials with associated electric and magnetic fields that satisfy Maxwell's equations.

We use the term "physical source" to refer to source functions that represent a real physical source that exists in the simulation. We typically use the word "physical" to identify these sources and not "real" to avoid confusion with the unrelated ideas of real versus imaginary or complex numbers.

There are many other ways to define a suitable parameterized continuous potential function; this method is used in this example because of its simplicity and fast computation.

Virtual Sources

In this example we use virtual sources that are dipoles located outside the region for which we are defining a potential basis function. Many other choices are possible, including virtual sources that are located on the boundary, such as the common RKO sources. We use dipoles in this example because they are simple and can give excellent numerical results with relatively little computation.

An advantage of boundary virtual sources is that they can work even if two substantially anti-parallel parts of one boundary are very close to each other, while with sources that are outside the boundary of the region, such parts of the boundary must be separated by a distance on the order of twice the distance between the virtual sources and the boundary. Advantages of dipole virtual sources that are located outside the boundary include simplicity and very fast computation.

The electric and magnetic dipoles that are used to define the potential basis functions can be specified as follows. These dipoles do not exist, and do not contribute any charge or current density to any real or physical source of the simulation, but are only used as mathematical aids to specify fields. In this way they are similar to virtual sources in optics.

I define a triangular mesh to approximate and represent the boundary between the two bulk regions. I will do this for the spherical boundary of this example by using an icosahedron. Other geometrical quantities must also be defined, such as the location of the specified point dipole. In this example I choose an arbitrary location for the specified point dipole and include it, colored red, in the following figure of the triangular mesh and dipole location.

Figure 2:
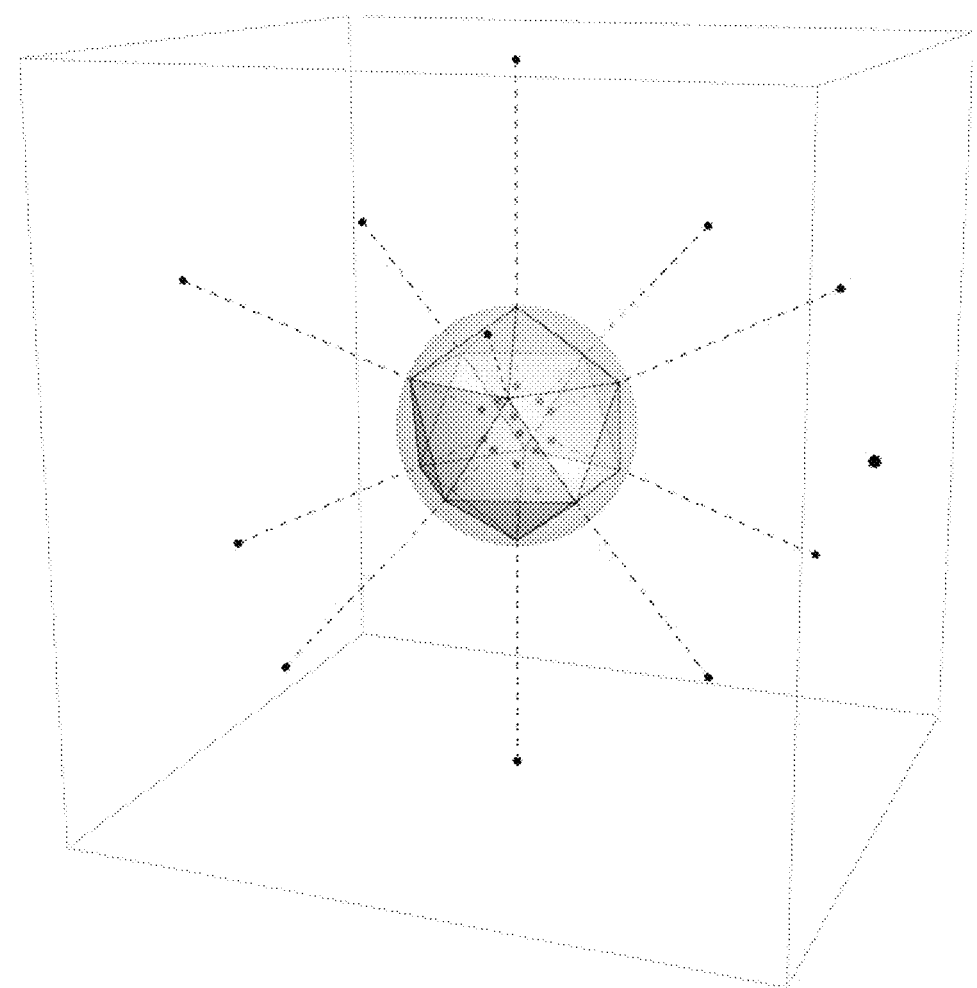
FIG. 2 shows these dipole points, colored black; the dashed lines indicate the associations between dipole points and boundary vertices.

With each vertex, I will associate one point inside the sphere and one point outside the sphere. I will consider fields due to one electric and to two magnetic dipoles at each of these points, with the electric moment parallel to the line to the vertex and the magnetic moments perpendicular to this line. These fields will be used to define basis functions. FIG. 2 shows these dipole points, colored black; the dashed lines indicate the associations between dipole points and boundary vertices. The exact locations of the dipoles is not critical, although good placement, resulting in basis functions that do a good job of representing arbitrary fields, can be quantified. See FIG. 2.

Discontinuous Potential Basis Functions, Continuous within Each Homogeneous Region of Polarizable or Conductive Medium I index the dipoles described in the previous section with i, and for each dipole i, I define discontinuous potentials $\ddot{\phi}_i$ and $\ddot{\vec{a}}_i$ as follows. I will use a pair of over-dots to indicate that the quantity may be discontinuous at boundary points, as in $\ddot{\phi}_i$, in contrast to quantities that are continuous at all points, as in $\phi_i$, which will be defined in the next section in terms of the discontinuous ones of this section.

Figure 3:
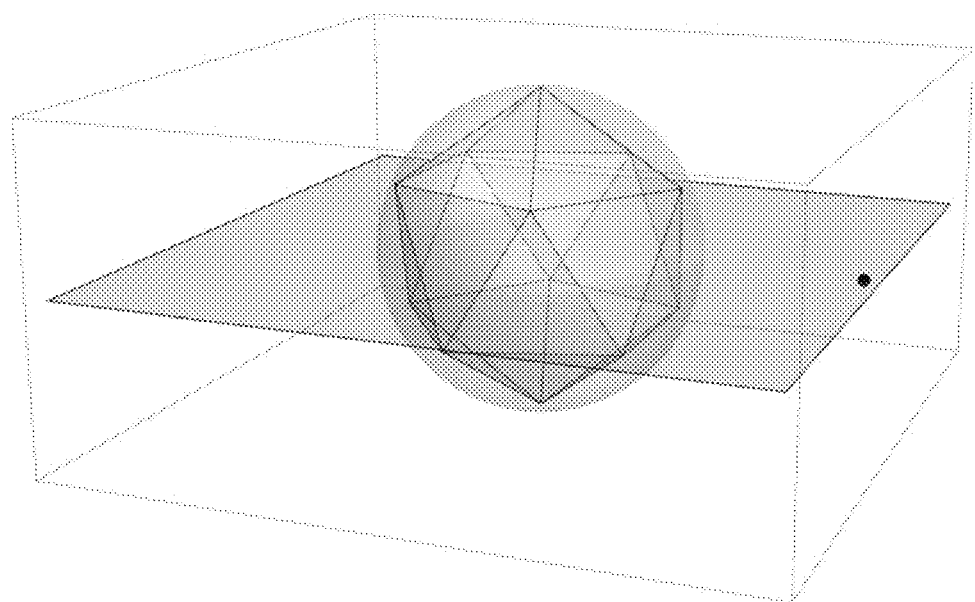
FIG. 3 shows the sphere, a dipole in the external region, and a plane containing the dipole and the center of the sphere.

FIG. 3, shows the sphere, a dipole in the external region, and a plane containing the dipole and the center of the sphere.

Figure 4:
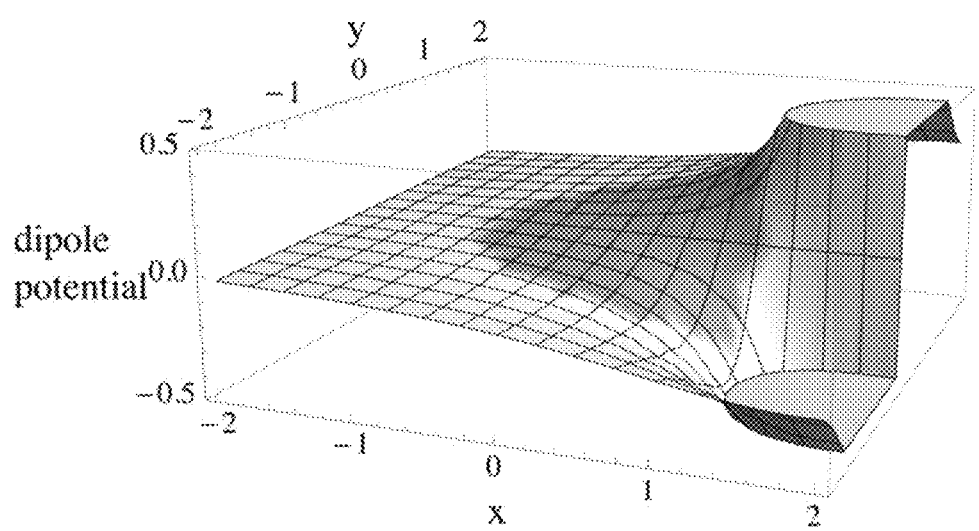
FIG. 4 is a plot of a scalar potential in the plane identified in the previous figure.

FIG. 4 is a plot of a scalar potential in the plane identified in the previous figure, defined in a "virtual space" that is uniformly filled with a medium having the same properties as that inside the sphere, due to the dipole in that figure. The plot is colored blue for points inside the sphere, where these potential values will be used.

Figure 5:
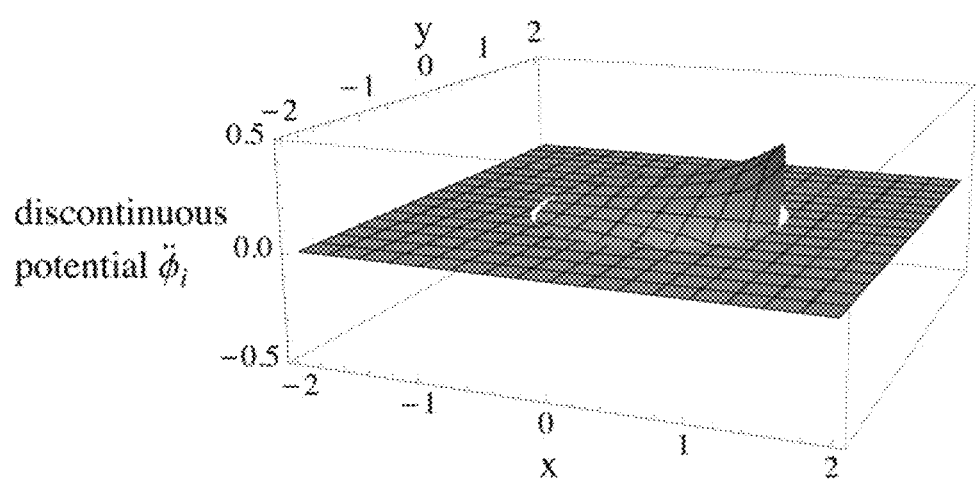
FIG. 5 is a plot of a discontinuous scalar potential $\bar{\phi}_i$ defined in the simulation space made up of the actual mediums inside and outside the sphere.

FIG. 5 is a plot of a discontinuous scalar potential $\ddot{\phi}_i$ defined in the simulation space made up of the actual mediums inside and outside the sphere, with $\ddot{\phi}_i$ defined to equal zero outside the sphere and to equal the value of the previous figure for points inside the sphere. This is the scalar part of one of our discontinuous potential basis functions for this example; there is also a corresponding vector part, defined in the same way, but the plots of this vector potential or of its components may be confusing so are not drawn here.

Figure 6:
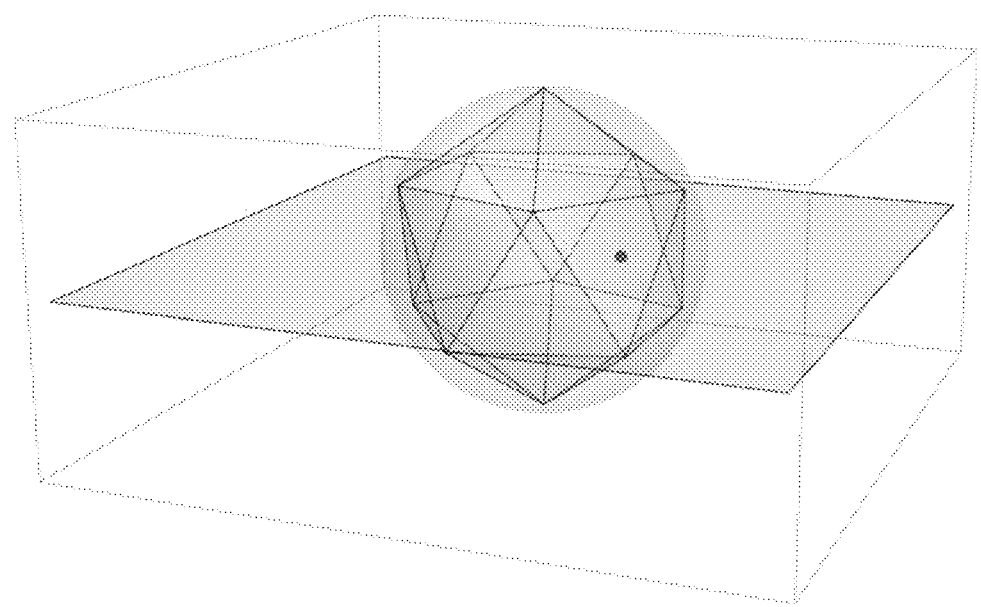
FIG. 6 shows the sphere, a dipole in the internal region, and a plane containing the dipole and the center of the sphere.

FIG. 6 shows the sphere, a dipole in the internal region, and a plane containing the dipole and the center of the sphere.

Figure 7:
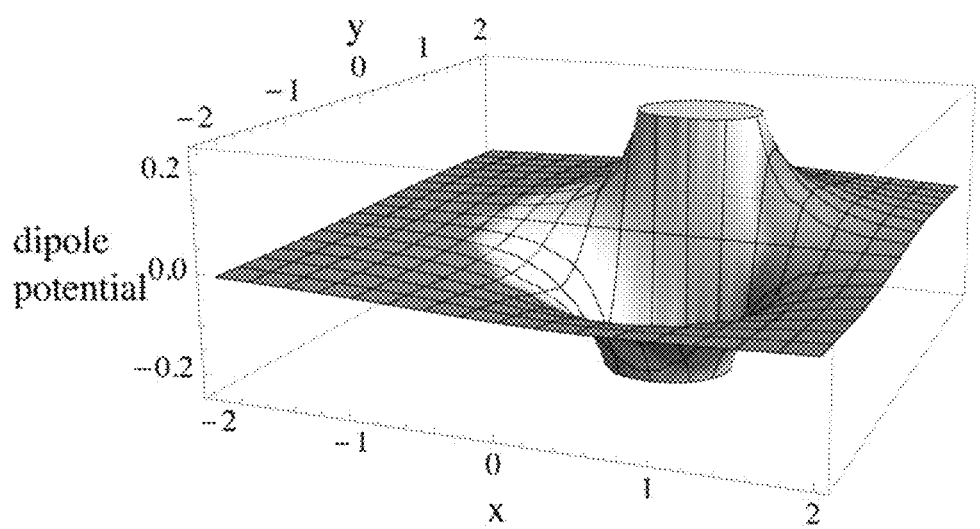
FIG. 7 is a plot of the scalar potential in the plane identified in the previous figure.

FIG. 7 is a plot of the scalar potential in the plane identified in the previous figure, for an virtual space uniformly filled with a medium having the same properties as that outside the sphere, due to the dipole in the previous figure. The plot is colored blue for points outside the sphere, where these potential values will be used.

Figure 8:
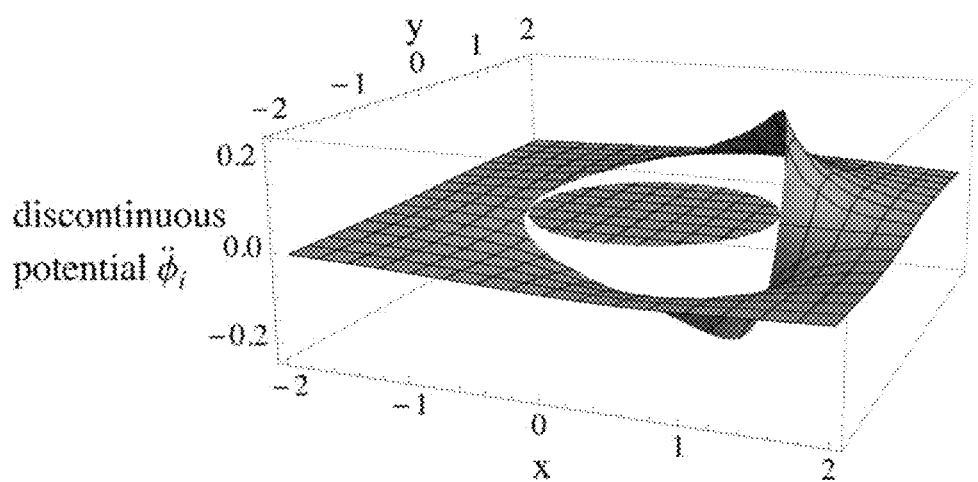
FIG. 8 is a plot of a discontinuous scalar potential $\bar{\phi}_i$ defined in the simulation space.

FIG. 8 is a plot of a discontinuous scalar potential $\ddot{\phi}_i$ defined in the simulation space made up of the actual mediums inside and outside the sphere, defined to equal zero inside the sphere and to equal the value of the previous figure for points outside the sphere. This is the scalar part of our discontinuous potential basis functions; as before, there is also a corresponding vector part, defined in the same way, but as before, the plots of this vector potential or of its components may be confusing so are not drawn here.

Figure 9:
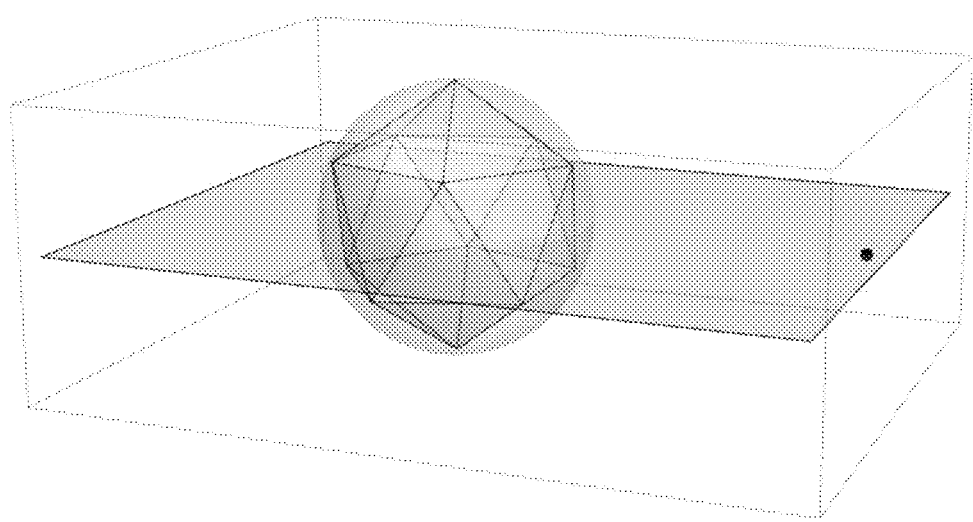
FIG. 9 shows a sphere, the simulation's physical dipole in the external region, a plane containing the dipole, and the center of the sphere.

FIG. 9 shows the sphere, the simulation's physical dipole in the external region, and a plane containing the dipole and the center of the sphere. The real dipole is not a virtual dipole, but is a physical dipole that, in this example, is specified or given by the person doing the simulation.

Figure 10:
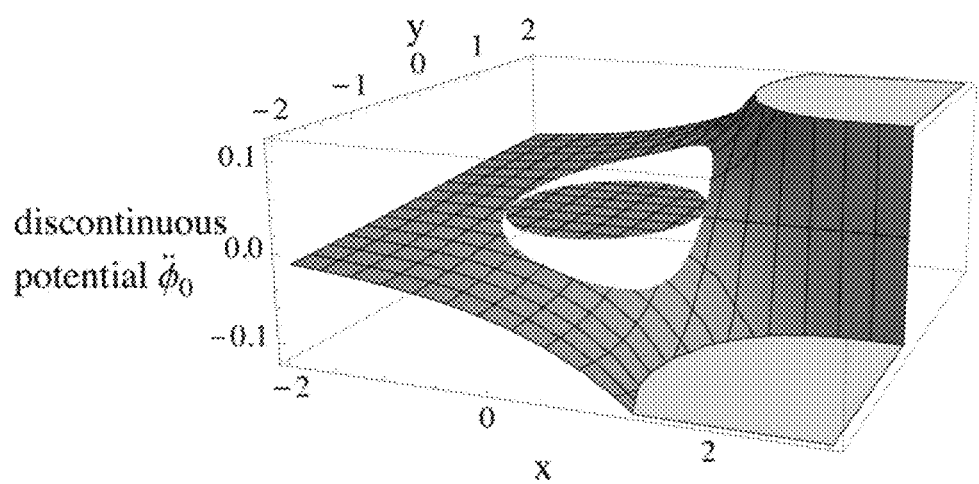
FIG. 10 is a plot of the discontinuous scalar potential defined in the simulation space.

FIG. 10 is a plot of the discontinuous scalar potential defined in the simulation space made up of the actual mediums inside and outside the sphere, defined to equal zero inside the sphere, and for points outside the sphere, to equal the value that would occur due to the physical dipole if all of space were filled with the external medium.

Next, FIG. 1, is the scalar part of the interior discontinuous potential function that matches this physical dipole at the boundary; as before, there is also a corresponding vector part, defined in the same way, and as before, the plots of this vector potential or of its components may be confusing so are not drawn here.

For clarity, these plots have displayed the real part of the scalar part of the potential, for dipole fields with a wavelength long compared with the plotted dimensions. Such plots are indistinguishable for retarded and advanced fields and potentials. One of the independent claims of this patent is the use of both retarded and advanced basis fields and potentials for solving these types of problems. It turns out that continuous basis functions, as described in the next section, are much better if both advanced and retarded potentials and fields are used for any finite bounded region, such as the interior of this sphere. Details of how this may be done are clarified by the use of both retarded and advanced basis fields and potentials in the numerical example in a later section.

Continuous Basis Functions

In this simple example, there is an exact solution for scalar potential basis functions that are continuous everywhere for frequency=0: we can use results known for image charge solutions to see that if we choose locations of the electric dipoles correctly, the sum of one interior discontinuous potential and one exterior discontinuous potential defined in the previous section will give a potential that is exactly continuous at every point on the boundary, at least for frequency equal to zero.

Figure 11:
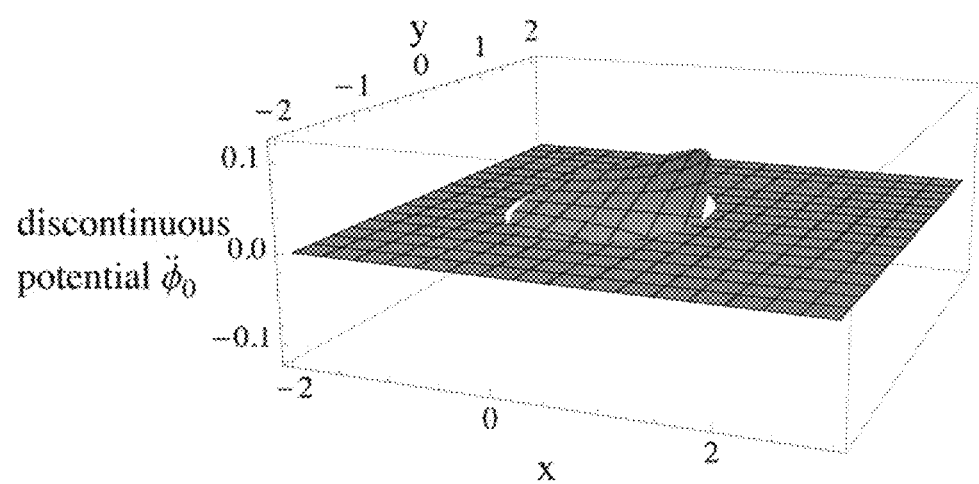
FIG. 11 shows the scalar part of the interior discontinuous potential function that matches this physical dipole at the boundary.
Figure 12:
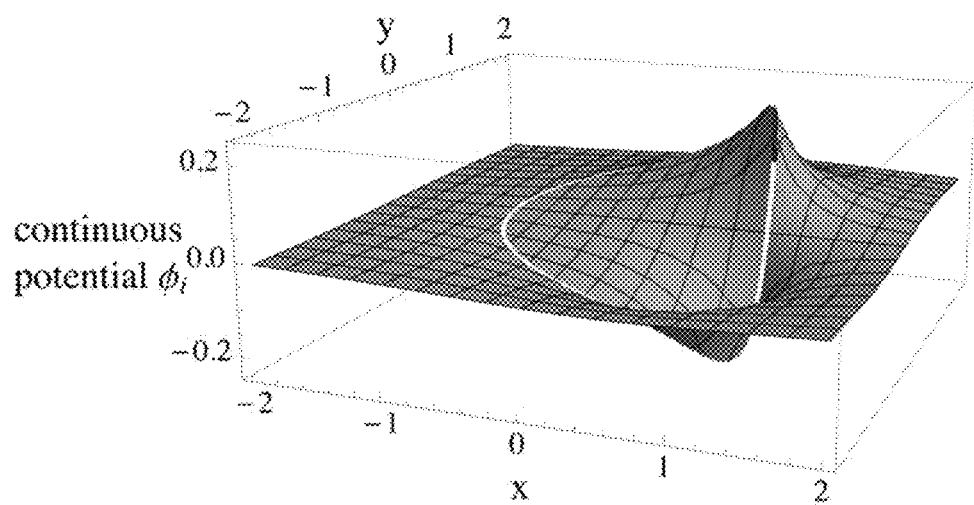
FIG. 12 shows potentials that is the sum of one interior discontinuous potential and one exterior discontinuous potential.
Figure 13:
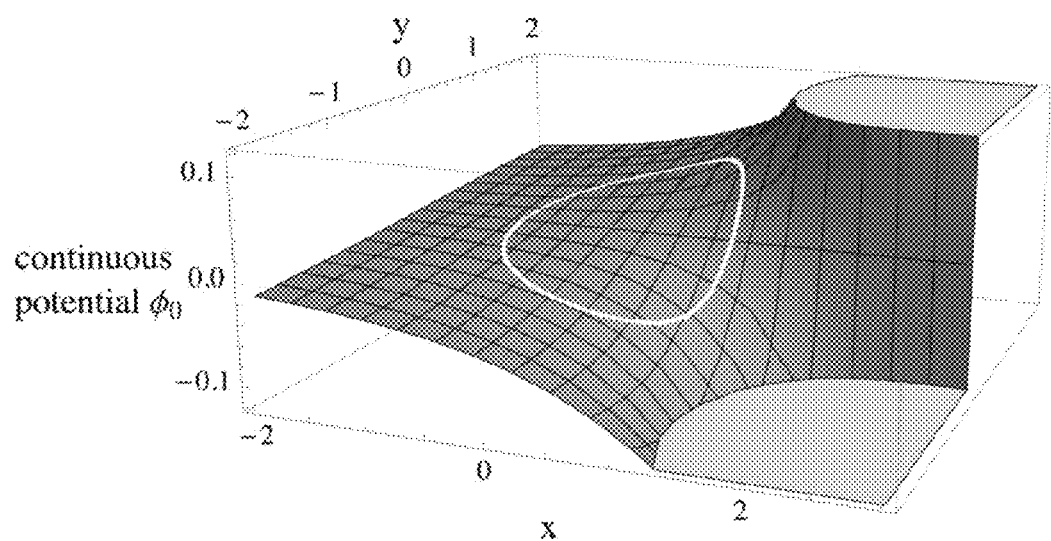
FIG. 13 shows a potential that is the sum of the potentials of the FIG. 10 and of FIG. 11

This is illustrated in the FIG. 12, which is the sum of the two discontinuous potentials illustrated in FIGS. 5 and 8:

This is illustrated again in the following plot, FIG. 13, for the potential associated with the physical dipole: this is the sum of the potentials of the FIG. 10 and of FIG. 11:

For a general geometry, and for a general frequency, we cannot find exact solutions; instead, we form linear combinations of all discontinuous functions, and choose coefficients so as to minimize the integral of a measure of the potential mismatch over the boundary, as follows.

The dynamical variables of an electrodynamics problem are the potential $A=\{\Phi, \vec{A}\}$ and the source $J=\{\rho, \vec{J}\}$. We are here mostly using vector algebra combined with a list or set notation, because most readers are more familiar with vector algebra; geometric algebra is simpler, more precise, and more clear, but less familiar. We expand each one as a finite sum of basis functions times coefficients. Here we are concerned about the potential A. We want to write this potential as a sum of continuous basis functions $a_i$ times coefficients $c_i$, $$A = c_i a_i \quad (1)$$

where $a_i$ represents the scalar and vector potentials, $$a_i = \{\phi_i, \vec{a}_i\} \quad (2)$$

Using geometric algebra, if $\alpha_i = (\phi_i + \vec{a}_i)\gamma_0 = \gamma_0(\phi_i - \vec{a}_i)$ are the space-time potentials, $a_i$ is defined as $$a_i = \alpha_i \gamma_0 = \phi_i + \vec{a}_i \quad (3)$$

We construct these continuous basis functions $a_i$ as linear sums of discontinuous basis functions $\ddot{a}_i$ (like those illustrated in the previous section).

A general treatment of this is a bit abstract and can be unclear, so here I describe an application to this simple example problem with only two regions.

Let the index for the discontinuous potentials be the pair {i, r} where i is an integer that identifies the vertex and charge type (electric or magnetic dipole), and r identifies the region in which the potential is nonzero (r=in for inside or r=out for outside the sphere). We write a potential basis function as $\ddot{a}_i^r$. In this example there is only one physical source; for this we choose i=0 for notational simplicity, and its field (along with the dipole) exists in the outside region, so the associated potential is denoted $\ddot{a}_0^{out}$.

I define a linear combination $$a_0 = \ddot{a}_0^{out} + \ddot{a}_i^{in} c_{i,0} \quad (4)$$

with coefficients $c_{j,o}$ to be chosen such that the value just inside any boundary point equals or at least approximately equals the value just outside the boundary point. The expression $a_0$ represents a continuous potential that is associated with the physical source, as in FIG. 13, while $\ddot{a}_0^{out}$ represents the discontinuous potential associated with the physical source, as in FIG. 10. I also define linear combinations $$a_j = \ddot{a}_j^{out} + \ddot{a}_i^{in} c_{i,j} \quad (5)$$

with coefficients $c_{i,j}$ to be chosen also such that the value just inside any boundary point again equals or at least approximately equals the value just outside the boundary point. The expressions $a_j$ represent continuous potentials that are not associated with any physical source, but typically with potentials that are peaked or localized near a part of a boundary, as in FIG. 12. We are using standard complex notation here as reviewed in a later section, so that for a quantity like $a_j$ the actual physical quantity represented is $\text{Re}[a_j \text{Exp}[-i\omega t]]$.

We now minimize the integrated squared error of continuous potential $a_j$ on the boundary $\Sigma$ by requiring $$0 = \partial_{c_{i,j}} \int \left( \ddot{a}_j^{out} - \ddot{a}_k^{in} c_{k,j} \right)^\dagger * \left( \ddot{a}_j^{out} - \ddot{a}_l^{in} c_{l,j} \right) d\Sigma \quad (6)$$

where the superscript dagger means the complex conjugate (or the complex conjugate of the reverse using geometric algebra), and the asterisk product represents the scalar geometric product minus the product of the vector components perpendicular to the boundary (see the Numerical implementation example section and Boundary matching theory section). If we write $a_j$ as the multivector $a_j = \phi_j + \vec{a}_j$ and $\hat{n}$ is a unit vector normal to the boundary, this is $$a_i^\dagger * a_j = \langle (\phi_i^\dagger + \hat{n}\hat{n} \wedge \vec{a}_i^\dagger)(\phi_j + \hat{n}\hat{n} \wedge \vec{a}_j) \rangle = \quad (7)$$

$$\phi_i^\dagger \phi_j + (\hat{n}\hat{n} \wedge \vec{a}_i^\dagger) \cdot (\hat{n}\hat{n} \wedge \vec{a}_j) = \phi_i^\dagger \phi_j + \vec{a}_i^\dagger \cdot \vec{a}_j - \hat{n} \cdot \vec{a}_i^\dagger \hat{n} \cdot \vec{a}_j$$

where the last expression uses only operations and notation from vector algebra. Taking this derivative, we have $$0 = \partial_{c_{i,j}} \int (\ddot{a}_j^{out} - \ddot{a}_k^{in} c_{k,j})^\dagger * (\ddot{a}_j^{out} - \ddot{a}_l^{in} c_{l,j}) d\sum = \quad (8)$$

$$\int -\ddot{a}_i^{in\dagger} * (\ddot{a}_j^{out} - \ddot{a}_k^{in} c_{k,j}) d\sum$$

or $$\int \ddot{a}_i^{in\dagger} * \ddot{a}_k^{in} d\sum c_{k,j} = \int \ddot{a}_i^{in\dagger} * \ddot{a}_j^{out} d\sum \quad (9)$$

The surface integrals may be approximated numerically in various ways, such as by replacing the integrand on each triangle with its value at the centroid of the triangle. This gives a numerical matrix equation that can be and generally is immediately solved to give the coefficients $c_{k,j}$.

As stated in the previous section, this continuous potential is much better (i.e., better continuity at the boundary) if both retarded and advanced potentials are used. This is illustrated by their use in the numerical example.

We now have one approximately continuous potential basis functions $a_i = \{\phi_i, \vec{a}_i\}$ for each pair of dipoles (inside and outside dipole) associated with each vertex on the boundary, plus one approximately continuous potential basis function for the physical dipole source.

In a general case, we may have more than one and possibly many physical sources, and they may be point dipoles, line sources, sheet sources, or other types.

Solution by Minimization of the Action with Variation of Continuous Potential Parameters The potential $A = \{\Phi, \vec{A}\}$ of this simulation is now represented as a linear combination of the continuous basis potentials $\phi_i$, and $\vec{a}_i$; with coefficients or parameters $c_i$:

$$\Phi = c_i \phi_i \tag{10}$$

$$\vec{A} = c_i \vec{a}_i \tag{11}$$

The associated electric fields and magnetic induction fields, $$\vec{E} = c_i \vec{e}_i \tag{12}$$

$$\vec{B} = c_i \vec{b}_i \tag{13}$$

are functions of derivatives of the potentials, given by the usual expressions $$\vec{e}_i = -\vec{\nabla}\phi_i - \partial_t \vec{a}_i \tag{14}$$

$$\vec{b}_i = \vec{\nabla} \times \vec{a}_i \tag{15}$$

The associated electric displacement fields and magnetic fields, $$\vec{D} = c_i \vec{d}_i \tag{16}$$

$$\vec{H} = c_i \vec{h}_i \tag{17}$$

are functions of the electric fields and magnetic induction fields, and of the medium; for a linearly polarizable medium, they are related by $$\vec{d}_i = \epsilon \vec{e}_i \tag{18}$$

$$\vec{h}_i = 1/\mu \vec{b}_i \tag{19}$$

The charge and current physical source $\rho$ and $\vec{J}$ in the simulation that is not accounted for by the polarization of the medium is also represented as a linear combination of basis functions. This source is often called "free" source; here we are usually if not always talking about free source when we use the phrase "physical source," so for brevity we often do not use the word "free". Note that this source is physical and not virtual, but note that the continuous potential associated with a physical source generally uses virtual sources in its definition according to the method of matching boundary potential values described above. We write this physical free source as a linear combination of source basis functions $\rho_i$ and $\vec{j}_i$:

$$\rho = c_i \rho_i \tag{20}$$

$$\vec{J} = c_i \vec{j}_i \tag{21}$$

We choose the potential $a_i$ in the geometric algebra of space-time to be related to the physical source $j_i$ at all non-boundary points by $$\Box^2 a_i = c_i \tag{22}$$

where $\Box$ is the space-time vector derivative of geomeric algebra, and $\Box^2$ is the d'Alembertian operator. This may be alternatively written, using the geometric or vector algebra of space and time (and using units such that $\epsilon_0 = 1 = \mu_0 = c$ for simplicity), as $$(\partial_t^2 - \vec{\nabla}^2)\phi_i = \rho_i \tag{23}$$

$$(\partial_t^2 - \vec{\nabla}^2)\vec{a}_i = \vec{j}_i \tag{24}$$

For basis functions $\phi_i$, $\vec{a}_i$, etc. that are not associated with any physical source, we have $\rho_i = 0 = \vec{j}_i$.

From the last two equations and definitions above for $\vec{d}_i$ and $\vec{h}_i$, one can show that Maxwell's homogeneous equations in polarizable media are obeyed at all non-boundary points:

$$\vec{\nabla} \cdot \vec{d}_i = \rho_i \tag{25}$$

$$-\partial_t \vec{d}_i + \vec{\nabla} \times \vec{h}_i = \vec{j}_i \tag{26}$$

We now have two types of basis functions: those associated with physical sources (and using virtual sources to define associated continuous potentials), and those not associated with any physical sources (and also using virtual sources to define associated continuous potentials). Note that the functions not associated with any physical sources are always associated with a potential pattern on the boundary, typically a localized boundary region with large potential values as in FIG. 12; we therefore may call these "boundary" basis functions. We may distinguish these two types of basis functions by using the dummy index "p" to refer to coefficients or basis functions associated with physical sources, and the dummy index "b" to refer to coefficients or basis functions associated with peaked potential values on a boundary.

The only physical source charge $\rho$ and current $\vec{J}$ in this example is the one external dipole (the large red dot in the figures of the previous section). For notational simplicity and convenience, we index this physical source with i=p=0.

The last step is to choose the potential on the boundary, by appropriately choosing the parameters $c_b$ of these basis functions associated with peaked potentials on a boundary, so that the action is minimized with variation of the potential.

First I derive the main equation that is used in this computational method. The basic theory is developed in Doran and Lasenby. I take the geometric algebraic equation (12.129) of Doran and Lasenby, use the Lagrangian for electrodynamics given by equation (13.27) but modified to apply to polarizable media, convert the volume integral to a surface integral. Below I rewrite some of this, including the result, in terms of vector algebra so that most of this is understandable by the majority of readers. The new method claimed in this patent applies this resulting equation, enclosed in a frame below, to computer calculations of electromagnetic field values.

Of course there are many different ways to express this result, and one skilled in the arts of applied geometric algebra, electrodynamics, and computer programming will be able to see that substantially the same result and method can be expressed in many different ways that may at first appear very different. But further, one skilled in the art will also see that this method is new, useful, and has never been used before.

The standard electromagnetic action for fields and sources in polarizable media may be written using geometric algebra as the integral over the space-time volume $\Omega$ as $$S = \int \left(\frac{1}{2} F * G - A * J\right) d\Omega \quad (27)$$

where * is the scalar product and F is constructed from $\vec{E}$ and $\vec{B}$ and G is constructed from $\vec{D}$ and $\vec{H}$ as defined in the notes at the end of this application (and as used in Jackson, 2nd ed., p. 566), or equivalently using vector algebra as the integral over the spatial volume V and time t, $$S = \int \left(\frac{1}{2}(\vec{E}\cdot\vec{D} - \vec{B}\cdot\vec{H}) - (\phi\rho - \vec{A}\cdot\vec{J})\right) dV dt \quad (28)$$

The electrodynamic fields—the potentials $\Phi$ and $\vec{A}$ and the linear functions $\vec{E}$, $\vec{B}$, $\vec{D}$, and $\vec{H}$ of the potentials and their derivatives—are represented as linear combinations of basis functions with coefficients $c_i$, as given above.

We set the variation in S to zero with variation of the field parameters $c_b$ that are not associated with any physical source:

$$0 = \partial_{c_b} S \quad (29)$$

After some calculation, one can show that this may be simplified to the equivalent equation $$0 = \int \left(\phi_b (\vec{\nabla} \cdot \vec{d}_j - \rho_j) + \vec{a}_b \cdot (\partial_t \vec{d}_j - \vec{\nabla} \times \vec{h}_j + \vec{j}_j)\right) dV dt c_j \quad (30)$$

This is automatically satisfied at all non-boundary points because the two inner parenthesis are each identically zero, for each value of the index j, by our construction of the basis functions as follows from (25) and (26).

This leaves only the volume integral over points on (and very very near) boundary points. After converting the volume integral to a surface integral with surface normal $\hat{n}$ and surface differential $d\Sigma$, and assuming harmonic time dependence with the usual complex number representation and conventions, and no contributions from the distant past or future, this integral is $$0 = \int \left(\phi_b(\hat{n}\cdot\Delta\vec{d}_j - \sigma_j) + \vec{a}_b \cdot (-\hat{n}\times\Delta\vec{h}_j + \vec{\kappa}_j)\right) d\sum c_j$$

where b ranges over values that index a complete set of potential values on the boundary, $\phi_b$ are scalar potential basis functions, $\vec{a}_b$ are vector potential basis functions, j is summed over both boundary and physical source basis functions, $\vec{d}_j$ are electric displacement basis functions, $\vec{h}_j$ are magnetic field basis functions, $\Delta\vec{d}_j$ and $\Delta\vec{h}_j$ are changes in the indicated fields across the boundary, $\sigma_j$ and $\vec{\kappa}_j$ are physical surface charge and current density basis functions (equal to integrals of the volume charge and current densities $\rho_j$ and $\vec{j}_j$ for a very short distance perpendicular to the boundary) for free physical charge and current that are not associated with the polarization of the media, and $c_j$ are complex-valued field basis function parameters. The "Einstein convention" of sums over repeated indices is used. The computer calculation of electromagnetic fields by choosing basis function parameters $c_j$ so that they satisfy this last equation is a central idea of the method of least action of this provisional patent application.

It may, however, be possible to write an equivalent equation or describe an equivalent method that at first look appears to be different but actually is not; for example, the scalar potential might be rewritten in terms of the vector potential using the Lorenz condition, and the integral transformed using integration by parts or other techniques. This method includes such equivalent expressions, while prior art is not such an equivalent expression.

Also, multiple steps in the description above, such as finding continuous basis functions and then extremizing the action on boundaries, may be combined into a smaller number of steps. The steps described here are itemized largely for clarity; the method may be applied in ways that are less clear but with possible advantages such as faster computation.

It may be convenient or helpful to explicitly divide the sum over j in the last equation into one sum over boundary basis functions indexed by b' and one over physical source basis functions indexed by p. This gives $$\int \left(\phi_b(\hat{n}\cdot\Delta\vec{d}_{b'} - \sigma_{b'}) + \vec{a}_b \cdot (-\hat{n}\times\Delta\vec{h}_{b'} + \vec{\kappa}_{b'})\right) d\sum c_{b'} + \quad (32)$$
$$\int \left(\phi_b(\hat{n}\cdot\Delta\vec{d}_p - \sigma_p) + \vec{a}_b \cdot (-\hat{n}\times\Delta\vec{h}_p + \vec{\kappa}_p)\right) d\sum c_p = 0$$

This is now clearly a matrix equation in the form $M_{b,b'}c_{b'} = N_{b,p}c_p$ which can be solved for the boundary basis parameters $c_b$ in terms of the physical source basis parameters $c_p$. If the physical source basis parameters $c_p$ are known and specified, the problem is solved by solving this matrix equation; if some or all of the physical source basis parameters $c_p$, are induced and constrained by physical rules such as Ohm's law, we can use the method of least squared response error to write r equations associated with these r such unknowns, and then simultaneously solve the resulting equations (48) and the equations of (32) for all parameters $c_b$ and all of the unknown parameters $c_p$.

In this example all surface source densities $\sigma_j$ and $\vec{\kappa}_j$ are zero, and the only index value for p is p=0. We can then write this last equation $$\int \left(\phi_b(\hat{n}\cdot\Delta\vec{d}_{b'}) - \vec{a}_b \cdot (\hat{n}\times\Delta\vec{h}_{b'})\right) d\sum c_{b'} = \quad (33)$$
$$-\int \left(\phi_b(\hat{n}\cdot\Delta\vec{d}_0) - \vec{a}_b \cdot (\hat{n}\times\Delta\vec{h}_0)\right) d\sum c_0$$

It may be convenient to define the matrix and array elements $$M_{b,b'} = \int \left(\phi_b(\hat{n}\cdot\Delta\vec{d}_{b'}) - \vec{a}_b \cdot (\hat{n}\times\Delta\vec{h}_{b'})\right) d\sum \quad (34)$$

$$B_b = -\int \left(\phi_b(\hat{n}\cdot\Delta\vec{d}_0) - \vec{a}_b \cdot (\hat{n}\times\Delta\vec{h}_0)\right) d\sum c_0 \quad (35)$$

so that this last equation can be written as the explicit matrix equation $$M_{bb}c_b = B_b \qquad (36)$$

This is the equation to be solved for the parameters $c_b$ to complete the specification of the simulation solution. Once these parameters are known, any desired electromagnetic quantity can be quickly calculated in terms of the fields and sources written as known linear combinations of the basis functions.

Each matrix element may be calculated numerically. In this example, the values of the continuous basis potentials and associated fields may be calculated using standard dipole expressions for the discontinuous fields and the linear transformation matrix from discontinuous to continuous fields.

The integral over the spherical boundary may be approximated in various ways. For example, the integration surface might be approximated by the triangular mesh that was used to help define the basis function dipoles, and then the integral over each triangle might be approximated as the value of the integrand at the triangle centroid, with $\hat{n}$ equal to the unit normal to the triangle, times the area $d\Sigma$ of the flat triangle, or as the average integrand value evaluated at the three vertices, with $\hat{n}$ equal to the unit normal to the sphere at the vertex, times the estimated area of the associated curved boundary. Or the integral might be approximated as a sum of the value of the integrand at each vertex, with $\hat{n}$ equal to given normal data or to an appropriately weighted sum of normals to connected triangles, times some appropriate associated area such as one third of the area of all triangles sharing the vertex.

Figure 14:
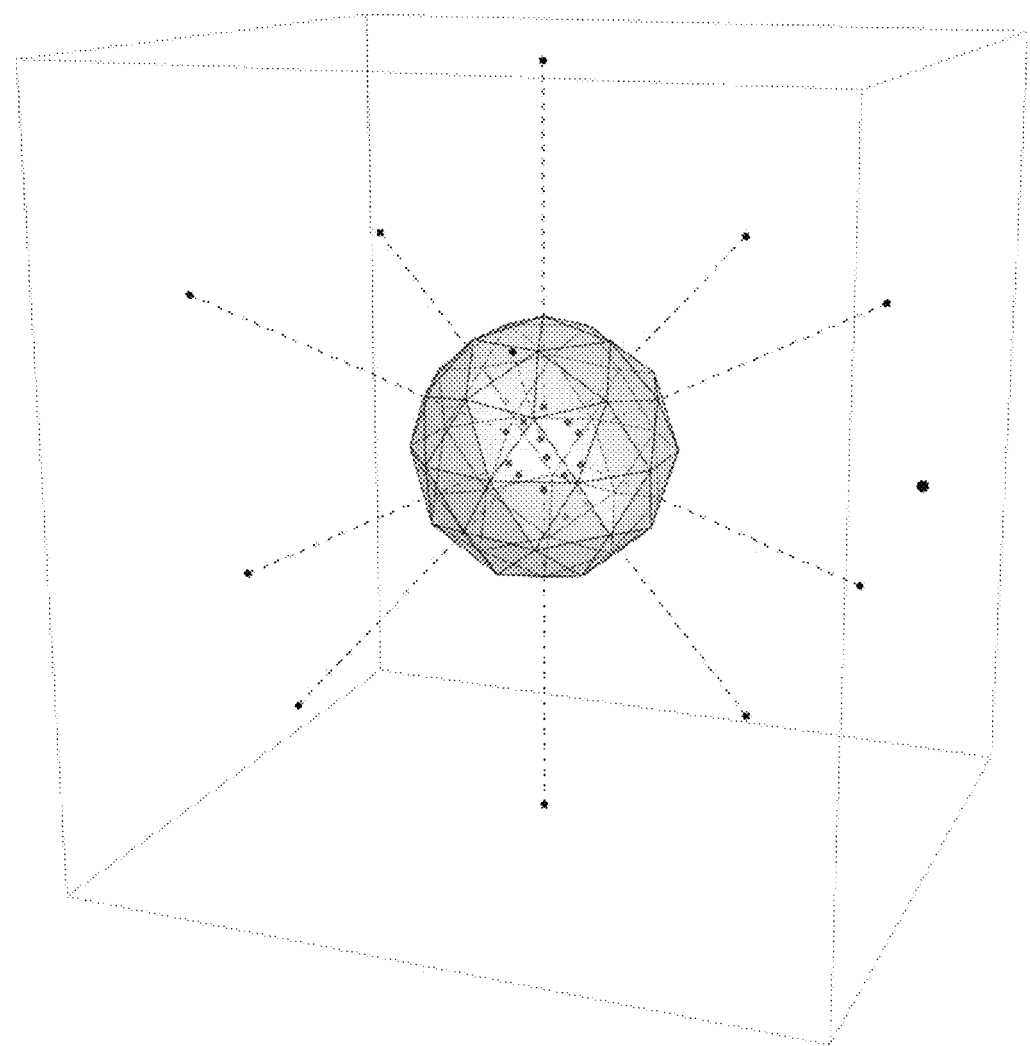
FIG. 14 shows a triangular mesh.

Another possibility for numerical evaluation of the boundary integral is to use a different, generally finer, triangular mesh than that used to define the dipole locations. In this example, this could be done by replacing each of the triangles of the icosahedron triangles with four triangles, with new vertices on the surface of the sphere near the midpoints of the original edges. These smaller triangles can be used in any of various ways to help numerically evaluate the boundary integral. This finer triangular mesh is illustrated in FIG. 14. This finer mesh is used in the numerical implementation example that follows.

In my method, such integrals may be relatively insensitive to the method and crudeness of the approximation to the integral used, compared with prior art.

Description of the Method of Least Squared Response Error by Way of Illustration with a Simple Example Introduction The method of least squared response error is illustrated in this section. This method may be used with or without use of the method of least action, depending on details of the physical situation being simulated.

For example, we might have wire-like or sheet-like electrically conductive or electrically or magnetically polarizable objects—that is, with one or two dimensions that are negligible (both relative to the vertex spacing, and relative to the wavelength of radiation in the surrounding medium). In this case we can a) define basis functions for real physical charge and current source that is either specified or induced in these objects by the net electromagnetic field, b) write the total source of these objects as a linear combination of these basis functions with parameter coefficients, and then c) constrain the coefficients by minimizing the integrated squared error between
  i) the induced source and
  ii) the value of the induced source according to the assumed rule giving this source as a function of the net field.

We can then write the equations for minimizing the action with variation of continuous potential parameters as in the previous section, except that the source parameters $c_p$ now consist of a set of quantities that are constrained as described in the previous paragraph. The equations for minimizing the action plus the equations for minimizing the integrated squared error in the rule for induced sources can be solved simultaneously for all unknown parameters $c_b$ and $c_p$.

As an example, I now develop details of a possible model for minimizing the integrated squared error for electrically conductive wires.

Figure 15:
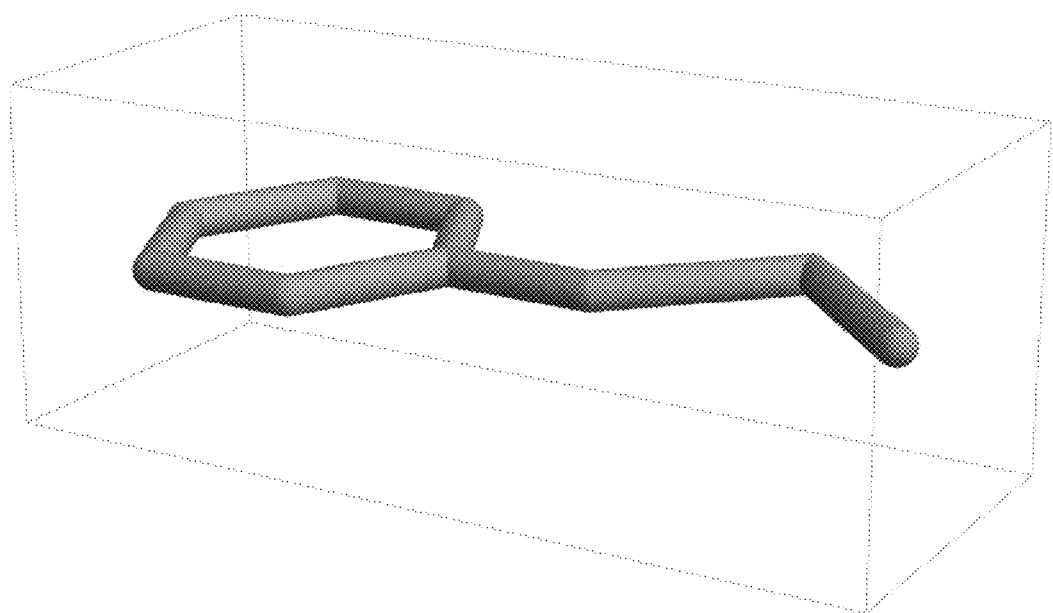
FIG. 15 shows a representation of a wire network.

In this example we consider an arbitrary connected network of thin wires, consisting of any desired topology of loops and free ends. We model this network as straight wire segments between vertices. We index the straight segments with i. FIG. 15 below shows a representative wire network. The wires are represented as thick lines for clarity; the model may be good, with useful numerical results, if both the length and the thickness of the wires is much less than the wavelength of radiation in the surrounding medium.

There are many possible ways to choose basis functions. One choice for electrically conductive thin objects that is a compromise between complexity and realism is to require that each basis function
a) is continuous,
b) has a charge density that is a linear function of position on each straight wire segment (or each flat triangular sheet segment),
c) is zero at the boundary points of the domain of the basis function, and
d) has a current that obeys charge conservation.

This is described in more detail for thin wires in the following sections.

For magnetically polarizable thin objects, we may choose each basis function so that the magnetization density is continuous, is a linear function of position on each straight wire segment or flat triangular sheet segment, is zero at the boundary points of the domain of the basis function, and is constructed of conserved electric current. This generally results in electric current distributions that are more complex; for example, for thin sheets, the result can be written as two distributions of current tangential to the surface, on each side of the sheet and separated by the very small sheet thickness, plus a distribution of current perpendicular to the sheet. Magnetic charge might be used to create simpler current distributions with the same resulting fields, but then the potential is more complex (6 degrees of freedom instead of 3).

Basis Charge Functions

We define one "half-basis charge function" associated with each vertex. Each of these functions equals one at the identified vertex, and changes linearly to zero at each adjacent vertex.

Figure 16:
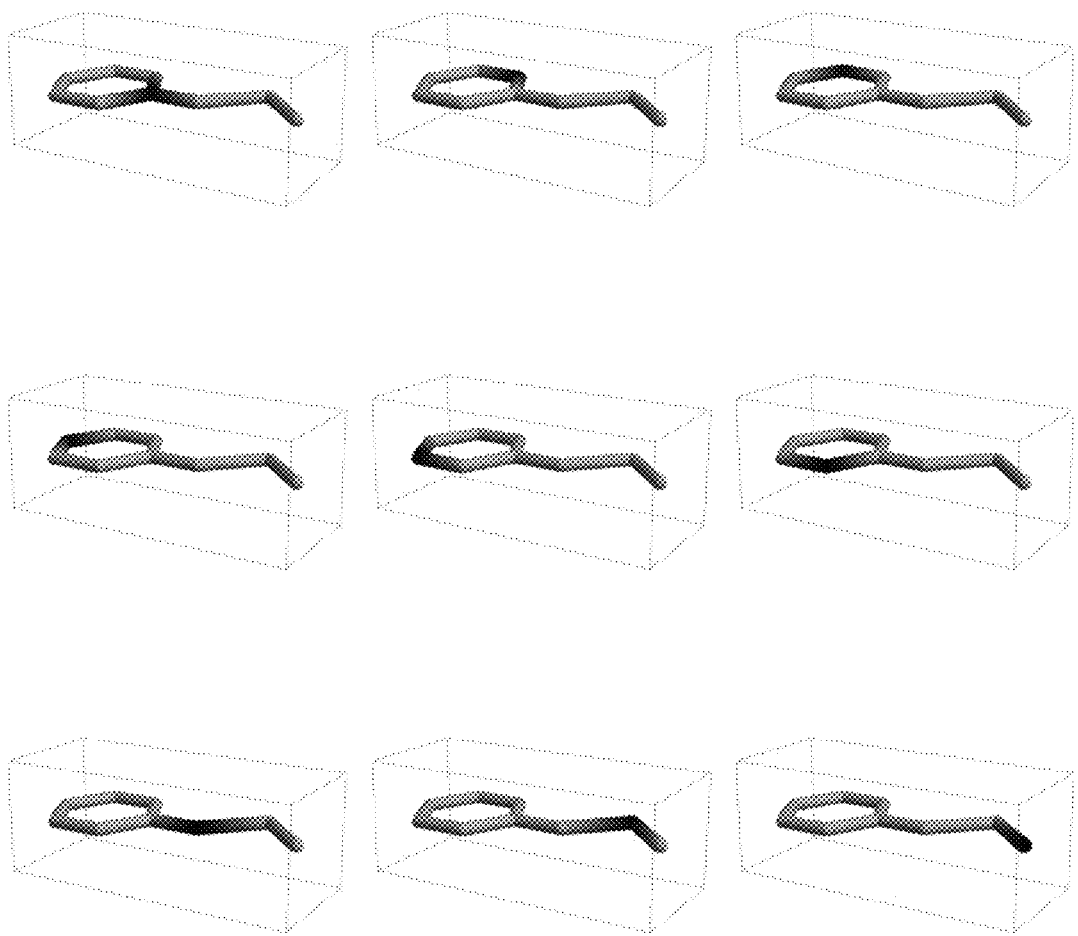
FIG. 16 shows an example of half-basis charge functions.

All half-basis charge functions for this simple example are represented in FIG. 16, below.

Figure 17:
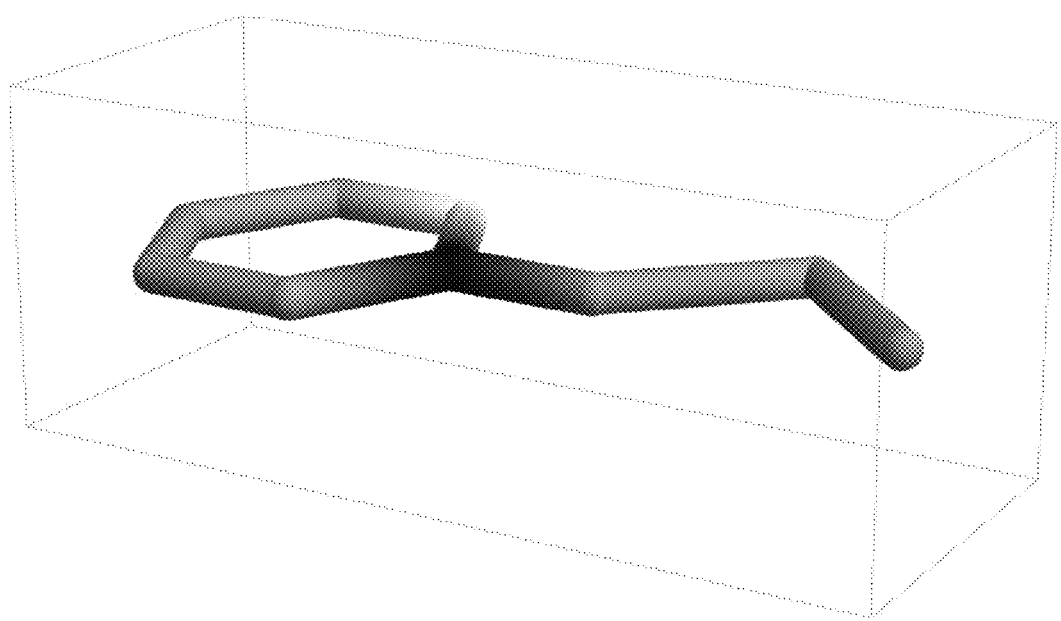
FIG. 17 shows an example of a basis charge function.

A basis charge function is made up of one half-basis charge function, normalized by division by the total length of associated segments, and the negative of an adjacent half-basis charge function, also normalized. One representative basis charge function is represented in FIG. 17, next, with positive charge represented as red and negative charge represented as green. This representative function is the result of combining the first two half-basis charge functions above.

For sheets, we may follow a similar procedure. The sheet-like material is represented by a set of triangles connected at their edges. Each basis function is associated with one pair of adjacent vertices or equivalently with one edge. One of these two vertices is associated with a positive half-basis charge function and one with a negative half-basis function. Each half-basis function has maximum magnitude at the associated vertex and ramps linearly within each connected triangle to zero at each nearest-neighbor vertex. The magnitudes of the total charge for each half-basis function is the same. Complete charge basis functions are constructed of one normalized half-basis charge function associated with one vertex, and the negative of one normalized half-basis charge function associated with a nearest neighbor vertex.

Figure 18:
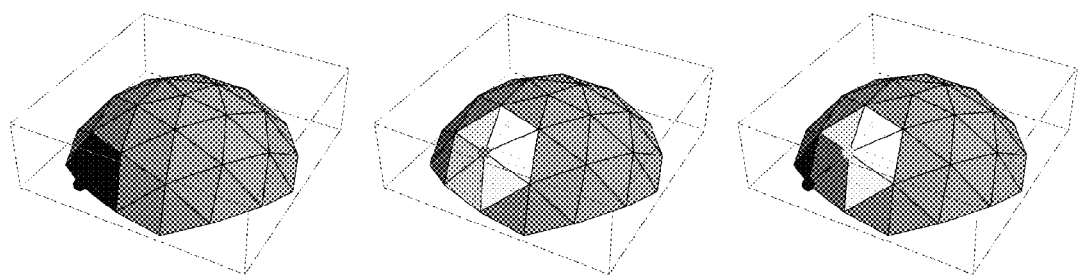
FIG. 18 shows an example of the domains of two half-basis functions for a thin dome-shaped sheet.

FIG. 18 below illustrates of an example of the domains of two half-basis functions for a thin dome-shaped sheet. The two vertices associated with the positive and negative half-basis functions making up one basis function are colored magenta and cyan. In the first figure, the magenta vertex is shown with red associated triangles, and in the second figure the cyan vertex is shown with green associated triangles. The domain of the full basis function constructed from these two half-basis functions is shown in the third figure as red, yellow, and green, with triangles that are common to the positive and negative half-basis domains colored yellow. The charge densities for each half-basis charge function vary linearly from the vertex to the perimeter of the associated domain, as in the wires above, but unlike figures for wires above, the colors are not correspondingly graded due to difficulty constructing graphics with graded colors.

Complete Charge and Current Basis Functions

We define the charge density to vary linearly on each straight segment as described in the previous section.

Figure 19:
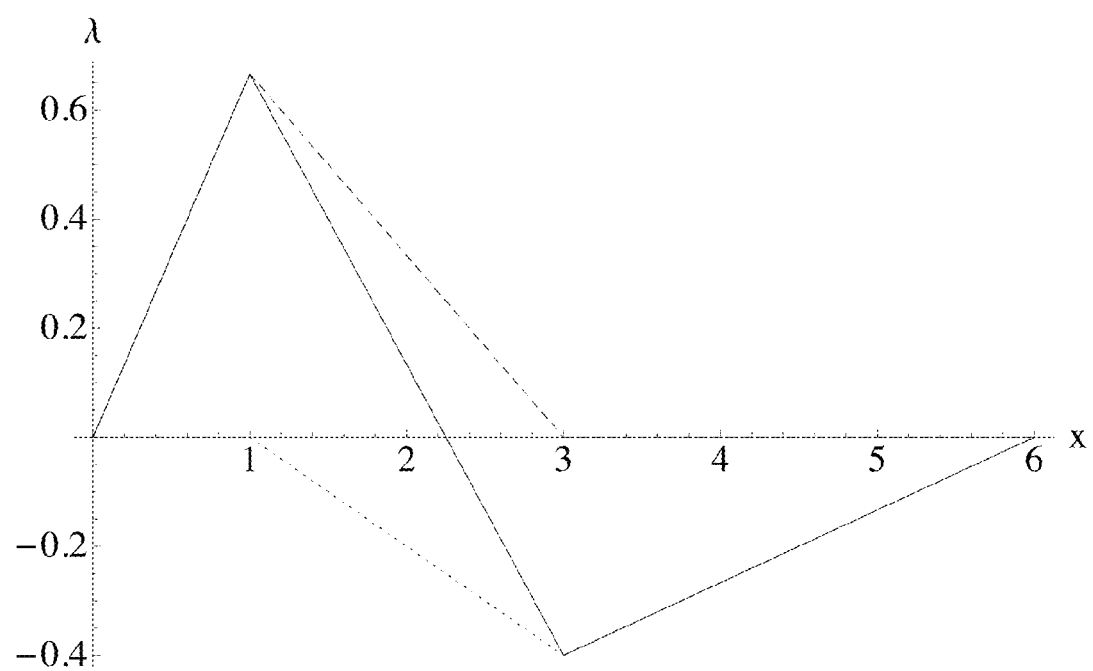
FIG. 19 shows the total basis line charge density from three charges.

For example, for a straight wire segment of length 2 with an adjacent segment to its left with length 1 and adjacent segment to its right with length 3, the left half-basis, right half-basis, and total basis line charge densities are represented in the following plot, FIG. 19, by dashed red, dashed green, and solid gray lines, respectively (this example is chosen for numerical simplicity, and does not correspond exactly to any of the basis functions in the wire network of this example):

q1L=(2/3)x;
q1R=(2/3)(3−x)/2;
q2L=(2/5)(x−1)/2;
q2R=(2/5)(6−x)/3;
q1=q1L;
q2=q1R−q2L;
q3=−q2R;

We define the current $I_i$ to be that current required by continuity (charge conservation):

$$0=\partial_t \lambda_i[x,t]+\partial_x I_i[x,t] \quad (37)$$

or, using the usual complex representation of time dependence so that, for example, $\lambda_i[x, t]=\lambda_i[x]\mathrm{Exp}[-i\omega t]$, we have $$0=-\mathbf{i}\,\omega\lambda_i[x]+\partial_x I_i[x,t] \quad (38)$$

Figure 20:
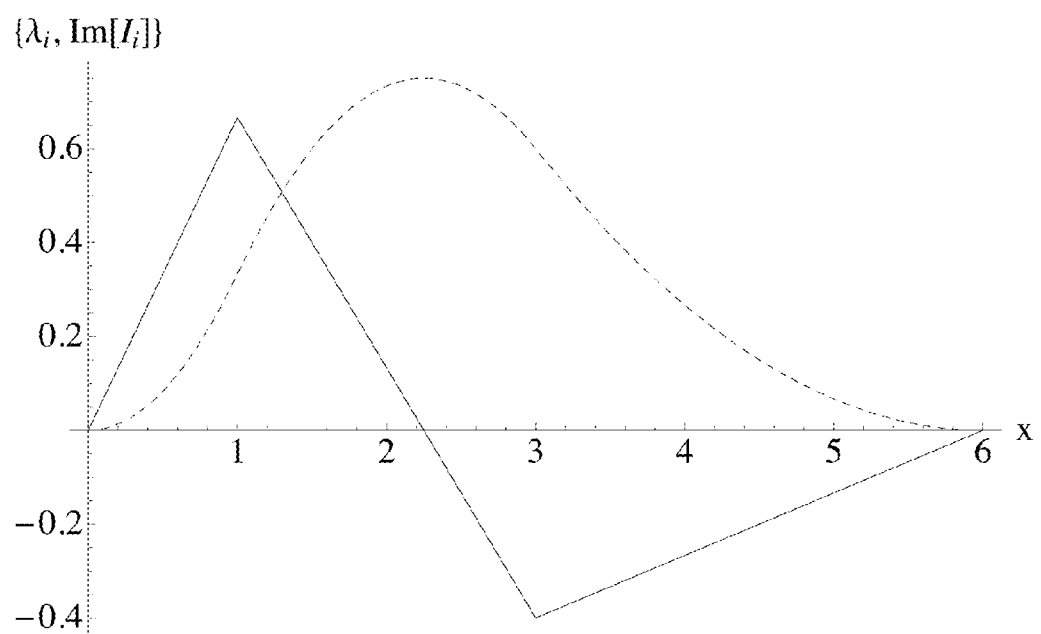
FIG. 20 shows the current required to satisfy the continuity equation for the charge density of FIG. 19.

The resulting current for the example line charge density plotted above is plotted in FIG. 20 below:

$I1=(\mathbf{i}\,\omega)\mathrm{Integrate}[q1,\{x,0,x1\}]$

⅓$\mathbf{i}\,x1^2\omega$ $I2=((I1/\cdot\{x1\to 1\})+(\mathbf{i}\,\omega)\mathrm{Integrate}[q2,\{x,1,x1\}])//\mathrm{Simplify}$ −1/15$\mathbf{i}\,(9-18x1+4x1^2)\omega$ $I3=((I2/\cdot\{x1\to 3\})+(\mathbf{i}\,\omega)\mathrm{Integrate}[q3,\{x,3,x1\}])//\mathrm{Simplify}$ 1/15$\mathbf{i}\,(-6+x1)^2\omega$ The charge-current source $j_i$ is the pair of quantities, line charge density $\lambda_i$ and vector current $\vec{I}_i=\hat{u}I_i$:

$$j_i=\{\lambda_i,\vec{I}_i\} \quad (39)$$

where $\hat{u}$ is a unit vector tangential to the wire.

Alternatively, using geometric algebra and projecting onto an inertial reference frame identified by the time-like spacetime frame vector $\gamma_0$, we write the projected charge-current source $\gamma_0 j_i$ as the sum of the scalar line charge density and the vector current, $$\gamma_0 j_i=\lambda_i-\vec{I}_i \quad (40)$$

The electric field at any point in space can be easily expressed and calculated using an appropriate integral and Green function. For points inside any particular straight wire segment, we may use a model in which the charge element for a bit of wire with length dl is a spherical shell of charge with magnitude $dq_i=\lambda_i\,dl$. Then, with the very good approximation that we can neglect higher order effects, the total field (electric and magnetic) at any point p on the axis of a wire segment with radius r0, due to that same wire segment, is obtained by integrating the green function times the source density along the wire segment, excluding segment points that are within distance r0 of the point p. This results in a closed expression that is convenient for calculation and can model real physical wires well, possibly with a slightly adjusted effective radius instead of the exact physical radius of the wire.

For example, in the simple case of $\omega=0$, the greens function is $$g[\vec{R}]=\frac{1}{4\pi R^2}\hat{R} \quad (41)$$

We can calculate the field $F=\epsilon_0\,\vec{E}+\mathrm{III}(1/c)\,\vec{B}/\mu_0$ at distance x1 on a wire segment of length L and radius r0, due to a current density on the same wire segment given by $\vec{I}[x]=i\omega(\lambda^0 x+\lambda^1 x^2/2)\,\hat{w}$ where $\hat{w}$ is a unit vector tangential to the wire, and a corresponding line charge density $\lambda[x]=(1/(i\Omega))\,\vec{\nabla}\cdot\vec{I}=\lambda^0+\lambda^1 x$. The required indefinite integral, written using geometric algebra (using standard notation as in Doran and Lasenby), is Integrate[$(\hat{w}/(4\pi(x-x1)^2))((\lambda[0]+\lambda[1]x)+\mathbf{i}\,\omega(\lambda[0]x+\lambda[1]x^2/2)\hat{w}))_{1,2},x$]

Simplifying the integrand in this special case and evaluating the required corresponding definite integral (from x=0 to x=x1−r0, and from x=x1+r0 to x=L), we have an electric-only field given by (Integrate[$1/(4\pi(x1-x)^2)(\lambda[0]+\lambda[1]x)$, {x, 0, x1−r0},
  Assumptions→{Element[{x,x1,r0,L}, Reals], x>0, x<x1, r0>0, r0<x1}]−
Integrate[$1/(4\pi(x-x1)^2)(\lambda[0]+\lambda[1]x)$, {x, x1+r0, L},
  Assumptions→{Element[{x, x1, r0, L}, Reals], x>0, x>x1, r0>0, r0<L−x1}])$\hat{w}$ $$\hat{u}\left(\frac{\left(\frac{1}{r0}-\frac{1}{x1}\right)\lambda[0]+\left(-1+\frac{x1}{r0}+\mathrm{Log}[r0]-\mathrm{Log}[x1]\right)\lambda[1]}{4\pi}-\right.$$

$$\left.\frac{r0(L-x1)\mathrm{Log}\left[\frac{L-x1}{r0}\right]\lambda[1]+(L-r0-x1)(\lambda[0]+x1\lambda[1])}{4\pi r0(L-x1)}\right)$$

%//Simplify $$\frac{1}{4\pi x1(-L+x1)}\hat{u}\Big(L x1\lambda[0]-2x1\lambda[0]+$$

$$Lx1\lambda[1]-2x1^2\lambda[1]+x1(-L+x1)\mathrm{Log}[r0]\lambda[1]+$$

$$(L-x1)x1\mathrm{Log}\left[\frac{L-x1}{r0}\right]\lambda[1]+Lx1\mathrm{Log}[x1]\lambda[1]-x1^2\mathrm{Log}[x1]\lambda[1]\Big)$$

This last expression gives the electric field at a point on the axis of the wire at a distance x1 from the starting end, due to a charge density varying linearly along the same wire, for frequency equal to zero.

The general case, for arbitrary frequency and at an arbitrary position inside or outside the wire, is somewhat more complex to write but again results in a closed symbolic expression that is convenient for making fast numerical calculations. Field values calculated in this way as functions of charge and current source are used as the field value in the response equation for the material.

For electrically conductive sheets, one possible type of charge-current density functions are constructed to have
a) zero charge and current at the outer or perimeter points of the domain of the basis function,
b) conserved current at all points, and
c) finite total curl when integrated along all interior edges.

More than one function might meet these criteria, but at least one simple such function is easy to write down and gives good numerical results (details are not copied here in the interest of simplicity and brevity).

For sheets we can evaluate any field or potential inside the sheet material as was done for wires, by modeling charge elements as spherical shells with diameter equal to the sheet thickness, so that there is no contribution from charge or current of shells whose centers are within one shell radius of the field evaluation point.

Modified Basis Function Set

The basis set described above has problems for frequencies equal to or near zero, because of the factor of $\omega$ in the current: At $\omega=0$, nonzero current cannot be represented by this set of basis functions, and also the set is no longer linearly independent. This makes a good solution impossible. We create a modified basis function set that does not have this problem as follows.

Figure 21:
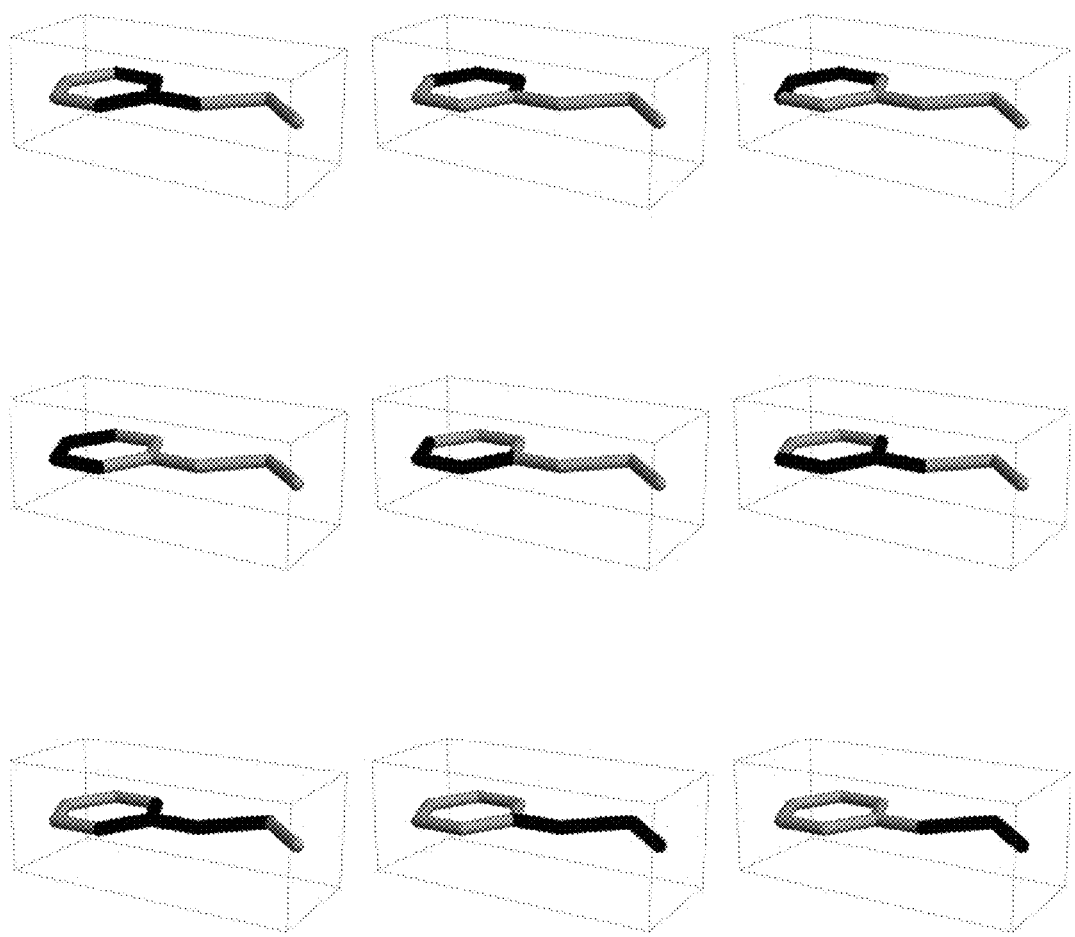
FIG. 21 shows a plot of domain (the parts of the wire network where the function is nonzero) of each unmodified basis function.

To explain the method, we first plot the domain (parts of the wire network where the function is nonzero) of each unmodified basis function. We plot these domains in yellow in FIG. 21 below; each yellow region corresponds to the combined red and green (positive and negative) regions of one charge basis function. For example, the first domain plotted in FIG. 21 represents the charge basis function of FIG. 17.

Now for every independent loop in the wire network—there is only one loop in this example—we choose one charge-current basis function with both vertices on the loop, and replace it with a sum of all basis functions (possibly with sign changes) along the closed loop, divided by $i\omega$. We choose the signs so that we get a current-only basis function, simply equal to a uniform current (either direction may be chosen) with zero charge density.

Figure 22:
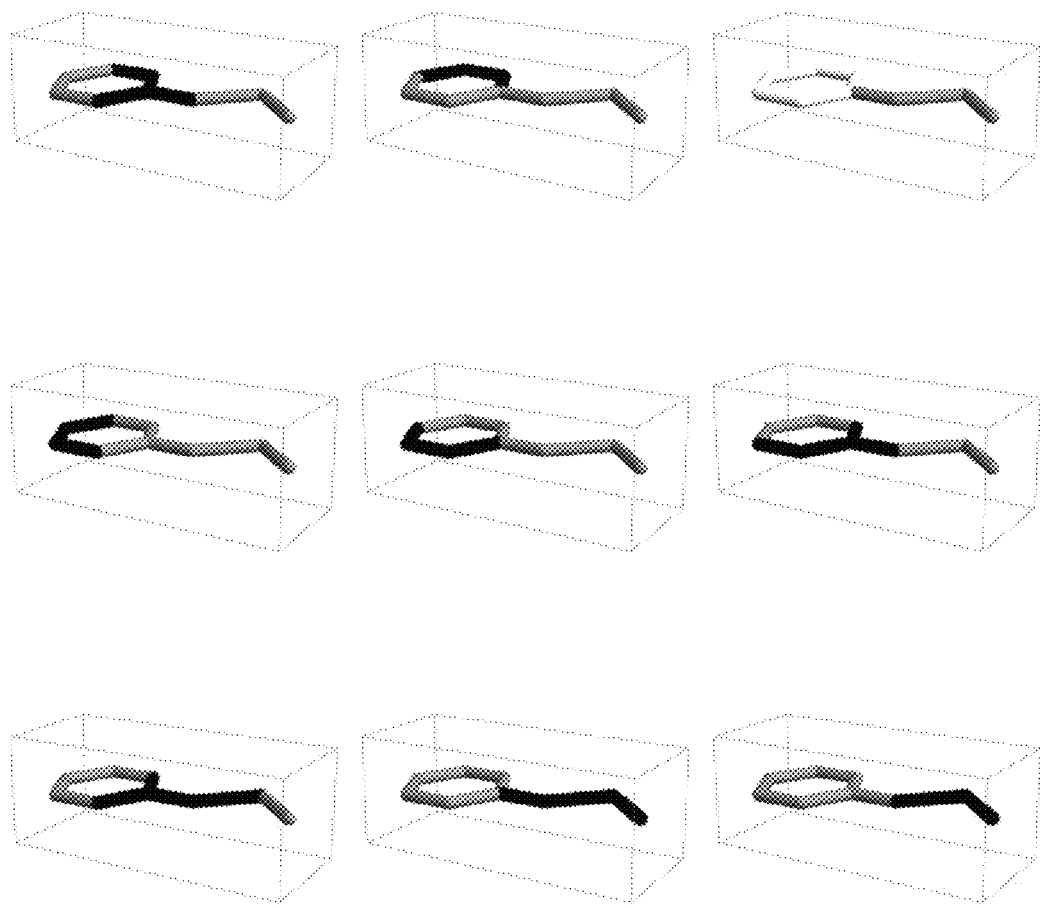
FIG. 22 shows a plot of another set of basis functions.

In this example, I have chosen the third charge-current basis function in the figure above, and plot the domain of this uniform current function with blue. FIG. 22 below represents this set of modified basis functions.

This method has been explained and illustrated with a simple example, but can be automated for arbitrarily complex wire or surface or sheet networks using ideas from combinatorics.

Minimization of the Integrated Squared Error

Now for each charge-current basis function $j_i$, we have an associated electromagnetic field at every point in space. For the basis functions described here, these field expressions can be calculated exactly symbolically with any one of several acceptable models. One especially convenient and easily calculated model is to treat each charge element $dq_i = \lambda_i \, dl$, where $\lambda_i$ is the line charge density and dl is the length of a very short piece of a straight wire segment, as a spherical shell of charge $dq_i$ with radius equal to the wire radius and constrained to move with its center on the wire line segment, and that responds to electric fields as if all of its charge were a point charge at its center. The response of such a charge element and the field that it creates can be easily written as relatively simple expressions, using the approximation that the sphere's radius is very small compared with the wavelength of radiation in the surrounding medium. But for clarity and simplicity we do not write out the associated exact expressions here, but rather will just write the electric field function symbolically as $\vec{E}[j_i]$. For clearer notation, we often omit notation for dependence on position $\vec{r}$, or when needed may include it using standard Mathematica notation as in $\vec{E}[j_i][\vec{r}]$.

We use the notation and ideas of the method of least action. Constraints may relate electric current to electric field, electric polarization to electric field, or magnetic polarization to magnetic field. Also, we may have specified current $I_{spec}$ on any part or piece of a wire network. In this example, we are illustrating this method with constraints between electric current and electric field.

The total electric field is $$\vec{E} = c_i \vec{e}_i \qquad (42)$$

where the sum is over all basis functions, both those for which there is and those for which there is not a physical source.

Ohm's "law" is a phenomenological statement that the induced current $\vec{I}_{indu}$ in a conductor is linearly proportional to the electric field. The total current $\vec{I} = c_i \vec{I}_i$ is always equal to the sum over basis functions with coefficients $c_i$. It equals the current part of the total charge-current source, $J = c_i j_i$. It may also always be written as the sum $\vec{I} = \vec{I}_{indu} + \vec{I}_{spec}$ of the induced current plus specified current. The specified current is generally not expanded in terms of the current basis functions, and we do not expand the specified current in this example. For example, we might define $\vec{I}_{spec}$ as a constant tangent vector on one straight wire segment, and zero everywhere else. For a wire segment with unit tangent vector $\hat{u}$, and recalling that we are writing $j_i = \{\lambda_i, \vec{I}_i\}$, we write Ohm's law as $$R[\vec{r}] \vec{I}_{indu}[\vec{r}] = \hat{u}\hat{u} \cdot \vec{E}[\vec{r}] \qquad (43)$$

or equivalently $$R[\vec{r}](c_p \vec{I}_p[\vec{r}] - \vec{I}_{spec}[\vec{r}]) = \hat{u}\hat{u} \cdot (c_i \vec{e}_i[\vec{r}]) \qquad (44)$$

where $\vec{r}$ is any point on the wire network, $R[\vec{r}]$ is the resistance per unit length of the wire, the sum over p is over only physical source and not boundary basis functions, the sum over i is over all basis functions, and $\vec{I}_{spec}[\vec{r}]$ is an optional specified current. $\vec{I}_{spec}[\vec{r}]$ may be used to model specified or given or exogenous current sources (i.e., with values given as fixed input data to the simulation, representing for example batteries), or specified or given or exogenous voltage sources $V_{spec}$ defined, for example, between two vertices of one wire segment, to be equal to the value of $\vec{I}_{spec}$ on the wire segment between the vertices of the segment divided by the integral of $R[\vec{r}]$ along the segment.

We define the error to be the difference between the two sides of the last equation, and define K, the integral of the squared error, as $$K = \int \left| R[\vec{r}](\vec{I}_p[\vec{r}]c_p - \vec{I}_{spec}[\vec{r}]) - \hat{u}\hat{u} \cdot \vec{e}_i[\vec{r}]c_i \right|^2 dl \qquad (45)$$

where the integral is along all wires of the problem, and the squared magnitude means the inner product between the argument, a vector, and the complex conjugate of the argument.

We require that the coefficients $c_p$ that are not specified should be chosen so that this integrated squared error is at a minimum:

$$0 = \partial_{c_p} K = \int (R\vec{I}_p - \hat{u}\hat{u}\cdot\vec{e}_p)^* \cdot (R(\vec{I}_{p'}c_{p'} - \vec{I}_{spec}) - \hat{u}\hat{u}\cdot\vec{e}_k c_k) dl \quad (46)$$

$$= \int (R\vec{I}_p - \hat{u}\hat{u}\cdot\vec{e}_p)^* \cdot (R(\overline{I_{p'}}c_{p'} - \vec{I}_{spec}) - \hat{u}\hat{u}\cdot\vec{e}_{p'}c_{p'} - \hat{u}\hat{u}\cdot\vec{e}_b c_b) dl$$

Rearranging slightly, this is $$0 = \int (R\vec{I}_p - \hat{u}\hat{u}\cdot\vec{e}_p)^* \cdot ((R\vec{I}_{p'} - \hat{u}\hat{u}\cdot\vec{e}_{p'})c_{p'} - R\vec{I}_{spec} - \hat{u}\hat{u}\cdot\vec{e}_b\cdot c_b) dl \quad (47)$$

Factoring out the parameters $c_{p'}$ and $c_b$ and $\vec{I}_{spec}$, we may write this as $$\int (R\vec{I}_p - \hat{u}\hat{u}\cdot\vec{e}_p)^* \cdot (R\vec{I}_{p'} - \hat{u}\hat{u}\cdot\vec{e}_{p'}) dl \setminus c_{p'} - \quad (48)$$

$$\int (R\vec{I}_p - \hat{u}\hat{u}\cdot\vec{e}_p)^* \cdot (\hat{u}\hat{u}\cdot\vec{e}_p)^* \cdot (\hat{u}\hat{u}\cdot\vec{e}_p)^* \cdot (\hat{u}\hat{u}\cdot\vec{e}_b) dl c_b -$$

$$\int (R\vec{I}_p - \hat{u}\hat{u}\cdot\vec{e}_p)^* \cdot (R\vec{I}_{spec}) dl = 0$$

Writing $M_{p,p'}$, $N_{p,p'}$, and $Q_p$ for the integrals, we may alternatively write this as $$M_{p,p'}c_{p'} - N_{p,b}c_b - Q_p = 0 \quad (49)$$

This is a set of equation indexed by p, with p ranging over values for which $c_p$ is not specified. p' in the sum ranges over all physical source index values, both unknowns and specified; b ranges over all indices for boundary function parameters. If there are no bounded regions of uniform responsivity, there are no unknowns $c_b$ and these equations can be solved for the unknowns $c_{p'}$ in terms of the known $c_{p'}$ and $\vec{I}_{spec}$. If there are bounded regions of uniform responsivity, the associated equations (31) from the method of leas action and the equations (47) above are solved simultaneously for the unknown $c_{p'}$ and $C_b$.

Numerical values of the integrals can be approximated by evaluating the integrand at one or more discrete points on (i.e., inside) the thin wire or sheet, weighting by associated areas, and summing.

These equations, or similar ones corresponding to sheets instead of wires, or electrically or magnetically polarizable, or some combination, can be used with the equations resulting from extremization of the electromagnetic action to solve problems that involve both thin objects like wires or sheets, and thick or bulk regions that are linearly responsive (that is, electrically or magnetically polarizable, with real or complex polarizabilities). In these sheet equations, $\hat{u}\hat{u}\cdot$ is everywhere replaced by a $\hat{u}\hat{u}\hat{}$ and $\hat{u}$ then represents a unit vector normal to the sheet.

In the simple case of negligible resistance so that we write R=0, and no bounded regions or parameters $c_b$, and no specified current $\vec{I}_{spec}$, this is $$\int (-\hat{u}\hat{u}\cdot\vec{e}_p)^* \cdot (-\hat{u}\hat{u}\cdot\vec{e}_{p'}) dl c_{p'} = 0 \quad (50)$$

This can be solve for unknown physical source parameters $c_{p'}$ in terms of the known physical source parameters.

In this simple case, prior art invariably follows the precedence of using the "reaction concept" to use the current function $\vec{I}_p$ as a "weight" or "testing" function, resulting in $$\int (\vec{I}_p)^* \cdot (-\hat{u}\hat{u}\cdot\vec{e}_{p'}) dl c_{p'} = 0 \quad (51)$$

These integrals are similar, but the differing first factor is significantly different and results in significantly different results: in particular, the factor $\hat{u}\hat{u}\cdot\vec{e}_p$ is nonzero at all points in space and is numerically significant at most points near the source, where the source equals zero, while $\vec{I}_p$ is nonzero only over the typically small domain of the particular current basis function.

The motivation for the prior method appears again to be blind adherence to Harrington's statements that an "acceptable" choice of "weight or test" functions are the current basis functions. While this may give acceptable and even good results, it does not minimize the integrated squared error and it gives measurably inferior results.

Other Examples of Applications and Variations of the Method

There are many other and particular cases to which these methods can be applied.

For example, we can have any number and topology of polarizable or conductive 3D bulk regions, with any number and topology of wires and sheets.

Most if not all methods of improvement used in prior art, such as fast multipole methods, can be used with the methods taught here.

A Flow Chart

Below is a flow chart summarizing a typical application of the method of least squares and the method of response error minimization in electromagnetic computer simulation problems. These methods may be used together or alone, with obvious modification of the steps below.

---

1. Represent the physical situation to be analyzed as space made up of piecewise uniform bulk regions of electromagnetically responsive material plus possibly wire-like and sheet-like electromagnetically responsive material with negligible thickness plus specified or incident applied fields or charge-current source values.

---

2. Create a corresponding quantitative computer model representing the geometry and electromagnetic properties of materials of the situation to be analyzed.

---

3. Model all charge-current source J that is not associated with the electromagnetic response of bulk regions as a parameterized function $J = c_i j_i$ with parameters $c_i$ and basis source functions $j_i = \{\rho_i, \vec{j_i}\}$. $j_i$ may be zero for many or most basis functions $a_i$ described below.

-continued

4. Define a continuous parameterized electromagnetic potential $A = c_i\, a_i$ for this geometry and these material properties as a sum of parameters $c_i$ time basis functions $a_i = \{\phi_i, \vec{\alpha}_i\}$ such that each $a_i$ is continuous and corresponds to a solution $\{\vec{e}_i, \vec{b}_i\}$ to Maxwell's equations within each piecewise uniform bulk region and is substantially continuous (all components except the normal part of $\vec{a}$) across boundaries between these regions, and such that the sum $c_i\, a_i$ can approximate any set of potential values on the boundaries that are of interest for the problem being simulated. The $a_i$ may be calculated as piecewise differentiable functions, with discontinuous derivatives at boundary points, from virtual charge-current sources using a retarded green function and from corresponding time-reversed virtual sources using an advanced green function. Every basis function is either a "boundary potential" or "physical source" basis function.

5. Compute the numerical values of the coefficients of the parameters $c_j$ in the equations
$$0 = (\partial / \partial c_b)\, S$$
that express the extremization of the electromagnetic action
$$S = \int ((1/2)\, (\vec{E}\cdot\vec{D} - \vec{B}\cdot\vec{H}) - (\phi\rho - \vec{A}\cdot\vec{J}))\, d\Omega$$
under variation of the boundary potential parameters $c_b$. These equations are generally first expanded and simplified, resulting in equation (31),
$$0 = \int (\phi_b\, (\hat{n}\cdot\Delta\vec{d}_j - \sigma_j) + \vec{a}_b\cdot(-\hat{n}\times\Delta\vec{h}_j + \vec{\kappa}_j))\, d\Sigma\, c_j$$
where $d\Sigma$ is a boundary element, $\hat{n}$ is a unit vector normal to the boundary and $\sigma$ and $\vec{\kappa}$ are surface charge and current densities obtained from $\rho$ and $\vec{J}$ by integrating for a small distance perpendicular to the boundary, and $\vec{D} = c_j\, \vec{d}_j$, $\vec{H} = c_j\, \vec{h}_j$, $\sigma = c_j\, \sigma_j$, and $\vec{\kappa} = c_j\, \vec{\kappa}_j$ are expansions corresponding to those for A and J.

6. If there are induced sources in thin (e.g., wire-like or sheet-like) objects, compute the numerical values of the coefficients of the parameters $c_p$ in the equations
$$0 = (\partial / \partial c_p)\, K$$
that express the minimization of the integral
$$K = \int |L[\{\rho, \vec{J}\}, \{\vec{E}, \vec{B}\}]|^2\, d\Omega$$
of the squared error in the linear responsivity relationship
$$L[\{\rho, \vec{J}\}, \{\vec{E}, \vec{B}\}] = 0.$$
under variation of the induced source parameters $d_j$. For example, for "Ohm's Law" for a wire with unit tangent vector $\hat{u}$, this is
$$L[\{\rho, \vec{J}\}, \{\vec{E}, \vec{B}\}] = R\, (\vec{J} - \vec{J}_{spec}) - \vec{E}\cdot\hat{u}\hat{u} = 0.$$
where R is a wire reistance per length and $\vec{J}_{spec}$ is an optional specified source current. As in the previous box, these equations are generally first expanded and simplified; for example, for Ohm's Law for a wire, this results in equation (47),
$$0 = \int (R\, \vec{I}_p - \hat{u}\hat{u}\cdot\vec{e}_p)^* \cdot ((R\, \vec{I}_{p'} - \hat{u}\hat{u}\cdot\vec{e}_{p'})\, c_{p'} - R\, \vec{I}_{spec} - \hat{u}\hat{u}\cdot\vec{e}_b\, c_b)\, dl$$

7. Simultaneously solve the equations
$$0 = (\partial / \partial c_p)\, S \text{ and } 0 = (\partial / \partial c_p)\, K$$
to give the unknown parameters $c_i$ as linear functions of any known or specified parameters.

8. Calculate any electromagnetic potential, field, or other quantiy needed for the analysis by using the parameters $c_i$ to calculate corresponding field values and source values.

Numerical Implementation Example of the Method of Least Action

Introduction

This section contains a complete numerical implementation of the example described in "Description by way of illustration with a simple example". This example illustrates the method of least squares; the method of error minimization is not illustrated in this example in the interest of brevity, but this example could be easily modified by one skilled in the relevant arts to also implement the method of error minimization, once taught as in other sections of this provisional application.

All units are SI, except that we sometimes use a unit of time such that c=1. For example, we have chosen frequency=0.1: in SI units, this is 0.1 (3 10^m/sec)/(1 m)=3 10^1/sec. For typical practical applications, we would use a common system of units, such as SI, for all quantities.

All necessary computer code is given so that a reader can reproduce or modify this example. The code in the following sections can be typed directly into Mathematica 7, with the only changes being that the expression PointElectricDipoleField is replaced by the expression SlowPointElectricDipoleField as given explicitly below, and also the expressions PointElectricDipolePotential, PointMagneticDipoleField and PointMagneticDipolePotential (defined in the external file PointSources) are also replaced by corresponding "Slow" expressions using the symbolic expressions given in this file to define these, as was done for SlowPointElectricDipoleField.

Geometry

This example has two bulk regions: the space or volume that is the interior of a sphere, and the space or volume that is exterior to the sphere. We will use the vertices of an icosahedron to help define locations of virtual point dipole sources that are used to define basis potentials. The icosahedron has no significance other than being a convenient way to specify these locations.

We choose the virtual dipole locations to be at $\alpha$ and $1/\alpha$ times the radius of curvature for some number $\alpha$, so that in the limit of zero frequency, the associated potentials match exactly at the boundary of the sphere of this example; this is not necessary but gives good results. A possibly useful general expression for $\alpha$ is $\alpha = 1 + 2\, s/r$, where s is the average spacing between vertices on the boundary and r is the radius of curvature in the vicinity of the vertex for which $\alpha$ is being calculated. We choose $\alpha = 3$ in this example.

Figure 23:
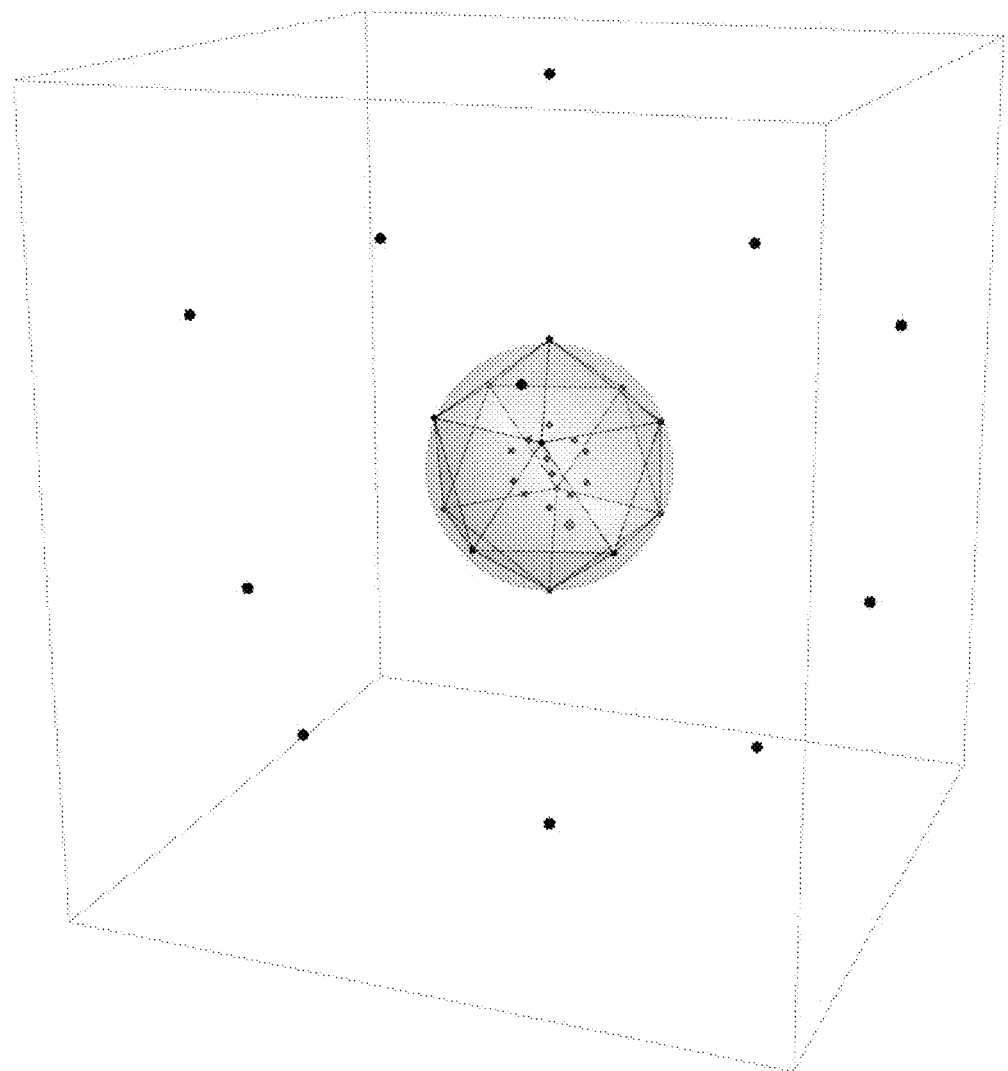
FIG. 23 shows icosahedron vertexes with one point inside the sphere and one point outside the sphere.

In the plot below, FIG. 23, each icosahedron vertex is green, and for each vertex there is one red point inside the sphere that gives the location of a virtual point dipole that will be used to calculate basis fields outside the sphere, and one blue point outside the sphere that gives the location of a virtual point dipole that will be used to calculate basis fields inside the sphere.

We also will need to calculate various integrals over the boundary between the two regions—over the sphere, that is. We do this numerically by choosing a number of points on the boundary, each one with an associated boundary area, and evaluate the integrand at each point, multiply each evaluation by the associated area, and sum. We might use just the vertices used to help define the virtual dipole locations, but we will get better numerical approximations to integrals over the boundary with more points. So for these integration points we will use the vertices of a "geodesated" icosahedron (for an irregular boundary more typical of engineering applications, we might use any of many possible algorithms that generate triangular meshes on a boundary).

{42, 3}

Figure 24:
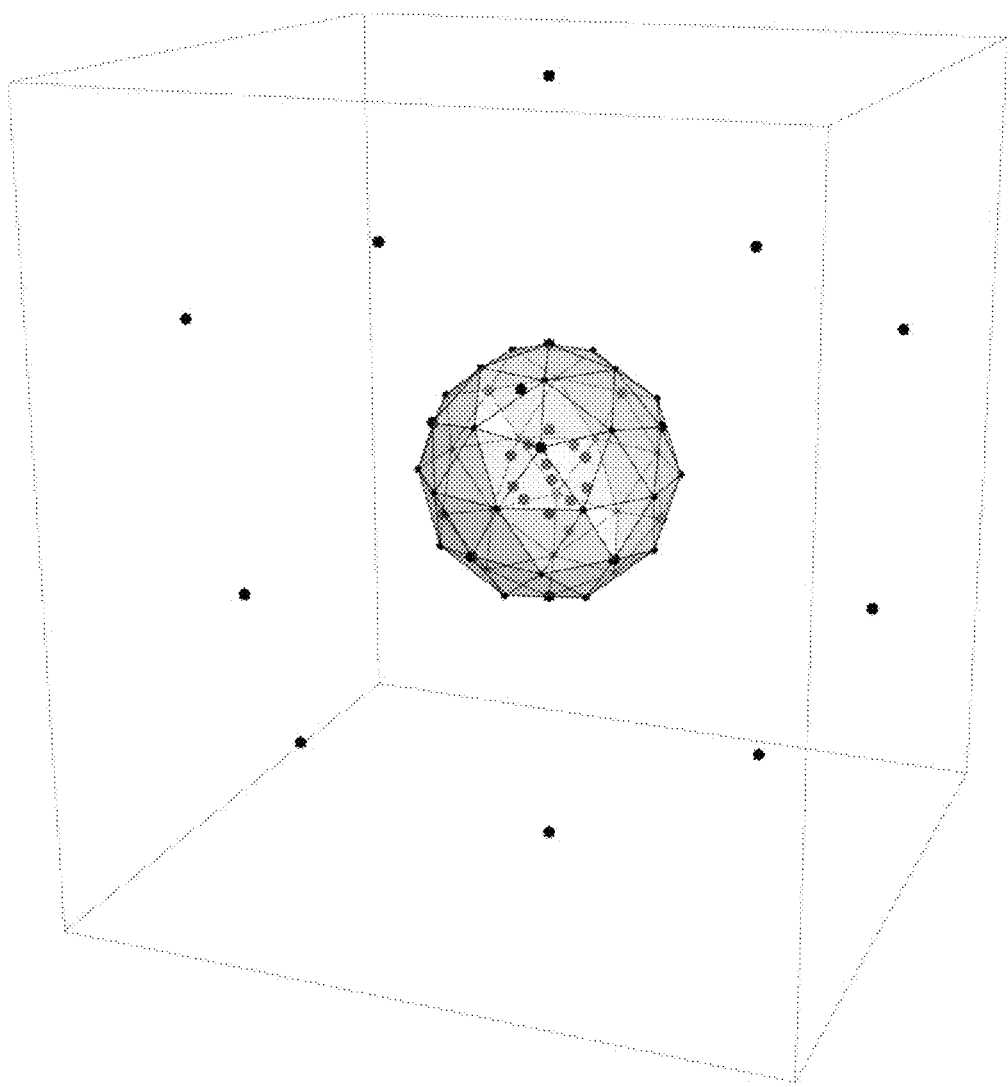
FIG. 24 shows the graph of FIG. 23 with additional points on the boundary for numerically approximating boundary integrals.

In the following graphic, FIG. 24, the red, green, and blue dots are the same as in the previous graphic, and the yellow dots are the additional points on the boundary; both green and yellow points will be used to numerically approximate boundary integrals.

Figure 25:
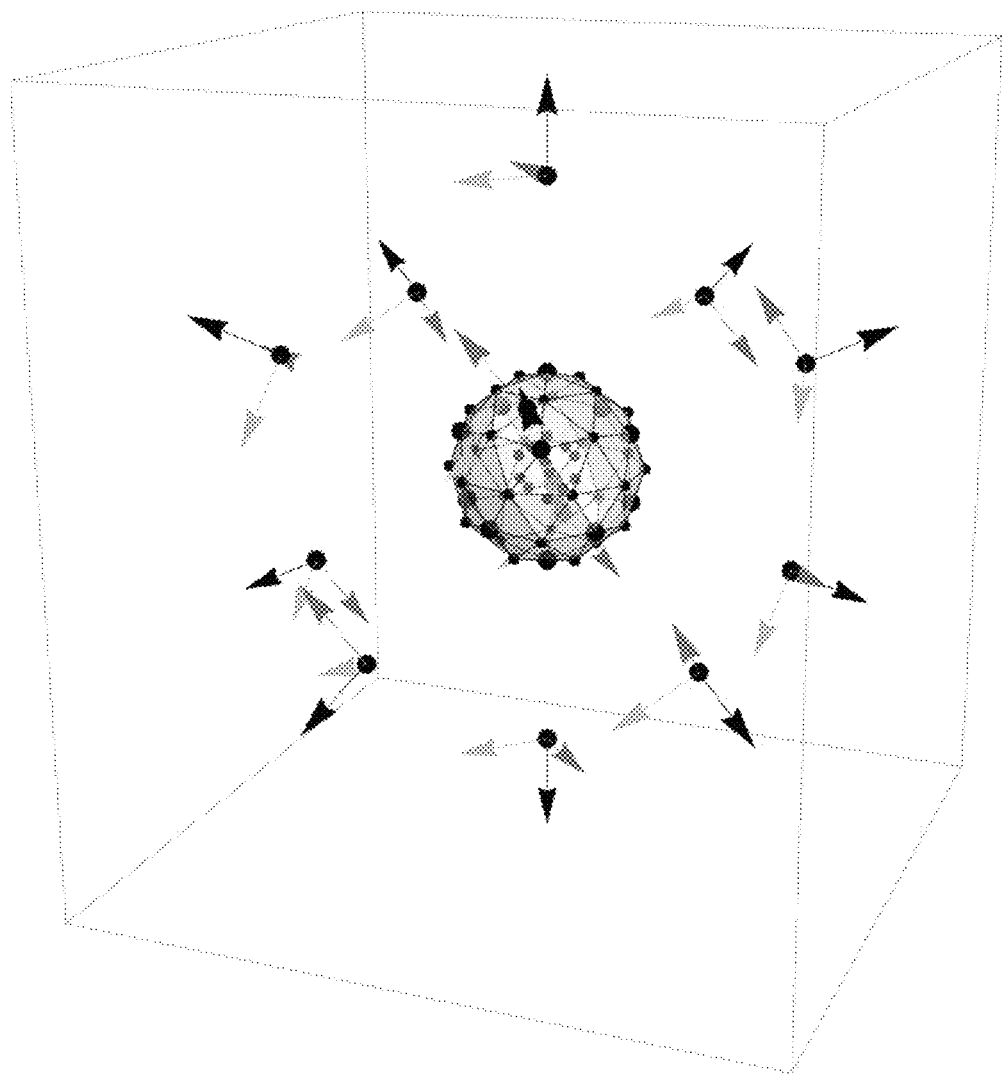
FIG. 25 shows a plot with frame vectors drawn next to the virtual dipoles.

Lastly, we will need a set of orthonormal frame vectors for each virtual dipole point, such that one of the vectors of the frame is perpendicular to the boundary at the associated boundary point (the other two can be in any direction, as long as they are orthonormal). These will be used to define dipole axes and to do calculations with the dipoles. In the following plot, FIG. 25, these frame vectors are drawn next to the virtual dipoles that are located at larger radii; the corresponding points at smaller radii use the same frame vectors.

Parameterized Continuous Potential

I have used a separate program module to calculate values of fields due to the usual expressions for electric and magnetic dipole sources (such as given by Jackson, Grffiths, and many other authors). This program is called "PointSources", and is loaded in the next line.

Many expressions can be calculated using this program module; a list of the names of all such expressions is generated by the next line.

For this example program, I need only a few of these names. The quantities calculated by these expressions is given below so that the results of this numerical example can be easily reproduced by typing in these expressions by hand.

All of the expressions from the "PointSources" module calculate the electromagnetic potentials and fields A and F in vacuum due to specified dipole sources.
?PointElectricDipoleField
PointElectricDipoleField[r,d,k] is the field G=D+III H
at displacement r from a dipole with moment d, in a medium with wavenumber k.

For symbolic arguments, this gives the usual expression for the field of a point electric dipole using the standard notation of geometric algebra (see, for example, "Geometric Algebra for Physicists" by Doran and Lasenby, Cambridge University Press, 2003):

$$PointElectricDipoleField[\vec{r}, \vec{d}, k]$$

$$\frac{1}{4\pi(\vec{r}\cdot\vec{r})^{5/2}}e^{ik\sqrt{\vec{r}\cdot\vec{r}}}\left(iIIIk\vec{r}\cdot\vec{r}\vec{r}\times\right.$$

$$\vec{d} + IIIk^2(\vec{r}\cdot\vec{r})^{3/2}\vec{r}\times\vec{d} - \vec{r}\cdot\vec{r}\vec{d} + ik(\vec{r}\cdot\vec{r})^{3/2}\vec{d} +$$

$$\left. kAbs[k](\vec{r}\cdot\vec{r})^2\vec{d} + 3\vec{d}\cdot\vec{r}\vec{r} - 3ik\vec{d}\cdot\vec{r}\sqrt{\vec{r}\cdot\vec{r}}\vec{r} - k^2\vec{d}\cdot\vec{r}\vec{r}\cdot\vec{r}\vec{r}\right)$$

For numeric arguments, this gives the three Cartesian components of the electric field (the terms above that do not have a factor of the unit trivector, represented by III) followed by the three Cartesian components of the magnetic field (the terms that do have a factor of III):

The expression above is compiled and relatively fast, but if the PointSources module is not available, one can look at the symbolic expression above and use it to define the equivalent, though slower, expression:

$$SlowPointElectricDipoleField[r\_, d\_, k\_] :=$$

$$\left\{\frac{1}{4\pi(r\cdot r)^{5/2}}e^{ik\sqrt{r\cdot r}}\left(-r\cdot rd + ik(r\cdot r)^{3/2}d + \right.\right.$$

$$\left. kAbs[k](r\cdot r)^2 d + 3d\cdot rr - 3ikd\cdot r\sqrt{r\cdot r}\,r - k^2 d\cdot rr\cdot rr\right),$$

$$\left.\frac{e^{ik\sqrt{r\cdot r}}\left(ikr\cdot rr\times d + k^2(r\cdot r)^{3/2}r\times d\right)}{4\pi(r\cdot r)^{5/2}}\right\}$$

Verify that it gives the same output as PointElectricDipoleField:

Similarly, functional but slower expressions can be defined to replace all other expressions from "PointSources" that are used in this example.

The expression PointElectricDipolePotential gives the expression in geometric algebra for the potential A=φ+$\vec{A}$:
?PointElectricDipolePotential
PointElectricDipolePotential[r,d,k] is the electromagnetic potential at displacement r from dipole d in a medium with wavenumber k.

$$PointElectricDipolePotential[\vec{r}, \vec{d}, k]$$

$$\frac{e^{ik\sqrt{\vec{r}\cdot\vec{r}}}\left(\vec{d}\cdot\vec{r} - ik\vec{d}\cdot\vec{r}\sqrt{\vec{r}\cdot\vec{r}} + ik\vec{r}\cdot\vec{r}\vec{d}\right)}{4\pi(\vec{r}\cdot\vec{r})^{3/2}}.$$

For numeric arguments, this gives $\{\phi, \{A_x, A_y, A_z\}\}$:
We also need the field of a point magnetic dipole:
?PointMagneticDipoleField
PointMagneticDipoleField[r,m,l] is the field at displacement r from a dipole with magnetic moment m in a medium with wavenumber k.

$$PointMagneticDipoleField[\vec{r}, \vec{d}, k] - \frac{1}{4\pi(\vec{r}\cdot\vec{r})^{5/2}}e^{ik\sqrt{\vec{r}\cdot\vec{r}}}\left(\vec{r}\cdot\vec{r}\left(ik\vec{r}\times\right.\right.$$

$$\vec{d} + III\vec{d} - IIIk\,Abs[k]\vec{r}\cdot\vec{r}\vec{d} + k\sqrt{\vec{r}\cdot\vec{r}}\left(k\vec{r}\times\vec{d} - iIII\vec{d}\right)\right) +$$

$$\left. III\vec{d}\cdot\vec{r}\left(-3 + 3ik\sqrt{\vec{r}\cdot\vec{r}} + k^2\vec{r}\cdot\vec{r}\right)\vec{r}\right)$$

and the potential of a point magnetic dipole:
?PointMagneticDipolePotential
PointMagneticDipolePotential[r,m,k] is the electromagnetic potential at displacement r from dipole m in a medium with wavenumber k.

$$PointMagneticDipolePotential[\vec{r}, \vec{d}, k]\frac{ie^{ik\sqrt{\vec{r}\cdot\vec{r}}}\left(i + k\sqrt{\vec{r}\cdot\vec{r}}\right)\vec{d}\times\vec{r}}{4\pi(\vec{r}\cdot\vec{r})^{3/2}}$$

$$PointMagneticDipolePotential[\{1, 2, 3\}, \{4, 5, 6\}, .1]$$

The expressions above calculate the potential A and field F in vacuum (all notation follows standard geometric algebraic notation where applicable, as given in Doran and Lasenby; see the equation summary for notation unique to this problem). To calculate the potential A and field F in polarizable media, we first calculate the fields $A_m$ and $F_m$ which have identical forms as the expressions in vacuum as long as k is chosen to be the wave-number in the medium and not ω/c, and then use these to calculate A and F and G with simple linear transformations that depend on the values of the permittivities and permeabilities of the matter in the problem. See "Maxwell's equation in empty space and in polarizable media using geometric algebra" for more about this; the result of this calculation is needed to make this example program work and to apply this method to other cases, but the understanding the derivation is not needed for one skilled in the art to make and use my method by following this numeric example.

Now we define the simple linear transformations that take us from the "medium field" and "medium potential" values, which are easily calculated inside polarizable media, and the physically significant field values $\phi$, $\vec{A}$, $\vec{E}$, $\vec{B}$, $\vec{D}$, and $\vec{H}$.

First, as an example, we explicitly write the relationship between $A_m$ and A (again, see "Maxwell's equation in empty space and in polarizable media using geometric algebra", for the basic equations, and Doran and Lasenby for an understanding of geometric algebra that will allow one to better understand and derive these results):

$$A_m = \epsilon_m(\phi + v_m \vec{A})$$

$$A = \epsilon_0(\phi + c\vec{A})$$

so $$A = (\epsilon_0/\epsilon_m)(\langle A_m \rangle_0 + (c/v_m)\langle A_m \rangle_1) = (\epsilon_0/\epsilon_m)(\langle A_m \rangle_0 + (c/v_m)\langle A_m \rangle_1) =$$

$$(\epsilon_0/\epsilon_m)\langle A_m \rangle_0 + \sqrt{(\epsilon_0 \mu_m)/(\epsilon_m \mu_0)} \langle A_m \rangle_1$$

The expressions for F~E+III B and G~D+III H are similar, and can be easily obtained from the equations in the equation summary given later.

Here I just write the code that does this, with relative permittivity and relative permeability arguments:
AfromAm[Am_, relpermit_, relpermea_]:={1/relpermit, Sqrt[relpermea/relpermit]}*Am
FfromFm[Fm_, relpermit_, relpermea_]:={1/relpermit, Sqrt[relpermea/relpermit]}*Fm
GfromFm[Fm_, relpermit_, relpermea_]:={1, 1/Sqrt[relpermit*relpermea]}*Fm We need to construct the continuous potentials a from discontinuous potential ä. In general we would write $$a_j = \ddot{a}_j + \ddot{a}_i c_{i,j}$$

where the hat over the dummy sum index i means exclude the fixed index j, and sum over all indices, inside and out. The fixed index j takes on only outside or only inside indices; here I use only outside. Equivalently, I can use the even and odd linear combinations of inside/outside, and use each even combination to identify a final continuous potential.

But in this simple example, some terms can be chosen to always be associated with fields outside the sphere, and some always inside the sphere, so we make this choice, which makes the calculation simpler and clearer:

$$a_j = \ddot{a}_{j,out} + \ddot{a}_{i,in} C_{i,in}, j$$

$$0 = \partial_{c_{m,in,j}} \int err_j^2 d\sigma$$

$$err_j = \ddot{a}_{j,out} - \ddot{a}_{i,in} c_{i,in,j}$$

$$0 = \int \ddot{a}_{m,in}^\dagger * \ddot{a}_{i,in} d\Sigma c_{i,in,j} = \int \ddot{a}_{m,in}^\dagger * \ddot{a}_{j,out} d\Sigma$$

For this numerical example, we need specific numerical values for the permittivities and permeabilities, inside and outside the sphere; I choose some values that could represent a problem of real engineering interest:
insidePermit=3.0;
insidePermea=5.0;
outsidePermit=1.0;
outsidePermea=1.0;

We also need to choose a numerical value for the frequency of the simulation, since many calculated quantities depend on this:
freq=0.1;

One needed quantity is the wave-number, in both bulk regions of this example (inside the sphere and outside):
insideWavenumber:=Sqrt[insidePermea*insidePermit]*freq;
outsideWavenumber:=Sqrt[outsidePermea*outsidePermit]*freq;

We will be calculating numerical approximations to many integrals; we do this by evaluating the integrand at each of many "integrand points", multiplying by the area differential dArea, and summing the results. The integrand points are
integrandPoints=geodesateCoordinates//N
{{0., 0., 1.}, {−0.425325, 0.309017, 0.850651}, {−0.723607, 0.525731, 0.447214},
{0.16246, 0.5, 0.850651}, {−0.262866, 0.809017, 0.525731}, {0.276393, 0.850651, 0.447214},
{−0.425325, −0.309017, 0.850651}, {−0.723607, −0.525731, 0.447214},
{−0.850651, 0., 0.525731}, {0.16246, −0.5, 0.850651}, {0.276393, −0.850651, 0.447214},
{−0.262866, −0.809017, 0.525731}, {0.525731, 0., 0.850651}, {0.894427, 0., 0.447214},
{0.688191, −0.5, 0.525731}, {0.688191, 0.5, 0.525731}, {0.723607, −0.525731, −0.447214},
{0.425325, −0.309017, −0.850651}, {0., 0., −1.}, {0.262866, −0.809017, −0.525731},
{−0.16246, −0.5, −0.850651}, {−0.276393, −0.850651, −0.447214},
{0.723607, 0.525731, −0.447214}, {0.425325, 0.309017, −0.850651},
{0.850651, 0., −0.525731}, {−0.276393, 0.850651, −0.447214}, {−0.16246, 0.5, −0.850651},
{0.262866, 0.809017, −0.525731}, {−0.894427, 0., −0.447214}, {−0.525731, 0., −0.850651},
{−0.688191, 0.5, −0.525731}, {−0.688191, −0.5, −0.525731}, {0., 1., 0.},
{−0.587785, 0.809017, 0.}, {−0.951057, 0.309017, 0.}, {−0.951057, −0.309017, 0.},
{−0.587785, −0.809017, 0.}, {0., −1., 0.}, {0.587785, −0.809017, 0.},
{0.951057, −0.309017, 0.}, {0.951057, 0.309017, 0.}, {0.587785, 0.809017, 0.}}

The area differential in this simple example can be chosen to be the same for each integrand point:
dArea=4π/Length[integrandPoints]//N
0.299199

Now we write an expression that calculates the integrals $$\int \ddot{a}_m^\dagger * \ddot{a}_i d\Sigma$$

where the two factors are discontinuous potentials A ("ADis") and the product is the scalar product of geometric algebra, excluding the product of the perpendicular components of the vector parts.

We will use outward radiating (retarded) functions in the outside region, and match at the boundary with inward (advanced) and outward (retarded) radiating functions in the inside region.
Clear[ADisADis]

iVert indexes the vertices associated with particular dipole sources, iInOutRegion indexes the two bulk region (1=inside the sphere, 2=outside), iOutInDirection indexes the direction of radiation of dipole fields (1=outward from the dipole=retarded, 2=inward to the dipole=advanced), and iAxes indexes the three Cartesian axes of the dipole in a local orthonormal vector frame with 1 being normal to the surface at the specified vertex. Note that we use only electric dipoles for frame vectors 1, and only magnetic dipoles for frame vectors 2 and 3: we can argue theoretically that we expect this to form a good basis set and we observe this in numerical experiments.

Recall that the product represented by the asterisk is the scalar geometric product minus the product of the vector components normal to the boundary (as described in Continuous Basis Functions). Also, note that we easily calculate the advanced potential of the time-reversed source from the retarded potential A of the normal source by the simple expression Conjugate[{1, −1}*A]; see the section "Complex Representation, Time Reversal, and Divergence of Potential A".

ADisADis[{iVert_, iInOutRegion_, iOutInDirection_, iAxis_},
   {jVert_, jInOutRegion_, jOutInDirection_, jAxis_}]:=
    Module[
   {CentroidPosition, iDipolePosition, iDipoleUnitVector, jDipolePosition,
     jDipoleUnitVector, iPointDipolePotential, jPointDipolePotential, iA, jA, n,
     iWavenumber, iPermit, iPermea, jWavenumber, jPermit, jPermea, iiA, jjA},
   iDipolePosition=If[iInOutRegion=1, InsidePotentialDipolePositions,
     OutsidePotentialDipolePositions][[iVert]]//N;
   jDipolePosition=If[jInOutRegion=1, InsidePotentialDipolePositions,
     OutsidePotentialDipolePositions][[jVert]]//N;
   iPointDipolePotential=If[iAxis=1, PointElectricDipolePotential,
     PointMagneticDipolePotential];
   jPointDipolePotential=If[jAxis=1, PointElectricDipolePotential,
     PointMagneticDipolePotential];
   iDipoleUnitVector=vertexFrames [[iVert, iAxis]];
   jDipoleUnitVector=vertexFrames [[jVert, jAxis]];
   iWavenumber=If[iInOutRegion=1, insideWavenumber, outsideWavenumber];
   iPermit=If[iInOutRegion=1, insidePermit, outsidePermit];
   iPermea=If[iInOutRegion=1, insidePermea, outsidePermea];
   jWavenumber=If[jInOutRegion=1, insideWavenumber, outsideWavenumber];
   jPermit=If[jInOutRegion=1, insidePermit, outsidePermit];
   jPermea=If[jInOutRegion=1, insidePermea, outsidePermea];
   Sum[
    iA=AfromAm[iPointDipolePotential[boundaryPoint−iDipolePosition,
     iDipoleUnitVector, iWavenumber], iPermit, iPermea];
    jA=AfromAm[jPointDipolePotential[boundaryPoint−jDipolePosition,
     jDipoleUnitVector, jWavenumber], jPermit, jPermea];
    iiA=If[iOutInDirection=1, iA, Conjugate[{1, −1}*iA]];
    jjA=If[jOutInDirection=1, jA, Conjugate[{1, −1)*jA]];
    n=Normalize[boundaryPoint];
    Conjugate[Flatten[{iiA[[1]], n×iiA[[2]]}]].Flatten[{jjA[1]]], n×jjA[[2]]}]*dArea,
   {boundaryPoint, integrandPoints}]
]

We verify that this works by evaluating it for representative arguments:
ADisADis[{1, 2, 1, 1}, {2, 2, 1, 1}]
−0.021335+2.11758×10⁻²² i
ADisADis[{1, 1, 1, 1}, {2, 2, 2, 1}]
0.000454026+0.000893725 i Since it takes a bit of time to calculate each of these integrals and we may need to use them more than once, we calculate and save an array of all needed values:
ADisADisArray=Table[ADisADis[{iV, iIOR, iOID, iA}, {kV, kIOR, kOID, kA}], {iV, 1, 12},
   {iIOR, 2}, {iOID, 2}, {iA, 3}, {kV, 1, 12}, {kIOR, 2},
    {kOID, 2}, {kA, 3}];

We check that we did this right by first looking at the Dimensions,
Dimensions [ADisADisArray]
{12, 2, 2, 3, 12, 2, 2, 3}
and now looking at a representative element of the array
ADisADisArray[[1, 1, 1, 1, 2, 2, 2, 1]]
0.000454026+0.000893725 i
ADisADisArray[[3, 2, 1, 1, 3, 2, 1, 1]]
0.0364011+0. i We will need a matrix made of many of these values; we now take the required calculated values and put them into a matrix form:
ADisADisMatrix=Flatten[#, 3]&/@ Flatten[#, 3]&@
   Table[ADisADisArray[[iV, iIOR, iOID, iA, kV, kIOR, kOID, kA]], {iV, 1, 12},
    {iIOR, {1}}, {iOID, 2}, {iA, 3}, {kV, 1, 12}, {kIOR,
     {1}}, {kOID, 2}, {kA, 3}];

Check that we have at least the correct Dimensions:
ADisADisMatrix//Dimensions
{72, 72}

We also need the right hand side of the equation given earlier. We call this "bat" (for no good reason):
bat[kV_, kA_]:=bat[kV, kA]=Flatten[#, 1][[1]]&/@ Flatten
[#, 3]& @
   Table[ADisADisArray[[iV, iIOR, iOID, iA, kV, kIOR, kOID, kA]],
   {iV, 1, 12}, {iIOR, {1}}, {iOID, 2}, {iA, 3}, {kIOR,
    {2}}, {kOID, {1}}]

Verify that at least the Dimensions are right:
bat[1, 2]//Dimensions
{72}

Check that some representative values are plausible:
bat[1, 2][[1;;3]]
{1.6263×10⁻¹⁹+1.76183×10⁻¹⁹ i, −0.0036662−0.000426982 i, 3.24393×10⁻²⁰−7.09609× 10⁻²¹ i }

Finally, we calculate the coefficients "cij" that will be used to define the substantially continuous potential basis functions, one List of coefficients for each pair of indices {jV, jA}, which identifies a vertex and axes, and corresponds physically to a localized boundary potential at vertex jV, with a large potential component identified by jA (1=scalar potential, 2=tangential vector potential in direction of local frame vector 2, 3=tangential vector potential in direction of local frame vector 3):
cij[jV_, jA_]:=cij[jV, jA]=PseudoInverse[ADisADisMatrix] .bat[jV, jA];

Check Dimensions of a representative List of coefficients:
cij[1, 2]//Dimensions
{72}
and check a few elements of this list for plausible values:
cij[1, 2][[1;;3]]
{−0.0000194302+0.0000138936 i, −3.87857−2362.99 i, 0.000225344+0.00038.5807 i }

Good. Now recall the equation that gives the continuous potential as a linear sum of discontinuous potentials, $$a_j = \tilde{a}_j^{out} + \tilde{a}_j^{in} c_i^{in}{}_j$$

where $c_i^{in}{}_j$ were just calculated and called cij[jV, jA]. Now we write the code for this. Do this by first writing an expression AIn that gives values for the potential A that are valid inside the sphere, then an expression AOut that gives values for the potential A that are valid outside the sphere, then combine these in one expression AIO, valid both inside and outside:

AIn[{jV_, jA_}, r_]:=Module[
 {CentroidPosition, iDipolePosition, iDipoleUnitVector,
  jDipolePosition,
   jDipoleUnitVector, iPointDipolePotential, jPointDipolePotential, iA, iiA},
 iDipolePosition[iVert_, iIO_]:=
   If[iIO=1, InsidePotentialDipolePositions, OutsidePotentialDipolePositions][[iVert]];
 iDipoleUnitVector[iVert_, iAxis_]:=vertexFrames[[iVert, iAxis]];
 iPointDipolePotential[iAxis_]:=
   If[iAxis=1, PointElectricDipolePotential, PointMagneticDipolePotential];
 Sum[
   iA=AfromAm[iPointDipolePotential[iAxis][r−iDipolePosition[iVert, 1],
     iDipoleUnitVector[iVert, iAxis], insideWavenumber], insidePermit, insidePermea];
   iiA=If[iOID=1, iA, {1, −1}*Conjugate[iA]];
   iiA*cij[jV, jA][[(((iVert−1)*2+(iOID−1))*3)+(iAxis−1)+1]],
   {iVert, 12}, {iOID, 2}, {iAxis, 3}]
 ]
AIn[{1, 2}, {0, 0.1, 0.2}]
{−1.51573×10⁻¹⁰−3.09348×10⁻⁷ i,
 {0.00219995+0.0000102193       i,
  0.00198506+0.0000102209 i, −0.00468843−1.89521×10⁻⁶ i}}

AOut[{jV_, jA}, r_]:=Module[
 {CentroidPosition, iDipolePosition, iDipoleUnitVector,
  jDipolePosition,
   jDipoleUnitVector, iPointDipolePotential, jPointDipolePotential, iA},
 iDipolePosition[iVert_, iIO_]:=
   If[iIO=1, InsidePotentialDipolePositions, OutsidePotentialDipolePositions][[iVert]];
 iDipoleUnitVector[iVert_, iAxis_]:=vertexFrames[[iVert, iAxis]];
 iPointDipolePotential[iAxis_]:=
   If[iAxis=1, PointElectricDipolePotential, PointMagneticDipolePotential];
 AfromAm[iPointDipolePotential[jA][r−iDipolePosition[jV, 2],
   iDipoleUnitVector[jV, jA], outsideWavenumber], outsidePermit, outsidePermea]
 ]
AOut[{1, 2}, {1, 1.1, 1.2}]
{0.+0. i,
 {0.00905709+0.0000286291       i,
  0.00905709+0.0000286291       i,
  −0.0124043−0.0000392095 i}}

The radius of the sphere in this example is
sphereRadius
1.

The final complete basis potential expression, indexed by {jV, jA} where jV identifies one of the vertices (1 through 12) and jA identifies one of the three axes (1, 2, or 3), valid for any point either inside or outside the spherical boundary, is called AIO, and is defined by
AIO[{jV_, jA_}, r_]:=If[Norm[r]<sphereRadius, AIn[{jV, jA}, r], AOut[{jV, jA}, r]]

Check a representative pair of indices and point:
AIO[{1, 2}, {0.1, 0.2, 0.3}]
{−1.638×10⁻¹⁰−5.6253×10⁻⁶ i,
 {0.00745051+0.0000120971       i,
  0.00687319+0.0000121004       i,
  −0.0134999−5.68134×10⁻⁶ i}}

Good. Now we can calculate the value of any one of the continuous basis potential functions at any point in space.

We look at some plots to see how smooth and continuous they are.

Figure 26:
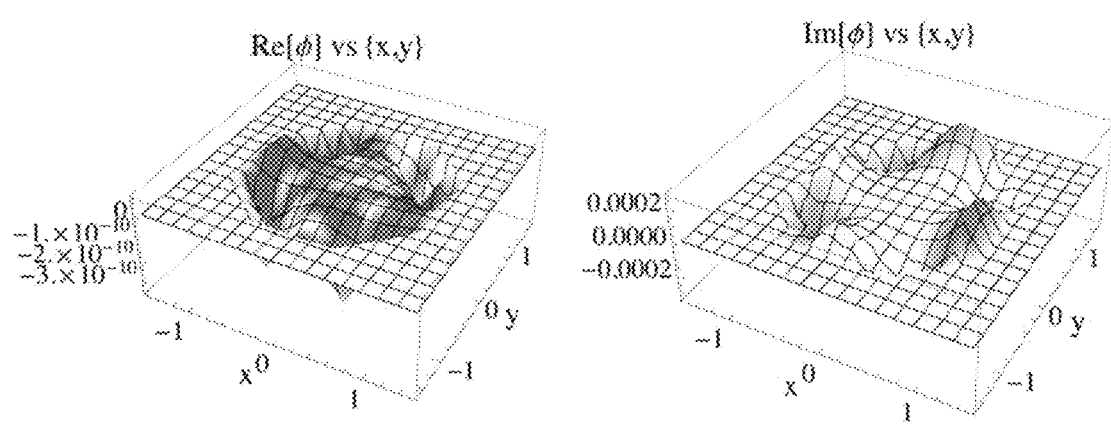
FIGS. 26 and 27 show the scalar potential (that is, the zeroth component of the space-time potential) of the first element of AIO.
Figure 27:
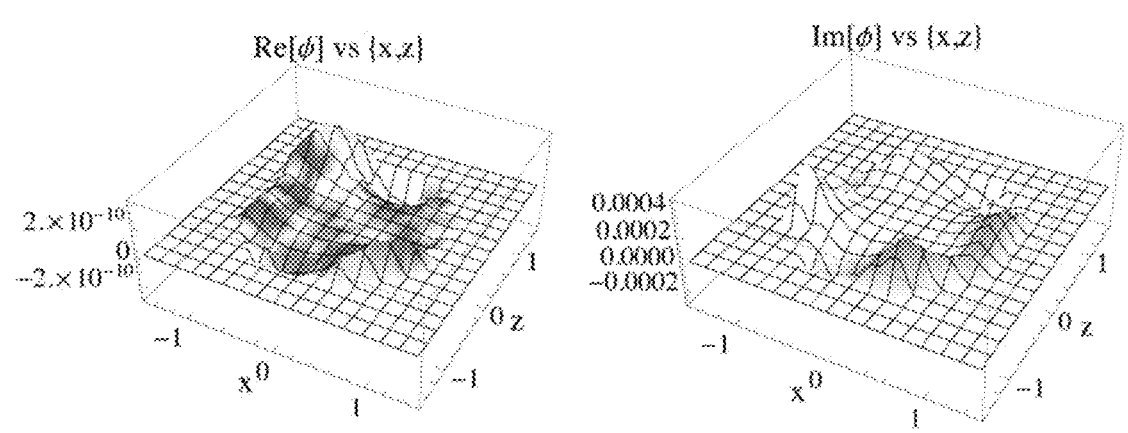

In FIGS. 26 and 27 we first look at the first element of AIO, the scalar potential (that is, the zeroth component of the space-time potential). We do this for index pair {1,2}, corresponding to a potential in the outside region that is created by one magnetic dipole (jA=2) associated with the first vertex (jV=1). Note that the scalar potential of a magnetic dipole is identically zero, so the matching potential in the interior region should ideally be zero but will have some error:

This last plot shows that the error in this plane (x-z) for the Imaginary part is much larger; but still small compared with the (space-time) magnitude of the potential: the potential at a representative point just inside the boundary is
AIO[{1, 2}, {0.7, 0, 0.7}]
{9.11344×10⁻¹¹−0.000121221 i,
 {0.0237762+0.000019402 i, 0.029445+0.0000193583 i,
  −0.0275369−0.0000130669 i}}
and its magnitude is
Sqrt[Conjugate[Flatten[AIO[{1, 2}, {0.7, 0, 0.7}]]].Flatten[AIO[{1, 2}, {0.7, 0, 0.7}]]]
0.046804+0. i so the fractional error in the scalar potential is only about 0.5% or less. This is very good for such a crude set of basis functions (only 12 points over an entire sphere).

It may be helpful to display the values of the vertex frame vector coordinates and vertex coordinates:
vertexFrames
{{{0., 0., −1.}, {0.707107, −0.707107, 0.}, {−0.707107, −0.707107, 0.}},
 {{0., 0., 1.}, {−0.707107, 0.707107, 0.}, {−0.707107, −0.707107, 0.}},
 {{−0.894427, 0., −0.447214}, {0.408248, 0.408248, −0.816497},
  {0.182574, −0.912871, −0.365148}}, {{0.894427, 0., 0.447214},
  {−0.408248, −0.408248, 0.816497}, {0.182574, −0.912871, −0.365148}},
 {{0.723607, −0.525731, −0.447214}, {−0.0458092, −0.683088, 0.728898},
  {−0.688691, −0.506949, −0.518371}}, {{0.723607, 0.525731, −0.447214},
  {0.63379, −0.762689, 0.128899}, {−0.273319, −0.376712, −0.88509}},
 {{−0.723607, −0.525731, 0.447214}, {−0.63379, 0.762689, −0.128899},
  {−0.273319, −0.376712, −0.88509}}, {{−0.723607, 0.525731, 0.447214},
  {0.0458092, 0.683088, −0.728898}, {−0.688691, −0.506949, −0.518371}},
 {{−0.276393, −0.850651, −0.447214}, {−0.558548, −0.236496, 0.795044},
  {−0.782069, 0.469535, −0.409763}}, {{−0.276393, 0.850651, −0.447214}, {0.751346, −0.0988896, −0.652457}, {−0.599238, −0.516347, −0.611801}},
{{0.276393, −0.850651, 0.447214}, {−0.751346, 0.0988896, 0.652457},
{−0.599238, −0.516347, −0.611801}}, {{0.276393, 0.850651, 0.447214},
{0.558548, 0.236496, −0.795044}, {−0.782069, 0.469535, −0.409763}}}
vertexCoordinates//N
{{0., 0., −1.}, {0., 0., 1.}, {−0.894427, 0., −0.447214}, {0.894427, 0., 0.447214},
{0.723607, −0.525731, −0.447214}, {0.723607, 0.525731, −0.447214},
{−0.723607, −0.525731, 0.447214}, {−0.723607, 0.525731, 0.447214},
{−0.276393, −0.850651, −0.447214}, {−0.276393, 0.850651, −0.447214},
{0.276393, −0.850651, 0.447214}, {0.276393, 0.850651, 0.447214}}

Figure 28:
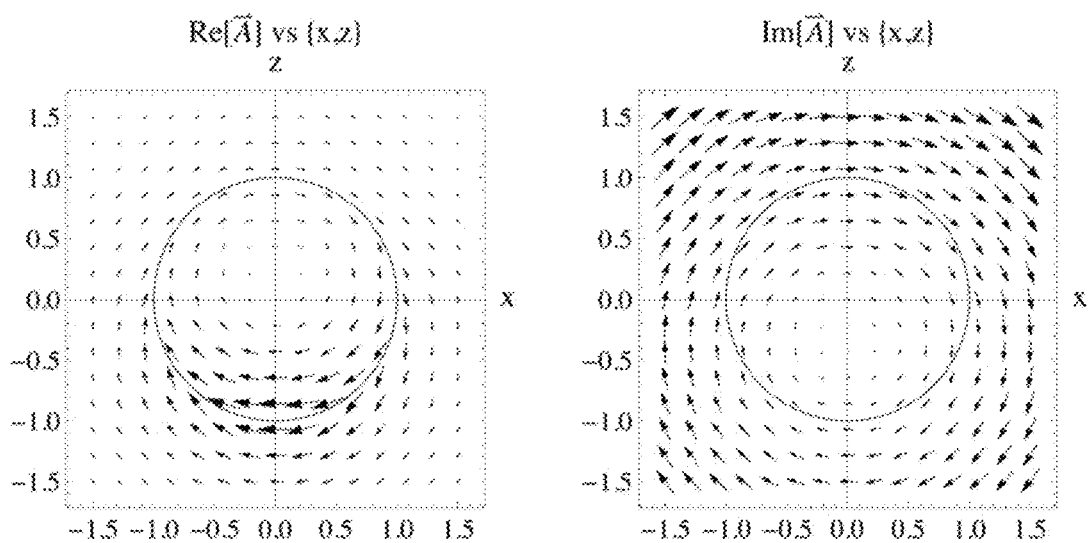
FIGS. 28 and 29, show some vector potential values, for check for the continuity of the tangential component at the surface of the sphere.
Figure 29:
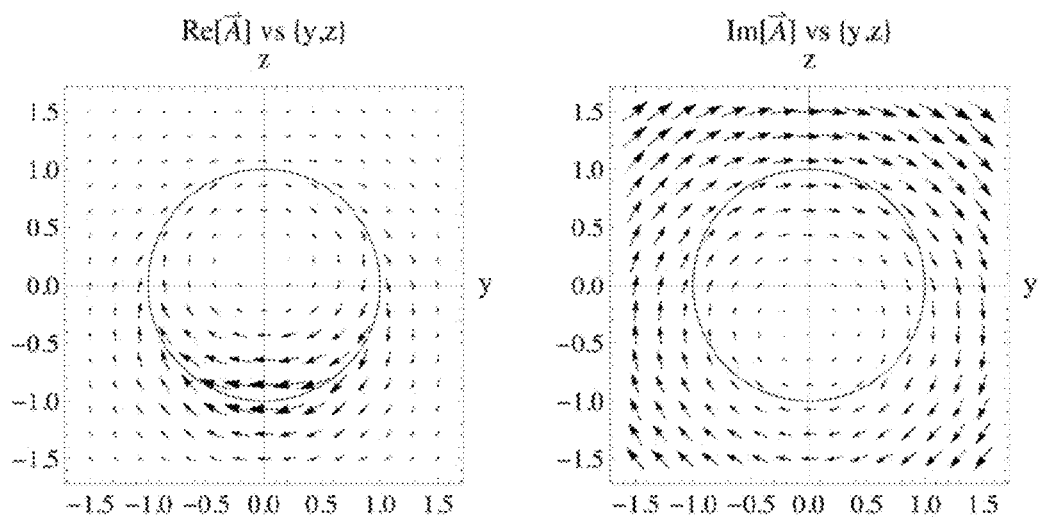
Figure 30:
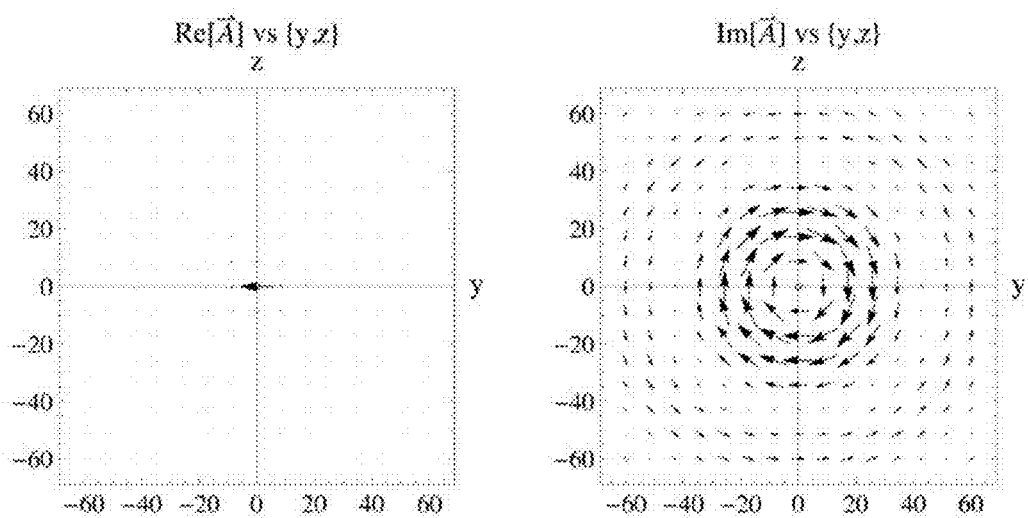
FIG. 30 shows plots over a larger range, indicating the increasing imaginary part at larger radii, which is just part of a wave.
Figure 31:
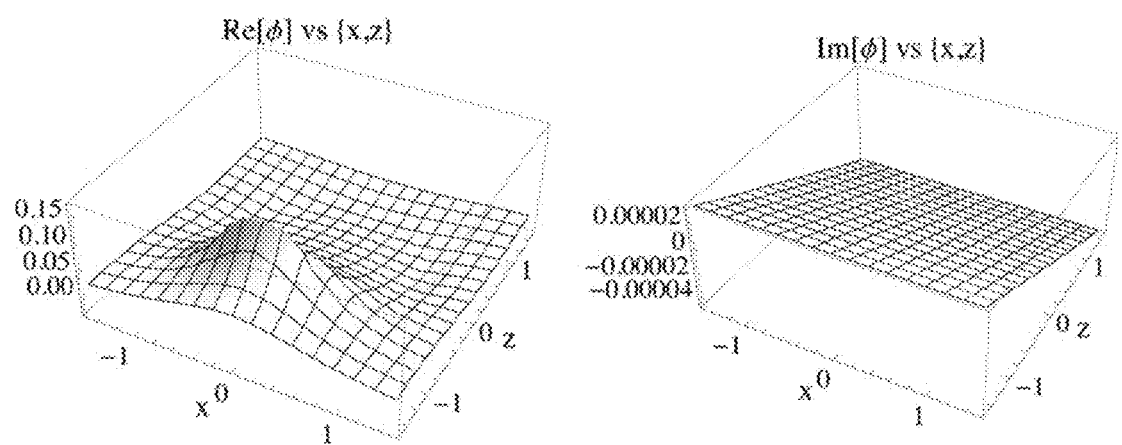
FIGS. 31 and 32 a representation of substantially-continuous potentials for jA=1.
Figure 32:
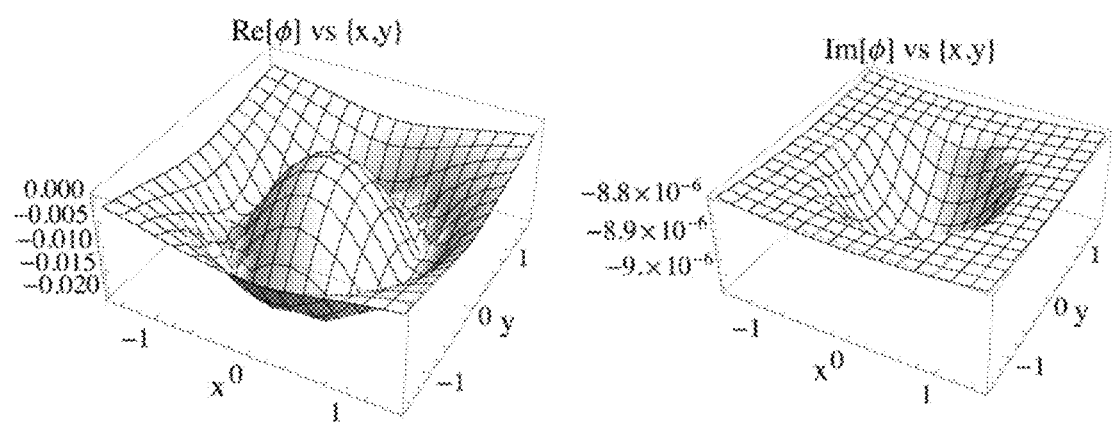

Next, in FIGS. 28 and 29, we look at some vector potential values, to check for continuity of the tangential component at the surface of the sphere (recall that the perpendicular component is not yet constrained to be continuous):
GraphicsRow[{Show[{VectorPlot[AIO[{1, 2}, {x, 0, z}][[2, {1, 3}]]//Re, {x, −3/2, 3/2},
  {z, −3/2, 3/2}, Axes→True, AxesLabel→+{"x", "z"},
   PlotLabel→"Re[$\vec{A}$]"],
  ParametricPlot[{Cos [ϕ], Sin([ϕ])}sphereRadius, {ϕ, 0, 2π}]}],
  Show[{VectorPlot[AIO[{1, 2}, {x, 0, z}][[2, {1, 3}]]//Im, {x, −3/2, 3/2},
   {z, −3/2, 3/2}, Axes→True, AxesLabel→, {"x", "z"},
   PlotLabel→"Im[$\vec{A}$]"],
  ParametricPlot[{Cos [ϕ], Sin [ϕ]}sphereRadius, {ϕ, 0, 2π}]}]},
  PlotLabel→"FIG. 28"]//Quiet
GraphicsRow[{Show[{VectorPlot[AIO[{1, 2}, {0, y, z}]([2, (2, 3}]]//Re, y, −3/2, 3/2},
  {z, −3/2, 3/2}, Axes→True, AxesLabel→{"y", "z"},
   PlotLabel→"Re[$\vec{A}$]"],
  ParametricPlot[{Cos [ϕ], Sin [ϕ]}sphereRadius, {ϕ, 0, 2π]}],
  Show[{VectorPlot[AIO[{1, 2}, {0, y, z}][[2, {2, 3}]]//Im, {y, −3/2, 3/2},
   {z, −3/2, 3/2}, Axes→True, AxesLabel→{"y", "z"},
   PlotLabel→"Im[$\vec{A}$]"],
  ParametricPlot[{Cos [ϕ], Sin [ϕ]}sphereRadius, {ϕ, 0, 2π}]}]},
  PlotLabel→"FIG. 29"]//Quiet It may be helpful to see plots over a larger range, to understand that the increasing imaginary part at larger radii is just part of a wave that must exist since this is for the nonzero frequency 0.1:
GraphicsRow[
  {Show[{VectorPlot[AIO[{1, 2}, {0, y, z}][[2, {2, 3}]]//Re, {y, −60, 60}, {z, −60, 60},
   Axes→True, AxesLabel→{, "y", "z"},
   PlotLabel→"Re[$\vec{A}$]"],
  ParametricPlot[{Cos [ϕ], Sin [ϕ]}sphereRadius, {ϕ, 0, 2π}]}],
  Show[{VectorPlot[AIO[{1, 2}, {0, y, z}][[2, {2, 3}]]//Im, {y, −60, 60}, {z, −60, 60},
   Axes→True, AxesLabel→{"y", "z"}, PlotLabel→"Im[$\vec{A}$]"], ParametricPlot[
  {Cos [ϕ], Sin [ϕ]}sphereRadius, {(ϕ, 0, 2π}]}]},
  PlotLabel→"FIG. 30"]//Quiet These all look very good.
Now in FIGS. 31 and 32 we look at a representative of these substantially-continuous potentials for jA=1, which corresponds to an exterior potential due to a single virtual electric dipole inside the sphere:
GraphicsRow[{Plot3D[AIO[{1, 1}, {x, 0, z}][[1]]//Re, {x, −3/2, 3/2}, {z, −3/2, 3/2},
  PlotRange→All, AxesLabel→{"x", "z"}, PlotLabel→"Re [ϕ] vs {x,z}"], Plot3D[
  AIO[{1, 1}, {x, 0, z}][[1]]//Im, {x, −3/2, 3/2}, {z, −3/2, 3/2}, PlotRange→All,
  AxesLabel→{"x", "z"}, PlotLabel→"Im[ϕ] vs {x,z}"]},
  PlotLabel→"FIG. 31"]
GraphicsRow[{Plot3D[AIO[{1, 1}, {x, y, 0}][[1]]//Re, {x, −3/2, 3/2}, {y, −3/2, 3/2},
  PlotRange→All, AxesLabel→{"x", "y"}, PlotLabel→"Re[ϕ] vs {x,y}"], Plot3D[
  AIO[{1, 1}, {x, y, 0}][[1]]//Im, {x, −3/2, 3/2}, {y, −3/2, 3/2}, PlotRange→All,
  AxesLabel→{"x", "y"}, PlotLabel→"Im[ϕ] vs {x,y}"]},
  PlotLabel→"FIG. 32"]

Figure 33:
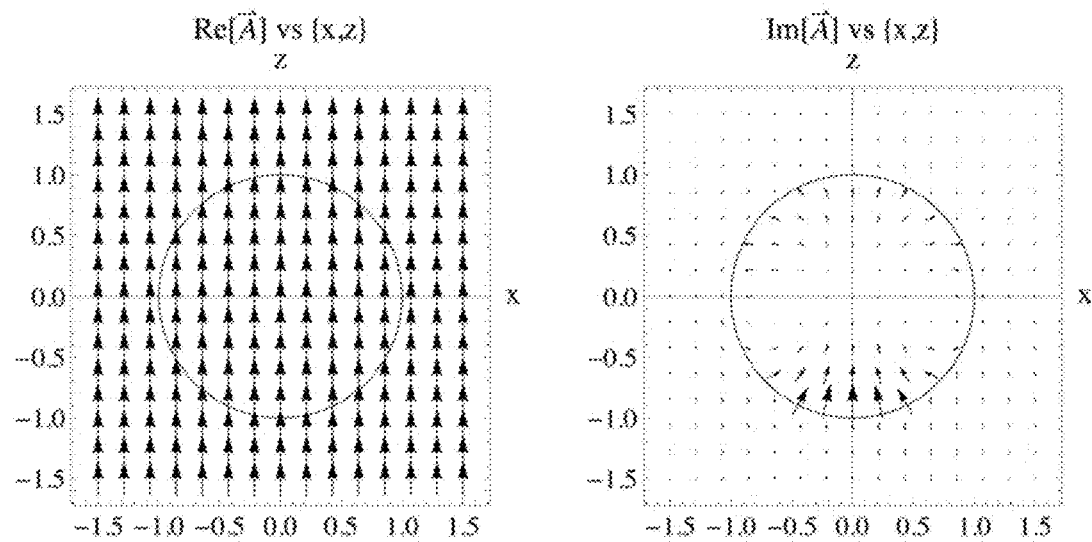
FIG. 33 the vector potential for a virtual electric dipole source.

These plots above all show excellent continuity of the scalar potential at the boundary.
Next, in FIG. 33, we look at the vector potential for the same virtual electric dipole source:
GraphicsRow[{Show[{VectorPlot[AIO[{1, 1}, {x, 0, z}][[2, {1, 3}]]//Re, {x, −3/2, 3/2},
  {z, −3/2, 3/2}, Axes→True, AxesLabel→{"x", "z"},
   PlotLabel→"Re[$\vec{A}$]"],
  ParametricPlot[{Cos [ϕ], Sin [ϕ]}sphereRadius, {, 0, 2π}]
  }],
  Show[{VectorPlot[AIO[{1, 1}, {x, 0, z}][[2, {1, 3}]]//Im, {x, −3/2, 3/2},
   {z, −3/2, 3/2}, Axes→True, AxesLabel→{"x", "z"},
   PlotLabel→"Im[ϕ]"],
  ParametricPlot[{Cos [ϕ], Sin [ϕ]}sphereRadius, {ϕ, 0, 2π}]}]},
  PlotLabel→"FIG. 33"]//Quiet In this last plot, we see that although the normal part of the imaginary part of the vector potential is not continuous at the boundary, the tangential component is, exactly as is required.

Parameterized Continuous Field F

Now we plot the values of the field F=$\epsilon_0\vec{E}$+III (1/c)$\vec{B}$/$\mu_0$ associated with the substantially continuous potential basis functions. One can show that these should substantially obey the usual homogeneous boundary conditions: E tangential is continuous, and B perpendicular is continuous across the boundary. The plots below show that this is indeed obtained very well.

The output of the Fin, FOut, and FIO below is the Cartesian components of fields that make up F, written as a 2×3 List given by {$\epsilon_0$ {Ex, Ey, Ez}, (1/c){Bx, By, Bz}/$\mu_0$}.
FIn[{jV_, jA_}, r_]:=Module[
  {CentroidPosition, iDipolePosition, iDipoleUnitVector, jDipolePosition,
   jDipoleUnitVector, iPointDipoleField, jPointDipolePotential, iF, iS, iiF},
  iDipolePosition[iVert_, iIOR_]:=If[iIOR=1, InsidePotentialDipolePositions,
   OutsidePotentialDipolePositions][[iVert]];
  iDipoleUnitVector[iVert_, iAxis_]:=vertexFrames[[iVert, iAxis]];
  iPointDipoleField[iAxis]:=

```
        If[iAxis=1, PointElectricDipoleField, MagneticDipole-
            Field];
    Sum[
        iS=If[iOID=1, 1, -1];
        iF=FfromFm[iPointDipoleField[iAxis][r-iDipoloPosi-
            tion [iVert, 1], iDipoleUnitVector[
            iVert, iAxis], (* iS* *)insideWavenumber], insideP-
                ermit, insidePermea];
        iiF=If[iOID=1, iF, {1, -1}*Conjugate[iF]];
        iiF*cij[jV,  jA]][[(((iVert-1)*2+(iOID-1))*3)+(iAxis-
            1)+1]],
        {iVert, 12}, {iOID, 2}, {iAxis, 3}]
    ]
FIn[{1, 2}, {0.1, 0.2, 0.3}]
{{1.20971×10⁻⁶-0.000732433            i,
1.21011×10⁻⁶-0.000695108              i,
-5.68005×10⁻⁷+0.00143564 i },
    {0.0928909+0.0000377187           i,
    -0.0922168-0.0000377363           i,
    0.00590386-6.349×10⁻⁸ i }}
FOut[{jV_, jA_}, r_]:=Module[
    {CentroidPosition, iDipolePosition, iDipoleUnitVector,
        jDipolePosition,
        jDipoleUnitVector, iPointDipoleField, jPointDipolePo-
            tential, iA},
    iDipolePosition[iVert_, iIOR_]:=If[iIOR=1, InsidePoten-
        tialDipolePositions,
        OutsidePotentialDipolePositions][[iVert]];
    iDipoleUnitVector[iVert_, iAxis_]:=vertexFrames[[iVert,
        iAxis]];
    iPointDipoleField[iAxis_]:=
        If[iAxis=1, PointElectricDipoleField, MagneticDipole-
            Field];
    FfromFm[iPointDipoleField[jA][r-iDipolePosition[jV,
        2],
        iDipoleUnitVector[jV, jA], outsideWavenumber], out-
            sidePermit, outsidePermea]
    ]
FOut[{1, 2}, {0.1, 2.2, 0.3}]
{{1.18169×10⁻⁶-0.000303837            i,
1.18169×10⁻⁶-0.000303837 i, -4.2914×10⁻⁶+0.00110341
i },
    {-0.0051243+0.0000371125          i,
    -0.00789384-0.000037293           i,
    -0.0035847-4.97057×10⁻⁸ i }}
FIO[{jV_, jA_}, r_]:=If[Norm[r]<sphereRadius, FIn[{jV,
    jA}, r], FOut[{jV,jA}, r]]
```

Figure 34:
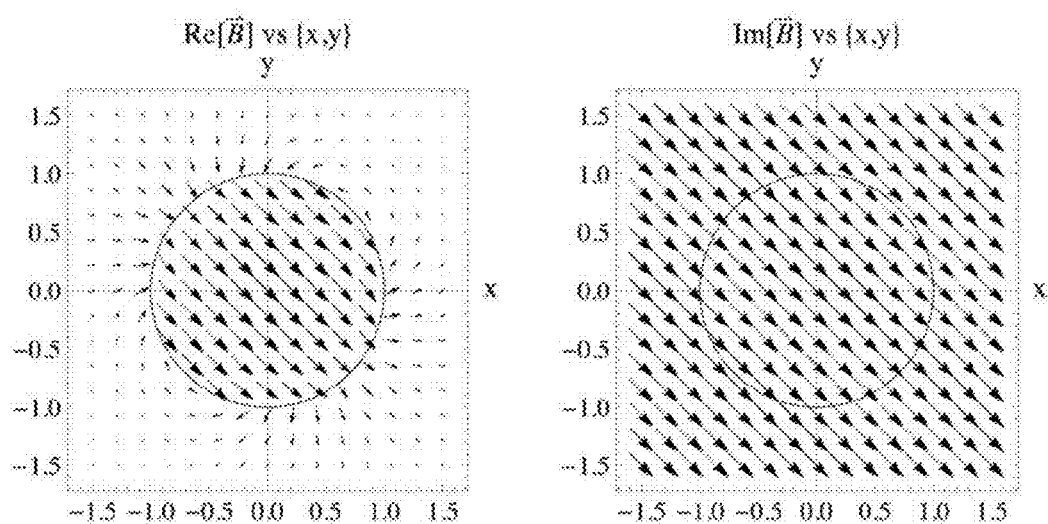
FIG. 34 shows frame vectors.

Note that the frame vectors (see the earlier listing of the Cartesian coordinates of the frame vectors) are chosen so that the axis of the magnetic dipole basis source used in the next figure, FIG. 34, is at 45 degrees to the x and y axes.

```
GraphicsRow[{Show[{VectorPlot[FIO[{1, 2}, {x, y, 0}][[2,
    {1, 2}]]//Re, {x, -3/2, 3/2},
    {y, -3/2, 3/2}, Axes→True, AxesLabel→{"x", "y"},
        PlotLabel→"Re[B⃗]"],
    ParametricPlot[{Cos [ϕ], Sin [ϕ]}sphereRadius, {ϕ, 0,
        2π}]}],
    Show[{VectorPlot[FIO[{1, 2}, {x, y, 0}][[2, {1, 2}]]//Im,
        {x, -3/2, 3/2},
    {y, -3/2, 3/2}, Axes→True, AxesLabel→{"x", "y"},
        PlotLabel→"Im[B⃗]"],
    ParametricPlot[{Cos [ϕ], Sin [ϕ]}sphereRadius, {ϕ, 0,
        2π}]}]},
    PlotLabel→"FIG. 34"]//Quiet
```

As in all VectorPlots, Mathematica automatically normalizes the vectors to make a visible plot, so vector magnitudes cannot be compared between two plots, such as the real and imaginary plots above. We should look at a representative numerical value to see the relative sizes of the real and imaginary parts:

```
FIO[{1, 2}, {0, 0, 0}][[2, {1, 2}]]
{0.114833+0.0000380343 i, -0.114833-0.0000380345 i }
```

Figure 35:
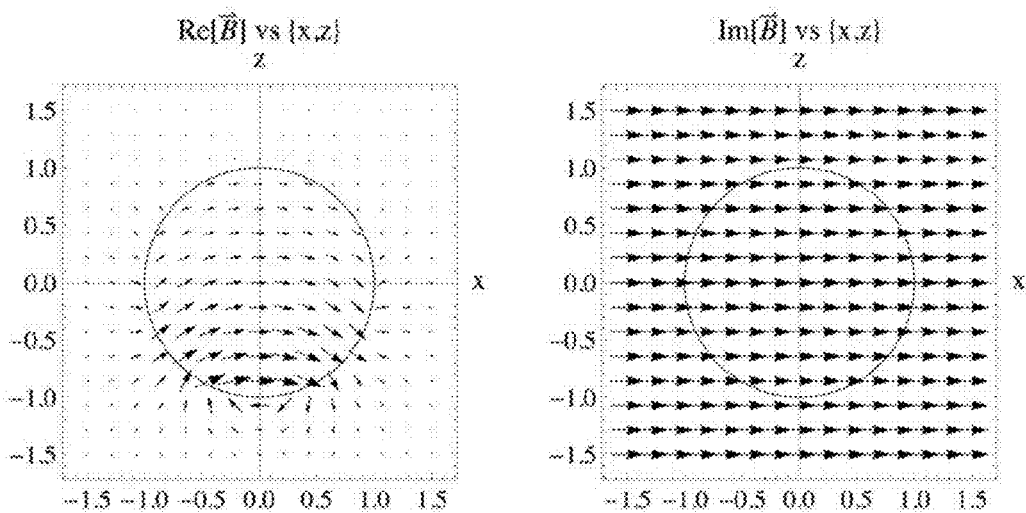
In FIG. 35, shows the magnetic field, B, in the x-z plane.

In FIG. 35, we look again at B but in the x-z plane:

```
GraphicsRow[{Show[{VectorPlot[FIO[{1, 2}, {x, 0, z}][[2,
    {1, 3}]]//Re, {x, -3/2, 3/2},
    {z, -3/2, 3/2}, Axes→True, AxesLabel→, {"x", "z"},
        PlotLabel→"Re[B⃗]"],
    ParametricPlot[{Cos [ϕ], Sin [ϕ]}sphereRadius, {ϕ, 0,
        2π}]}],
    Show[{VectorPlot[FIO[{1, 2}, {x, 0, z}][[2, {1, 3}]]//Im,
        {x, -3/2, 3/2},
    {z, -3/2, 3/2}, Axes→True, AxesLabel→{"x", "z"},
        PlotLabel→"Im[ϕ]"],
    ParametricPlot[{Cos [ϕ], Sin [ϕ]}sphereRadius, {ϕ, 0,
        2π}]}]},
    PlotLabel→"FIG. 35"]//Quiet
```

Figure 36:
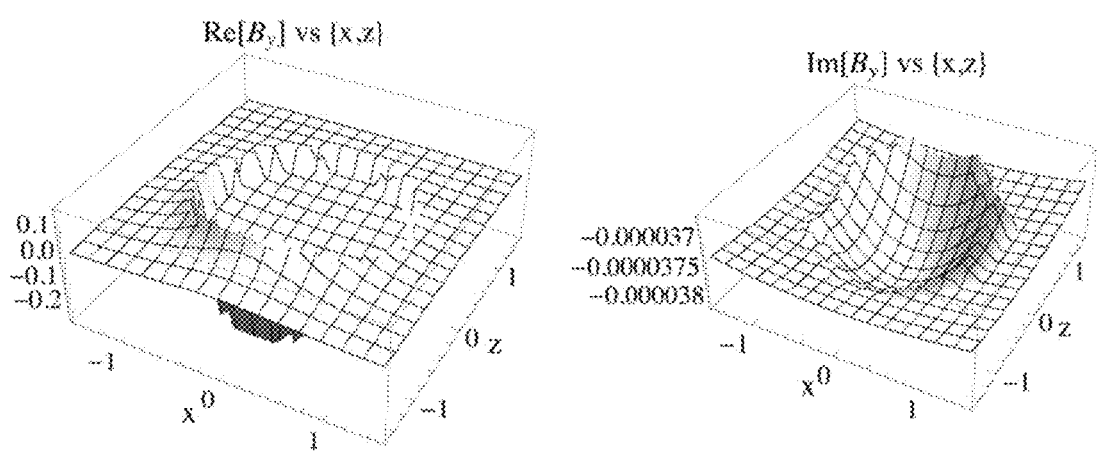
FIG. 36 shows a discontinuity in B at the boundary.

The next two plots, FIG. 36, may (and do) show discontinuity at the boundary. This is correct: these plots represent the y component of B, which is tangential to the boundary in the x-z plane being plotted, and continuity of this is not part of the definition of these basis functions.

```
GraphicsRow[{Plot3D[FIO[{1, 2}, {x, 0, z}][[2, 2]]//Re, {x,
    -3/2, 3/2},
    {z, -3/2, 3/2}, Axes→True, AxesLabel→{"x", "z"},
        PlotLabel→"Re[B_y] vs {x,z}"],
    Plot3D[FIO[{1, 2}, {x, 0, z}][[2, 2]]//Im, {x, -3/2, 3/2},
    {z, -3/2, 3/2}, Axes→True,
        AxesLabel→{"x", "z"}, PlotLabel→"Im[B_y] vs {x,z}"]},
    PlotLabel→"FIG. 36"]
```

Figure 37:
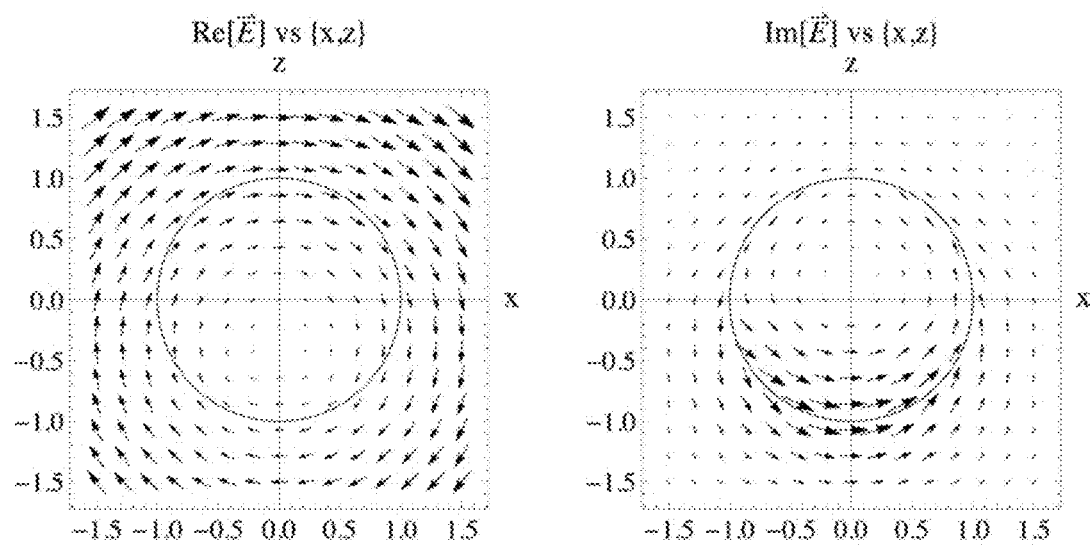
FIGS. 37 and 38 shows the E field of the {1,2} basis function.
Figure 38:
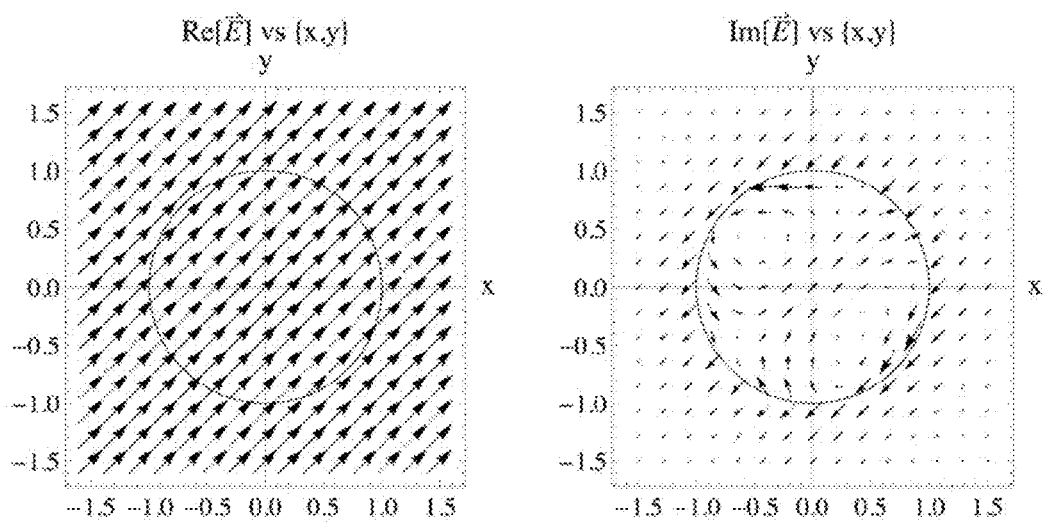

Now in FIGS. 37 and 38 we look at the E field of the same {1,2} basis function:

```
GraphicsRow[{Show[{VectorPlot[FIO[{1, 2}, {x, 0, z}][[1,
    {1, 3}]]//Re, {x, -3/2, 3/2},
    {z, -3/2, 3/2}, Axes→True, AxesLabel→{"x", "z"},
        PlotLabel→"Re[E⃗]"],
    ParametricPlot[{Cos [ϕ], Sin [ϕ]}sphereRadius, {ϕ, 0,
        2π}]}],
    Show[{VectorPlot[FIO[{1, 2}, {x, 0, z}][[1, {1, 3}]]//Im,
        {x, -3/2, 3/2},
    {z, -3/2, 3/2}, Axes→True, AxesLabel→{"x", "z"},
        PlotLabel→"Im[E⃗]"],
    ParametricPlot[{Cos [ϕ], Sin [ϕ]}sphereRadius, {ϕ, 0,
        2π}]}]},
    PlotLabel→"FIG. 37"]//Quiet
GraphicsRow[{Show[{VectorPlot[FIO[{1, 2}, {x, y, 0}][[1,
    {1, 2}]]//Re, {x, -3/2, 3/2},
    {y, -3/2, 3/2}, Axes→True, AxesLabel→{"x", "y"},
        PlotLabel→"Re[E⃗]"],
    ParametricPlot[{Cos [ϕ], Sin [ϕ]}sphereRadius, {ϕ, 0,
        2π}]}],
    Show[{VectorPlot[FIO[{1, 2}, {x, y, 0}][[1, {1, 2}]]//Im,
        {x, -3/2, 3/2},
    {y, -3/2, 3/2}, Axes→True, AxesLabel→{"x", "y"},
        PlotLabel→"Im[E⃗]"],
    ParametricPlot[{Cos [ϕ], Sin [ϕ]}sphereRadius, {ϕ, 0,
        2π}]}]}, PlotLabel→"FIG. 38"]
```

In the plot above, we see again that the tangential part of E has good continuity at the boundary for both real and imaginary parts, while the perpendicular part is not continuous for the imaginary part but is not expected to be continuous since this is not required until the next step, when a linear combination of basis functions is found such that the action is minimized.

Figure 39:
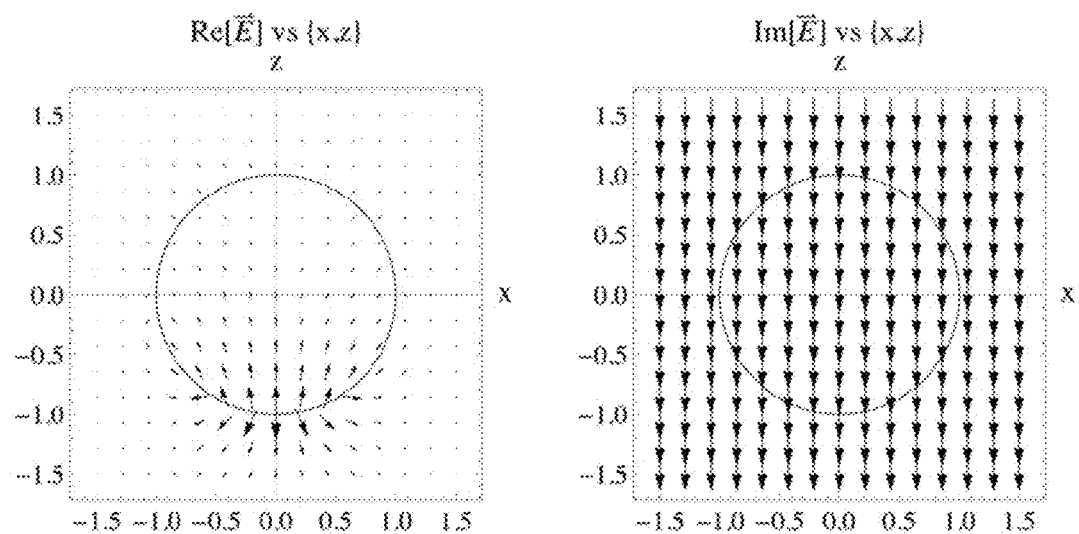
FIG. 39 below shows a couple of plots of the E field of basis function {1,1}, representing dipoles associated with vertex 1 and frame vector 1.

FIG. 39 below shows a couple of plots of the E field of basis function {1,1}, representing dipoles associated with vertex 1 and frame vector 1:

GraphicsRow[{Show[{VectorPlot[FIO[{1, 1}, {x, 0, z}][[1, {1, 3}]]//Re, {x, −3/2, 3/2},
   {z, −3/2, 3/2}, Axes→True, AxesLabel→{"x", "z"},
    PlotLabel→"Re[$\vec{E}$]"],
ParametricPlot[{Cos [ϕ], Sin [ϕ]}sphereRadius, {, 0, 2π}]
}],
Show[{VectorPlot[FIO[{1, 1}, {x, 0, z}][[1, {1, 3}]]//Im, {x, −3/2, 3/2},
   {z, −3/2, 3/2}, Axes→True, AxesLabel→{"x", "z"},
    PlotLabel→"Im[$\vec{E}$]"],
ParametricPlot[{Cos [ϕ], Sin [ϕ]}sphereRadius, {ϕ, 0, 2π}]}]},
PlotLabel→"FIG. 39"]//Quiet Continuous Potential for a Physical Source Now we repeat a procedure similar to that in the last two section, but this is for substantially continuous potential basis functions associated with physical (as opposed to only virtual) dipole sources. In general, we might have any of many possible specified physical sources or fields, including, for example, plane waves and waves from arbitrary driven networks of conductive wires or sheet-like objects (e.g., antennas). In this simple example, we calculate only for a specified physical dipole source, and in the numerical results of this example we choose it to be fairly close to the sphere (at Cartesian coordinates {−3,0,0}).

In the following expression, in {jPosition, jType, jMoment}, jPosition is the Cartesian coordinates of the position of the specified dipole, jType is its type (1 for electric, 2 for magnetic), and jMoment is the Cartesian coordinates of the dipole moment.

ADisASpec[{iVert_, iOutInDirection_, iAxis_}, (jPosition_, jType_, jMoment_}]:Module[
  {CentroidPosition, iDipolePosition, iDipoleUnitVector, jDipolePosition,
    jDipoleUnitVector, iPointDlipolePotential, jPointDlipolePotential, iA, jA, n,
    iWavenumber, iPermit, iPermea, jWavenumber, jPermait, jPermnea, iiA, jjA},
  iDipolePosition=InsidePotentialDipolePositions[[iVert]]//N;
  jDipolePosition=jPosition//N;
  iPointDlipolePotential=
    If[iAxis=1, PointElectricDipolePotential, PointMagneticDipolePotential];
  jPointDipolePotential=If[jType=1, PointElectricDlipolePotential,
    PointMagneticDlipolePotential];
  iDipoleUnitVector=vertexFramies [[iVert, iAxis]];
  jDipoleUnitVector=jMoment;
  iWavenumber=insideWavenumber;
  iPermit=insidePermit;
  iPermea=insidePermea;
  jWavenumber=outsideWavenumber;
  jPermit=outsidePermit;
  jPermea=outsidePermea;
  Sum[
    iA=AfroxAm[iPointipolePotential[boundaryPoint−iDipolePosition,
      iDipoleUnitVector, iWavenumber], iPermit, iPermea];
    jA=AfromAm[jPointipolePotential[boundaryPoint−jDipolePosition,
      jDipoleUnitVector, jWavenumber], jPermit, jPermea];
    iiA=If[ioutInDirection=1, iA, Conjugate[{1, −1}*iA]];
    jjA=jA;
    n=Normalize[boundaryPoint];
    Conjugate[Flatten[{iiA[[1]],n×iiA[[2]].Flatten[{jjA[[1]],n×jjA[[2]]}]*dArea,
    {boundaryPoint, integrandPoints}]
]

ADisASpec[{1, 1, 1}, {{1, 2, 3}, 2, {0, 0, 1}}]
$-1.15345 \times 10^{-8} - 1.97038 \times 10^{-9}$ i ADisASpecArray[{jPosition_, jType_, jMoment_}]:=
  ADisASpecArray[{jPosition, jType, jMoment}]=Table[
    ADisASpec[{iV, iIOD, iA}, {jPosition, jType, jMoment}], {iV, 1, 12}, {iIOD, 2}, {iA, 3}];

bat[{jPosition_, jType_, jMoment_}]:=bat[{jPosition, jType, jMoment}]=
  Flatten[ADisASpecArray[{jPosition, jType, jMoment}], 2];

We will look at example numerical data in many cases with the arbitrarily chosen specified dipole position of {−3, 0, 0}.

bat[{{3, 0, 0}, 2, {0, 1, 0}}]//Dimensions
{72} bat[{{−3, 0, 0}, 2, {0, 1, 0}}][[1;;4]]
{0.000911203+0.000371987 i,
0.0000985455−0.0000156032 i,
0.0000985455−0.0000156032 i,
−0.000917488+0.000356353 i} cij[{jPosition_, jType_, jMoment_}]:=cij[{jPosition, jType, jMoment}]=
  PseudoInverse[ADisADisMatrix].bat[{jPosition, jType, jMoment}];

cij[{{−3, 0, 0}, 2, {0, 1, 0}}]//Dimensions
{72} cij[{{0, 0, −4}, 2, {0, 1, 0}}][[1;;4]]
{$-2.57278 \times 10^{-8} + 7.27596 \times 10^{-8}$ i, −0.0504217+3.63148 i,
−0.0504223+3.63148 i, $2.25846 \times 10^{-8} - 7.0082 \times 10^{-8}$ i}

AIn[{jPosition_, jType_, jMoment_}, r_]:=Module[
  {CentroidPosition, iDipolePosition, iDipoleUnitVector, jDipolePosition,
    jDipoleUnitVector, iPointDipolePotential, jPointDipolePotential, iA, iiA},
  iDipolePosition[iVert_, iIO_]:=
    If[iIO=1, InsidePotentialDipolePositions, OutsidePotentialDipolePositions][[iVert]];
  iDipoleUnitVector[iVert_, iAxis_]:=vertexFrames[[iVert, iAxis]];
  iPointDipolePotential[iAxis_]:=
    If[iAxis=1, PointElectricDipolePotential, PointMagneticDipolePotential];
  Sum[
    iA=AfromAm[iPointDipolePotential[iAxis][r−iDipolePosition[iVert, 1],
      iDipoleUnitVector[iVert, iAxis], insideWavenumber], insidePermit, insidePermea];
    iiA=If[iOID=1, iA, Conjugate[{1, −1}*iA]];
    iiA*
      cij[{jPosition, jType, jMoment}][[((((iVert−1)*2+(iOID−1))*3)+(iAxis−1)+1]],
    {iVert, 12}, {iOID, 2}, (iAxis, 3}]
]

AIn[{{−3, 0, 0}, 2, {0, 1, 0}}, {0, 0.1, 0.2}]
{$6.84982 \times 10^{-12} - 1.02783 \times 10^{-7}$ i,
{−0.000620338−5.32903×10$^{-6}$ i,
$1.43943 \times 10^{-6} + 2.30699 \times 10^{-8}$ i,
0.00941244+0.0000810489 i}}

AOut[{jPosition_, jType_, jMoment_}, r_]:=Module[
  {CentroidPosition, iDipolePosition, iDipoleUnitVector,
    jDipolePosition,
    jDipoleUnitVector, iPointDipolePotential, jPointDi-
      polePotential, iA},
  iPointDipolePotential[iT_]:=If[iT=1, PointElectricDi-
    polePotential,
    PointMagneticDipolePotential];
  AfromAm[iPointDipolePotential[jType][r−jPosition,
    jMoment, outsideWavenumber],
    outsidePermit, outsidePermea]
]
AOut[{{−3, 0, 0}, 2, {0, 1, 0}}, {1, 1.1, 1.2}]
{0.+0. i, {−0.0012911−0.0000312413 i, 0.+0. i,
0.00430367+0.000104138 i }}
AIO[{jPosition_, jType_, jMoment_}, r]:=If[Norm[r]
<sphereRadius,
  AIn[{jPosition, jType, jMoment}, r], AOut[{jPosition,
    jType, jMoment}, r]]
AIO[{{−3, 0, 0}, 2, {0, 1, 0}}, {0.1, 0.2, 0.3}]
{4.96744×10$^{-12}$−9.57318×10$^{-8}$ i,
  {−0.000828227−7.94339×10$^{-6}$    i,
   4.54548×10$^{-6}$+6.84013×10$^{-8}$    i,
   0.00873007+0.0000835047 i }}

Figure 40:
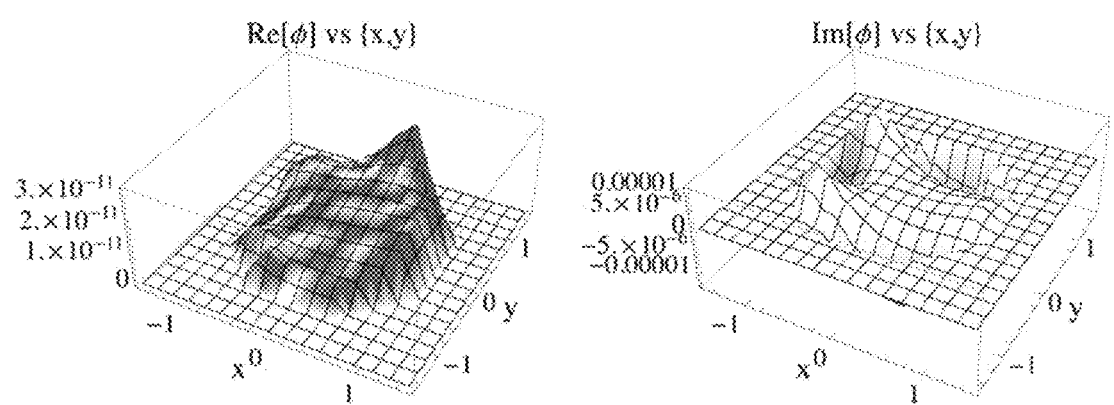
FIGS. 40 and 41 show a substantially continuous scalar potential associated with the specified external source, a dipole at {−3, 0, 0} of type 2 (magnetic) with moment {0,1, 0}.
Figure 41:
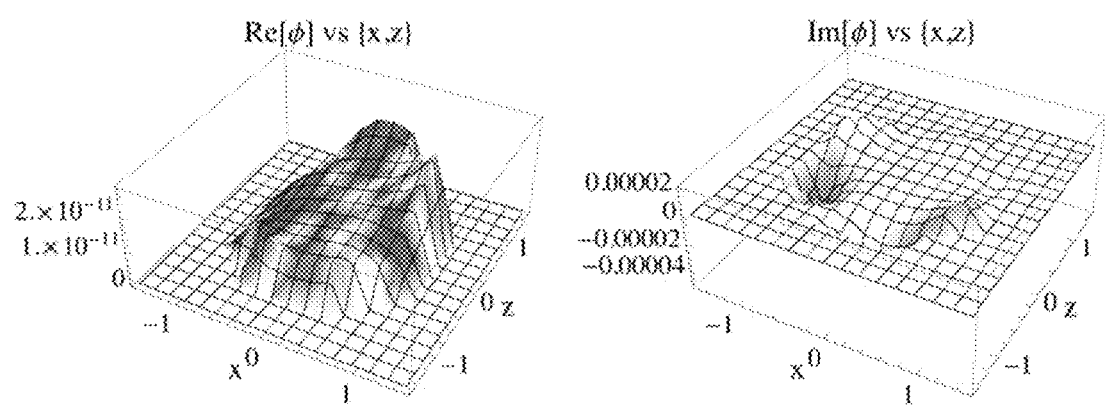

FIGS. 40 and 41 below show the substantially continuous scalar potential associated with the specified external source, a dipole at {−3, 0, 0} of type 2 (magnetic) with moment {0,1,0}. As for all magnetic dipoles, the scalar potential should be zero every where, so these figures show the very small error in this:

GraphicsRow[{Plot3D[AIO[{{−3, 0, 0}, 2, {0, 1, 0}}, {x, y, 0}][[1]]//Re, {x, −3/2, 3/2},
  {y, −3/2, 3/2}, PlotRange→All, AxesLabel→{"x", "y"},
    PlotLabel→"Re[φ] vs {x,y}"],
  Plot3D[AIO[{{−3, 0, 0}, 2, {0, 1, 0}}, {x, y, 0}][[1]]//Im,
    {x, −3/2, 3/2},
    {y, −3/2, 3/2}, PlotRange→All, AxesLabel→{"x",
      "y"},
    PlotLabel→"Im[φ] vs {x,y}"]}, PlotLabel→"FIG. 40"]
GraphicsRow[{Plot3D[AIO[{{−3, 0, 0}, 2, {0, 1, 0}}, {x, 0, z}][[1]]//Re, {x, −3/2, 3/2},
  {z, −3/2, 3/2}, PlotRange→All, AxesLabel→{"x", "z"},
    PlotLabel→"Re[φ] vs {x,z}"],
  Plot3D[AIO[{{−3, 0, 0}, 2, {0, 1, 0}}, {x, 0, z}][[1]]//Im,
    {x, −3/2, 3/2},
    {z, −3/2, 3/2}, PlotRange→All, AxesLabel→{"x",
      "z"},
    PlotLabel→"Im[φ] vs {x,z}"]}, PlotLabel→"FIG. 41"]

Figure 42:
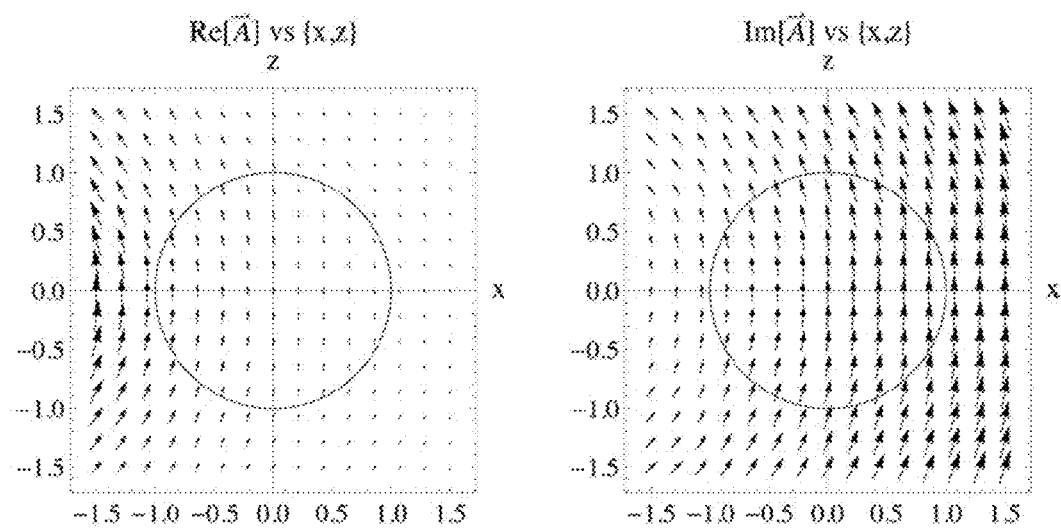
FIGS. 42 and 43, show a vector potential.
Figure 43:
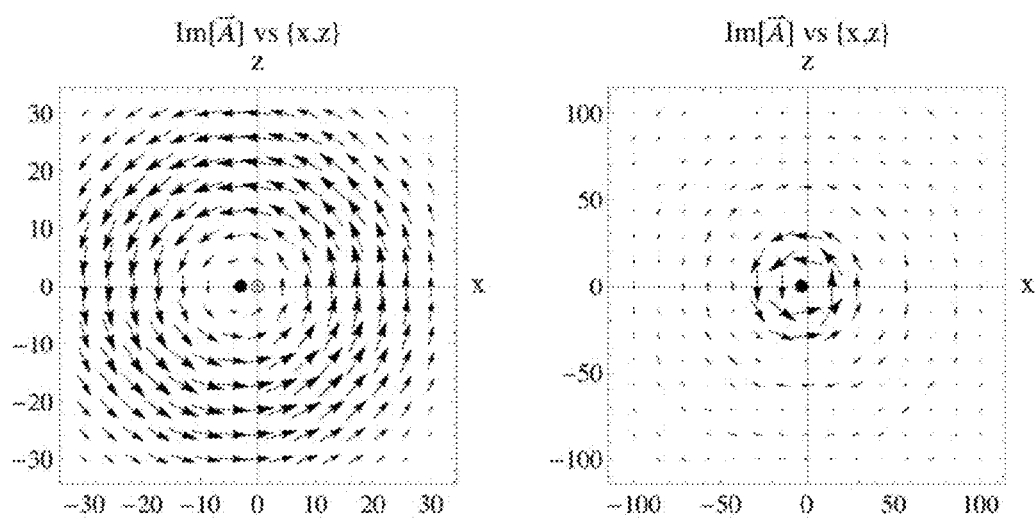

The next two figures, FIGS. 42 and 43, show the vector potential.
GraphicsRow[
  {Show[{VectorPlot[AIO[{{−3, 0, 0}, 2, {0, 1, 0}}, {x, 0, z}][[2, {1, 3}]]//Re, {x, −3/2,
    3/2}, {z, −3/2, 3/2}, Axes→True, AxesLabel→{"x",
      "z"}, PlotLabel→"Re[$\vec{A}$]"],
    ParametricPlot[{Cos [φ], Sin [φ]}sphereRadius, {φ, 0,
      2π}]}],
  Show[{VectorPlot[AIO[{{−3, 0, 0}, 2, {0, 1, 0}}, {x, 0, z}][[2, {1, 3}]]//Im,
    {x, −3/2, 3/2}, {z, −3/2, 3/2}, Axes→True,
      AxesLabel→{"x", "z"},
    PlotLabel→"Im[$\vec{A}$]"], ParametricPlot[{Cos [φ], Sin
      [φ]}sphereRadius,
    {φ, 0, 2π}]}]}, PlotLabel→"FIG. 42"]//Quiet AIO[{{−3, 0, 0}, 2, {0, 1, 0}}, {0, 0, 0}][[2, {1, 3}]]
{6.06221×10$^{-7}$−1.02686×10$^{-9}$    i,
0.00949592+0.0000811211 i }
GraphicsRow[
  {Show[VectorPlot[AIO[{{−3, 0, 0}, 2, {0, 1, 0}}, {x, 0, z}][[2, {1, 3}]]//Im, {x, −30, 30},
    {z, −30, 30}, Axes→True, AxesLabel→{"x", "z"},
    PlotLabel→"Im[$\vec{A}$]"],
  ParametricPlot[{Cos [φ], Sin [φ]}sphereRadius, {, 0, 2π}],
  Graphics[{Red, PointSize[Medium], Point [{−3, 0}]}]],
  Show[VectorPlot[AIO[{{−3, 0, 0}, 2, {0, 1, 0}}, {x, 0, z}][[2, {1, 3}]]//Im,
    {x, −100, 100}, {z, −100, 100}, Axes→True,
      AxesLabel→{"x", "z"},
    PlotLabel→"Im[$\vec{A}$]"], ParametricPlot[{Cos [φ], Sin
      [φ]}sphereRadius, {φ, 0, 2π}],
  Graphics[{Red, PointSize[Medium], Point[{−3, 0}]}]]},
  PlotLabel→"FIG. 43"]//Quiet The two plots of FIG. 43 do not show anything about the continuity of this basis function at the boundary, but rather just show that the basis function is clearly a wave at larger distances, as of course it must be for a frequency of 0.1. The physical dipole is plotted as a red dot. The real part is not plotted because it gets very large near the dipole source (instead of going to zero like the imaginary part), resulting in a figure that is not very enlightening.

Field F of the Continuous Potential for a Specified Source

This section continues the development of a specified source, calculating and plotting the associated field F~E+III B.

Now that we have the matrix for generating the continuous basis potentials from the discontinuous basis potentials, we can use the same matrix to create associated fields F=$\epsilon_0$E+III (1/c)B/$\mu_0$ and G=D+III(1/c)H.

Figure 44:
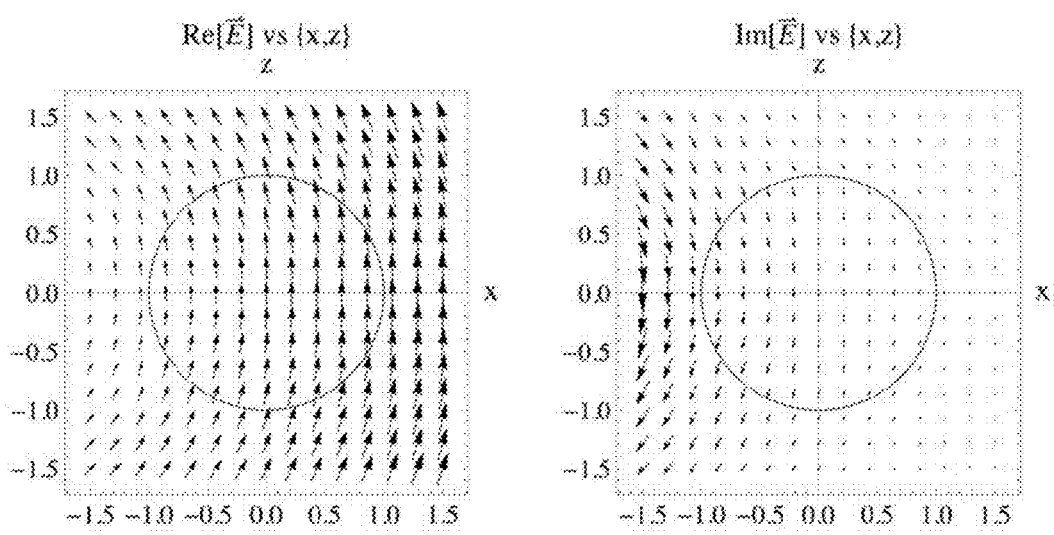
FIG. 44 is a plot of the real and imaginary parts of the electric field.
Figure 45:
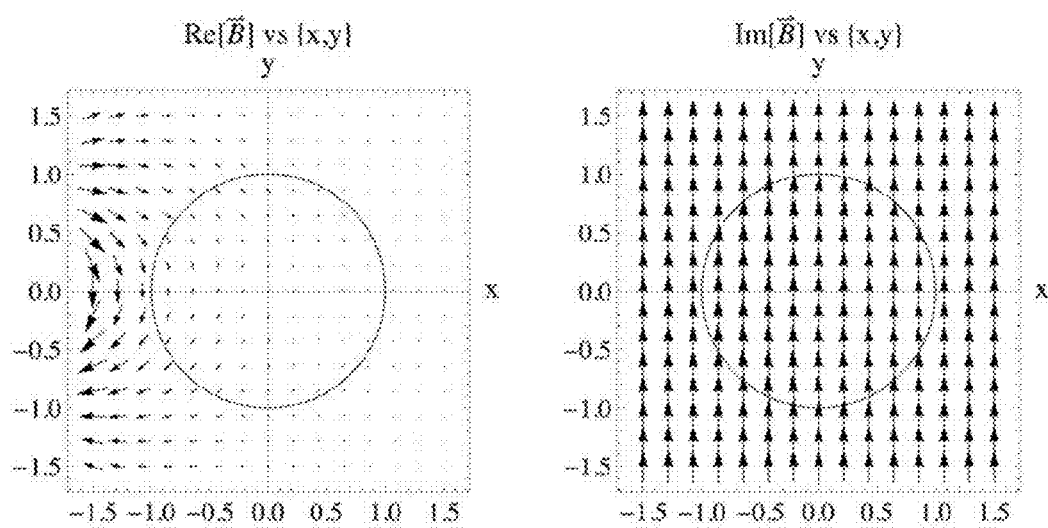
FIG. 45 is another plot of a vector potential.

FIn[{jP_, jT_, jM}, r_]:=Module[
  {CentroidPosition, iDipolePosition, iDipoleUnitVector,
    jDipolePosition,
    jDipoleUnitVector, iPointDipoleField, jPointDipolePo-
      tential, iF, iS, iiF},
  iDipolePosition[iVert_, iIOR_]:=If[iIOR=1, InsidePoten-
    tialDipolePositions,
    OutsidePotentialDipolePositions][[iVert]];
  iDipoleUnitVector[iVert_, iAxis_]:=vertexFrames[[iVert,
    iAxis]];
  iPointDipoleField[iAxis_]:=
    If[iAxis=1, PointElectricDipoleField, MagneticDipole-
      Field];
  Sum[
    iF=FfromFm[iPointDipoleField[iAxis][r−iDipolePosi-
      tion[iVert, 1],
      iDipoleUnitVector[iVert, iAxis], insideWavenum-
        ber], insidePermit, insidePermea];
    iiF=If[iOID=1, iF, {1, −1}*Conjugate[iF]];
    iiF*cij[{jP, jT, jM}][[(((iVert−1)*2+(iOID−1))*3)+
      (iAxis−1)+1]],
    {iVert, 12}, {iOID, 2}, {iAxis, 3}]
]
FOut[{jP_, jT_, jM_}, r_]:=Module[
  {CentroidPosition, jDipolePosition,
    jDipoleMoment, jPointDipoleField, jPointDipolePo-
      tential, iA},
  jDipolePosition=jP;
  jDipoleMoment=jM;
  jPointDipoleField=If[jT=1,    PointElectricDipoleField,
    MagneticDipoleField];

FfromFm[jPointDipoleField[r−jDipolePosition, jDipoleMoment, outsideWavenumber],
outsidePermit, outsidePermea]
]
FIO[{jP_, jT_, jM_}, r_]:=
If[Norm[r]<sphereRadius, FIn[{jP, jT, jM}, r], FOut[{jP, jT, jM}, r]]
vertexCoordinates//N
{{0., 0., −1.}, {0., 0., 1.}, {−0.894427, 0., −0.447214}, {0.894427, 0., 0.447214},
{0.723607, −0.525731, −0.447214}, {0.723607, 0.525731, −0.447214},
{−0.723607, −0.525731, 0.447214}, {−0.723607, 0.525731, 0.447214},
{−0.276393, −0.850651, −0.447214}, {−0.276393, 0.850651, −0.447214},
{0.276393, −0.850651, 0.447214}, {0.276393, 0.850651, 0.447214}}
GraphicsRow[
{Show[{VectorPlot[Re[FIO[{{−3, 0, 0}, 2, {0, 1, 0}}, {x, 0, z}][[1, {1, 3}]]], {x, −3/2, 3/2}, {z, −3/2, 3/2}, Axes→True, AxesLabel→{"x", "z"}, PlotLabel→"Re[$\vec{E}$]"],
ParametricPlot[{Cos [ϕ], Sin [ϕ]}sphereRadius, {ϕ, 0, 2π}]}], Show[
{VectorPlot[Im[FIO[{{−3, 0, 0}, 2, {0, 1, 0}}, {x, 0, z}][[1, {1, 3}]]], {x, −3/2, 3/2}, {z, −3/2, 3/2}, Axes→True, AxesLabel→{"x", "z"}, PlotLabel→"Im[$\vec{E}$]"],
ParametricPlot[{Cos [ϕ], Sin [ϕ]}sphereRadius, {ϕ, 0, 2π}]}]},
PlotLabel→"FIG. 44"]//Quiet
FIO[{{0, 0, −4}, 2, {0, 1, 0}}, {0.1, 0.2, 0.3}]
{{−0.0000114634+0.000478646 i,
−3.04396×10⁻⁹+1.91846×10⁻⁷ i,
2.58983×10⁻⁷−0.0000109885 i },
{4.79868×10⁻⁶+1.60332×10⁻⁸ i,
−0.0010292+0.0000494028 i , 0.000214894+1.59011×10⁻⁶ i }}
GraphicsRow[
{Show[{VectorPlot[Re[FIO[{{−3, 0, 0}, 2, {0, 1, 0}}, {x, y, 0}][[2, {1, 2}]]], {x, −3/2, 3/2}, {y, −3/2, 3/2}, Axes→True, AxesLabel→{"x", "y"}, PlotLabel→"Re[$\vec{B}$]"],
ParametricPlot[{Cos [ϕ], Sin [ϕ]}sphereRadius, {ϕ, 0, 2π}]}], Show[
{VectorPlot[Im[FIO[{{−3, 0, 0}, 2, {0, 1, 0}}, {x, y, 0}][[2, {1, 2}]]], {x, −3/2, 3/2}, {y, −3/2, 3/2}, Axes→True, AxesLabel→{"x", "y"}, PlotLabel→"Im[$\vec{B}$]"],
ParametricPlot[{Cos [ϕ], Sin [ϕ]}sphereRadius, {ϕ, 0, 2π}]}]},
PlotLabel→"FIG. 45"]//Quiet We see that all of these plots look very good: they are solutions to Maxwell's equation for non-boundary points, and they satisfy the homogeneous Maxwell boundary conditions at boundary points.

Figure 46:
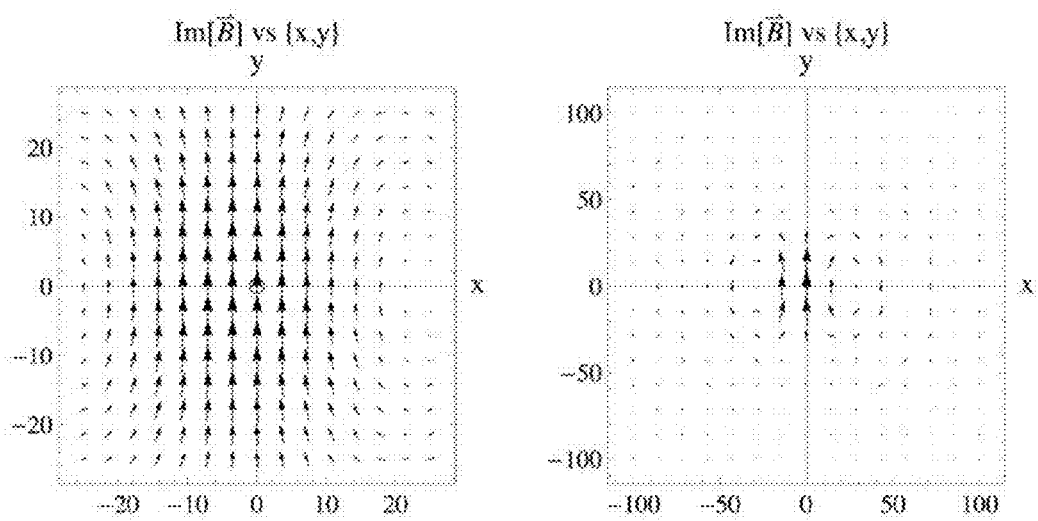
FIG. 46 shows that the example of FIG. 45 example is for wavelengths that are large, but not very much larger, than the size of the object.

The two plots below, in FIG. 46, just show that this example is for wavelengths that are large, but not very much larger, than the size of the object. Again, only the imaginary parts are plotted because the real parts get very large near the dipole and so result in unhelpful plots.
GraphicsRow[
{Show[{VectorPlot[Im[FIO[{{−3, 0, 0}, 2, {0, 1, 0}}, {x, y, 0}][[1, {1, 2}]]], {x, −25, 25},
{y, −25, 25}, Axes→True, AxesLabel→{"x", "y"}, AspectRatio→1, PlotLabel→"Im[$\vec{B}$]"],
ParametricPlot[{Cos [ϕ], Sin [ϕ]}sphereRadius, {ϕ, 0, 2π}]}],
Show[{VectorPlot[Im[FIO[{{−3, 0, 0}, 2, {0, 1, 0}}, {x, y, 0}][[2, {1, 2}]]], {x, −100, 100}, {y, −100, 100}, Axes→True,
AxesLabel→{"x", "y"}, AspectRatio→1, PlotLabel→"Im[$\vec{B}$]"],
ParametricPlot[{Cos [ϕ], Sin [ϕ]}sphereRadius, {ϕ, 0, 2π}]}]}, PlotLabel→"FIG. 46"]

Parameter Solution Determined by Boundary Condition

Now I want to evaluate the matrix elements used to find the parameters or coefficients in a linear combination of basis functions that minimize the action. Recall that such a combination results in fields that satisfy the usual inhomogeneous Maxwell boundary conditions. These matrix elements are given by equations given earlier, copied here, $$M_{ij} = \int (\phi_i(\hat{n} \cdot \triangle \vec{d}_j) - \vec{a}_i \cdot (\hat{n} \times \triangle \vec{h}_j)) d\Sigma$$

$$B_i = -\int (\phi_i(\hat{n} \cdot \triangle \vec{d}_0) - \vec{a}_i \cdot (\hat{n} \times \triangle \vec{h}_0)) d\Sigma d_0$$

which are used to solve the matrix equation, copied here:

$$M_{ij}c_j = B_i$$

In these equations, the dummy indices i and j range over all boundary potential basis functions (indicated by using dummy indices b and b' in a previous section) and not over physical source basis functions. In this example, this corresponds to i and j ranging over all values except 0, which represents the one and only physical source in this example.

Recall or note that G={D, (1/c)H} is the numerical value of the electric displacement D and (1/c times) the numerical value of the magnetic field H, in SI units.

G is defined simply in terms of F={($\epsilon_0 \vec{E}$, (1/c)$\vec{B}/\mu_0$} in the usual way:
GIn[{jV_, jA_}, r_]:=FIn[{jV, jA}, r]*{insidePermit, 1/insidePermea}
GIn[{2, 3}, {0.1, 0.2, 0.4}]
{{3.58272×10⁻⁷−0.0111124 i, −3.57265×10⁻⁷+0.0116767 i, 5.70691×10⁻⁷−0.00200258 i },
{−0.0310004−7.60242×10⁻⁶ i, −0.0308275−7.60607×10⁻⁶ i, −0.00810121+1.41984×10⁻⁸ i }}
GOut[{jV_, jA_}, r_]:=FOut[{jV, jA}, r]*{outsidePermit, 1/outsidePermea}
GOut[{2, 3}, {1, 2, 0.4}]
{{1.24419×0⁻⁷−0.0000343361 i,
−1.24419×10⁻⁷+0.0000343361 i,
1.86629×10⁻⁶−0.000515042 i },
{−0.00421034−0.0000372509 i,
−0.0133258−0.000037363 i, −0.000607699−7.47585×10⁻⁹ i }}
Dimensions[integrandPoints]
{42, 3}
GInArray[ ]=Table[GIn[{jVert, jAxis}, boundaryPoint], {jVert, 12}, {jAxis, 3}, {boundaryPoint, integrandPoints}];
GOutArray[ ]=Table[GOut[{jVert, jAxis}, boundaryPoint], {jVert, 12}, {jAxis, 3}, {boundaryPoint, integrandPoints}];

Dimensions [GInArray[ ]]
{12, 3, 42, 2, 3}
Dimensions [GOutArray[ ]]
{12, 3, 42, 2, 3}
GInArray[ ][[1, 1, 1]]
{{$-2.86526\times10^{-10}-5.18671\times10^{-10}$i,
$1.17483\times10^{-9}+4.13714\times10^{-10}$ i, $0.0692073-0.000161143$ i},
  {$2.40849\times10^{-10}-3.13377\times10^{-10}$ i,
    $3.75522\times10^{-10}+2.02144\times10^{-10}$ i,
    $2.79014\times10^{-11}-6.6787\times10^{-11}$ i}}
GOutArray[ ][[1, 1, 1]]
{{$0.+0.$ i, $0.+0.$ i, $-0.0677377-0.0000529574$ i}, {$0.+0.$ i, $0.+0.$ i, $0.+0.$ i}}
ABoundaryArray=
   Table[(AIn[{jVert, jAxis}, boundaryPoint]+AOut[{jVert, jAxis}, boundaryPoint])/2,
      {jVert, 12}, {jAxis, 3}, {boundaryPoint, integrandPoints}];
ABoundaryArray//Dimensions
{12, 3, 42, 2}
Clear[Mij]
MijElements[{iVert_, iAxis_}, {jVert_, jAxis_}]:=Module
[{r, n, delGj, ndelGj, ai},
   Sum[
      r=integrandPoints [[b]];
      n=Normalize[r]; (* only valid in special cases like this icosahedron example!*)
      delGj=GOutArray[ ][[jVert, jAxis, b]]−GInArray[ ][[jVert, jAxis, b]];
      ndelGj={n.delGj[[1]], −n×delGj[[2]]};
      ai=ABoundaryArray[[iVert, iAxis, b]];
      Conjugate[Flatten[ai]].Flatten[ndelGj],
      {b, Length[integrandPoints]}]
   ]
Timing[MijElements[{1, 1}, {2, 1}]]
{0.008078, $-0.287307+0.000718335$ i}
GIn[{jPosition_, jType_, jMoment_}, r_]:=
   {insidePermit, 1/insidePermea}*FIn[{jPosition, jType, jMoment}, r]
GIn[{{−3, 0, 0}, 2, {0, 1, 0}}, {0.1, 0.2, 0.3}]
{{$-2.38298\times10^{-6}+0.000240996$ i,
$2.05197\times10^{-8}+8.51335\times10^{-6}$ i, $0.0000250515-0.00262802$ i},
  {$0.000115571+2.36452\times10^{-7}$ i,
    $-0.000525306+0.0000104031$ i,
    $3.57634\times10^{-6}+9.63655\times10^{-9}$ i}}
GOut[{jPosition_, jType_, jMoment_}, r_]
   {outsidePermit, 1/outsidePermea}*FOut[{jPosition, jType, jMoment}, r]
GOut[{{−3, 0, 0}, 2, {0, 1, 0}}, {0.1, 2, 3.3}]
{{$-8.54093\times10^{-6}+0.000241473$ i, $0.+0.$ i, $8.0233\times10^{-6}-0.000226838$ i},
  {$0.00051972+3.23203\times10^{-7}$ i,
    $-0.000254957+0.0000506945$ i,
    $0.00055325+3.44055\times10^{-7}$ i}}
GInArray[{jPosition_, jType_, jMoment_}]:=GInArray
[{jPosition, jType, jMoment}]=Table[
   GIn[{jPosition, jType, jMoment}, boundaryPoint],
   {boundaryPoint, integrandPoints}];
GOutArray[{jPosition_, jType_, jMoment_}]:=GOutArray
[{jPosition, jType, jMoment}]=Table[
   GOut[{jPosition, jType, jMoment}, boundaryPoint],
   {boundaryPoint, integrandPoints}];
BiElements[{iVert_, iAxis_}, {jPosition_, jType_, jMoment_}]:=
   Module[{r, n, delGj, ndelGj, ai},
      −sum[
         r=integrandPoints[[b]];
         n=Normalize[r];

(* only valid in special cases like this icosahedron example!*)
         delGj=GOutArray[{jPosition, jType, jMoment}][[b]]−
         GInArray[{jPosition, jType, jMoment}][[b]];
         ndelGj={n.delGj[[1]], −n×delGj[[2]]};
         ai=ABoundaryArray[[iVert, iAxis, b]];
         Conjugate[Flatten[ai]].Flatten[ndelGj],
         {b, Length[integrandPoints]}]
      ]
BiElements[{1, 2}, {{−3, 0, 0}, 2, {0, 1, 0}}]
$0.00353349-0.0000673343$ i
Timing[BiElements[{1, 2}, {{−3, 0, 0}, 2, {0, 1, 0}}]]
{0.008198, $0.00353349-0.0000673343$ i }
MijElements[{1, 2}, {2, 1}]
$9.31171\times10^{-10}+1.96883\times10^{-9}$i
Mij=Table[MijElements[i, j], {i, Flatten[Table[{iV, iA}, {iV, 12}, {iA, 3}], 1]},
   {j, Flatten[Table[{jV, jA}, {jV, 12}, {jA, 3}], 1]}];
Dimensions[Mij]
{36, 36}
Bi[{jPosition_, jType_, jMoment_}]:=
   Bi[{jPosition, jType, jMoment}]=Table[BiElements[i, {jPosition, jType, jMoment}],
      {i, Flatten[Table[{iV, iA}, {iV, 12}, {iA, 3}], 1]}];
Bi[{{−3, 0, 0}, 2, {0, 1, 0}}]//Timing
{0.279801,
  {$-0.0000154472+0.00212148$ i,
    $0.00353349-0.0000673343$ i,
    $0.00353349-0.0000673343$ i,
    $0.0000154478-0.00210332$ i,
    $-0.00351065+0.0000673344$ i,
    $0.00351065-0.0000673345$ i,
    $-6.92762\times10^{-6}+0.00143421$ i,
    $-0.00279257+0.0000388044$ i,
    $0.00624437-0.0000867694$ i,
    $6.89361\times10^{-6}-0.000692489$ i,
    $0.00156774-0.0000389464$ i,
    $0.00350558-0.0000870866$ i,
    $-6.89259\times10^{-6}+0.000715695$ i,
    $0.00277515-0.0000651538$ i,
    $0.00242714-0.0000485082$ i,
    $-6.89254\times10^{-6}+0.000715696$ i,
    $0.00342567-0.000072884$ i,
    $0.00136281-0.00000358607$ i,
    $6.92039\times10^{-6}-0.0012624$ i,
    $-0.00409672+0.0000723698$ i,
    $0.00274654-0.0000358842$ i,
    $6.92059\times10^{-6}-0.0012624$ i,
    $-0.00431265+0.0000649403$ i,
    $0.00239327-0.0000480399$ i,
    $-6.91449\times10^{-6}+0.00100584$ i,
    $0.00211736-0.0000227214$ i,
    $-0.00138178+0.0000443868$ i,
    $-6.91422\times10^{-6}+0.00100585$ i, $0.00165808-9.69908\times10^{-6}$ i, $0.00190874-0.0000489121$ i,
    $6.90367\times10^{-6}-0.000839403$ i,
    $0.000372784+9.13468\times10^{-6}$ i,
    $0.00302993-0.0000494262$ i,
    $6.90383\times10^{6}-0.000839402$ i,
    $-0.000471118+0.0000223195$ i,
    $-0.00301621+0.0000450359$ i}}
Dimensions[Bi[{{−3, 0, 0}, 2, {0, 1, 0}}]]
{36}
Det[Mij]
$1.06913\times10^{-42}-1.58155\times10^{-45}$ i Now we finally write an expression for the coefficients cij that are, essentially, the solution to the simulation problem:
Clear[cj]
cj[{jPosition_, jType_, jMoment_}]:= cj[{jPosition, jType, jMoment}]=PseudoInverse[Mij].Bi
[{jPosition, jType, jMoment}]

Check an example to make sure the result is plausible:

cj[{{-3, 0, 0}, 2, {0, 1, 0}}]

{-0.0000104354+0.00117721 i,
-0.00146225-0.0000325934 i,
-0.00146225-0.0000325938 i,
0.0000104413-0.000897095 i,
-0.0033406+0.0000325356 i,
0.0033406-0.0000325363 i,
-4.69918×10$^{-6}$+0.00153851 i,
-0.00687515+0.000016221 i,
0.0153733-0.0000362668 i,
4.64178×10$^{-6}$-0.000243216 i,
0.0005085-0.0000213212 i,
0.00113704-0.0000476717 i,
-4.6378×10$^{-6}$+0.000173961 i,
-0.000207022-0.000035099 i,
-0.00140622-0.0000286665 i,
-4.63789×10$^{-6}$+0.000173961 i,
-0.00134588-0.0000415203 i,
0.000457087-0.0000181624 i,
4.69492×10$^{-6}$-0.0012167 i, 0.00505055+0.0000286028 i, 0.00657832-0.0000165175 i,
4.69504×10$^{-6}$-0.0012167 i,
-0.00355099+0.0000277442 i,
-0.00749486-0.0000179202 i,
-4.67589×10$^{-6}$+0.000435258 i,
0.00115974-0.0000141574 i,
-0.00325891+0.0000155605 i,
-4.6757×10$^{-6}$+0.000435259 i,
0.000223062-9.35667×10$^{-6}$ i,
0.00345192-0.0000188447 i,
4.66204×10$^{-6}$-0.000273382 i, 0.0046557-2.13439×10$^{-7}$ i, 0.00135437-0.0000286808 i,
4.66207×10$^{-6}$-0.000273381 i, 0.00410691+7.6459×10$^{-6}$ i, -0.00257743+0.0000276424 i} cj[{{-3, 0, 0}, 2, {0, 1, 0}}]//Dimensions

{36}

Now use these coefficients to write an expression for the field F={$\epsilon_0 \vec{E}$, $(1/c)\vec{B}/\mu_0$}:

FSolu[{jP_, jT_, jM_}, r_]:=FIO[{jP, jT, jM}, r]+
cj[{jP, jT, jM}].Table[FIO[j, r], {j, Flatten[Table[{jV, jA},
{jV, 12}, {jA, 3}], 1]}]

In the next section we look at this solution for a one example for the physcal dipole source.

Plots for a Solution with a Specified Physical Magnetic Dipole Source

As an example of solution results, we look at the field F around this ball, which has relative permittivity 3 and relative permeability 5, due to a dipole characterized by {{-3,0,0}, 2, {0,1,0}}: located at the point {-3,0,0} (at -3 on the x axis), of type 2 (magnetic dipole), and with a moment equal to {0,1,0} (parallel to the y axis). We look at a variety of field components in various planes, sometimes the real part and sometimes the imaginary part (corresponding to the field 1/4 cycle later).

Figure 47:
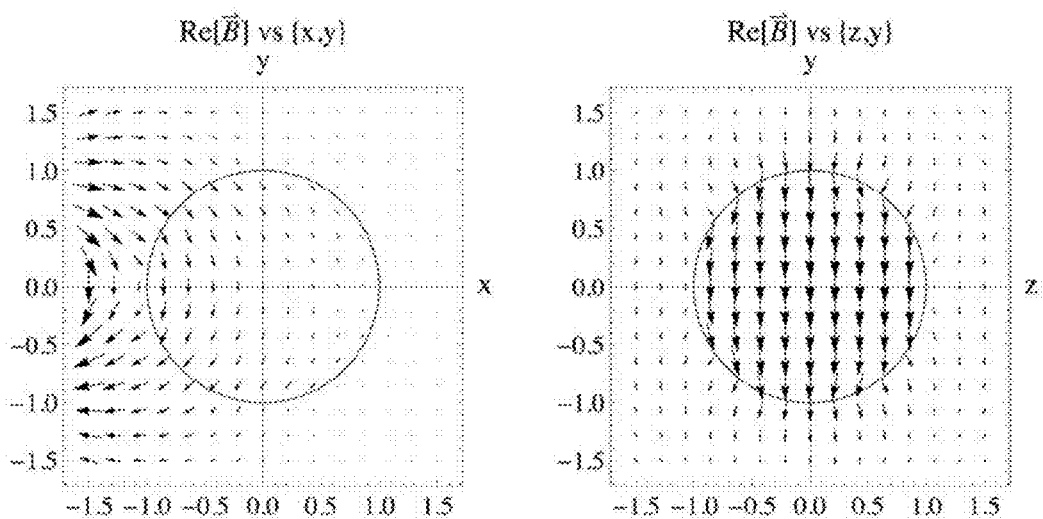
FIGS. 47 and 48 show the real and imaginary parts of the B field in the {x,y} and {z,y} planes.
Figure 48:
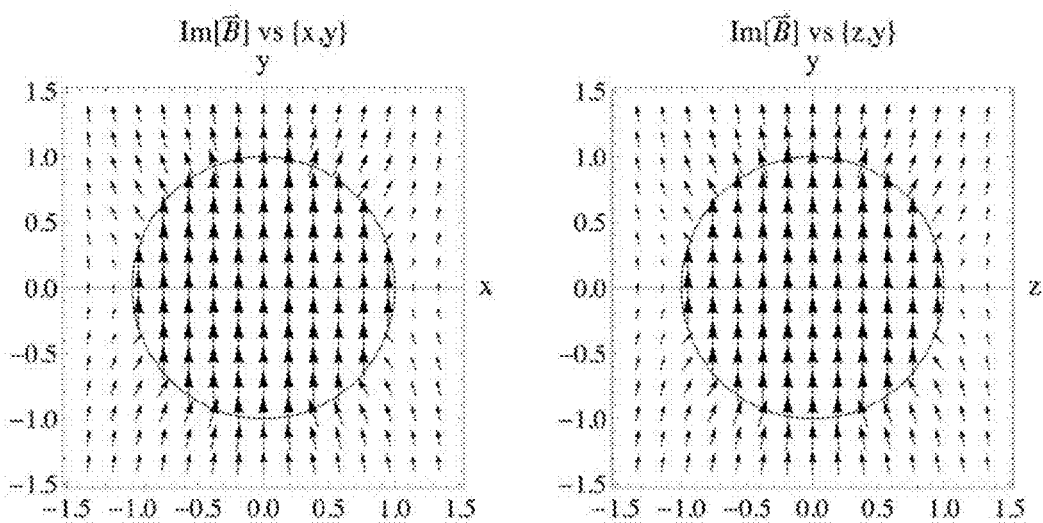

FIGS. 47 and 48 show the real and imaginary parts of B in the {x,y} and {z,y} planes.

FSolu[{{-3, 0, 0}, 2, {0, 1, 0}}, {1, 2, 3}]

{{-7.70568×10$^{-6}$+0.000158859 i,
8.30402×10$^{-8}$-9.31969×10$^{-6}$ i,
0.0000106185-0.000234389 i},
{0.000429137+6.97908×10$^{-7}$ i,
-0.000227677+0.000049124 i,
0.000297142+1.04071×10$^{-6}$ i}}

Figure 49:
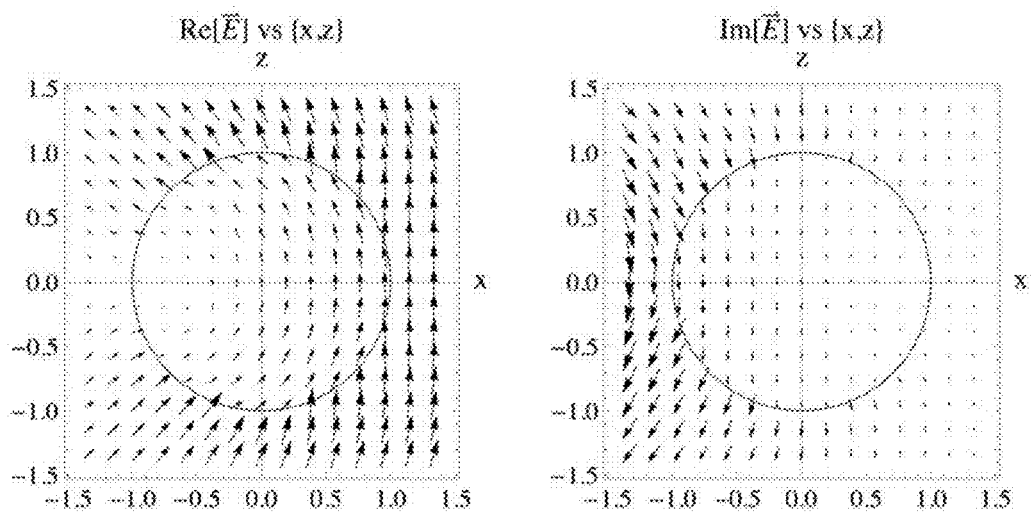
FIG. 49 shows the Real and Imaginary parts of the electric field E in the xz plane.

GraphicsRow[{Show[{VectorPlot[Re[FSolu[{{-3, 0, 0}, 2, {0, 1, 0}}, {x, y, 0}][[2, {1, 2}]]],
{x, -4/3, 4/3}, {y, -4/3, 4/3}, Axes→True, AxesLabel→{"x", "y"},
PlotLabel→"Re[$\vec{B}$]"], ParametricPlot[{Cos [ϕ], Sin [ϕ]},
{ϕ, 0, 2π}]}],
Show[{VectorPlot[Re[FSolu[{{-3, 0, 0}, 2, {0, 1, 0}}, {0, y, z}][[2, {3, 2}]]], {z, 4/3,
-4/3}, {y, -4/3, 4/3}, Axes→True, AxesLabel→{"z", "y"}, PlotLabel→"Re[$\vec{B}$]",
ParametricPlot[{Cos [ϕ], Sin [ϕ]}, {ϕ, 0, 2π}]}],
PlotLabel→"FIG. 47"]//Quiet GraphicsRow[{Show[{VectorPlot[Im[FSolu[{{-3, 0, 0}, 2, {0, 1, 0}}, {x, y, 0}][[2, {1, 2}]]],
{x, -4/3, 4/3}, {y, -4/3, 4/3}, Axes→True, AxesLabel→{"x", "y"},
PlotLabel→"Im[$\vec{B}$]"], ParametricPlot[{Cos [ϕ], Sin [ϕ]},
{ϕ, 0, 2π}]}],
Show[{VectorPlot[Im[FSolu[{{-3, 0, 0}, 2, {0, 1, 0}}, {0, y, z}][[2, {3, 2}]]], {z, 4/3,
-4/3}, {y, -4/3, 4/3}, Axes→True, AxesLabel→{"z", "y"}, PlotLabel→"Im[$\vec{B}$]",
ParametricPlot[{Cos [ϕ], Sin [ϕ]}, {ϕ, 0, 2π}]}],
PlotLabel→"FIG. 48"]//Quiet FIG. 49 shows the Real and Imaginary parts of the electric field E in the xz plane:

GraphicsRow[{Show[{VectorPlot[Re[FSolu[{{-3, 0, 0}, 2, {0, 1, 0}}, {x, 0, z}][[1, {1, 3}]]],
{x, -4/3, 4/3}, {z, -4/3, 4/3}, Axes→True, AxesLabel→{"x", "z"},
PlotLabel→"Re[$\vec{E}$]"], ParametricPlot[{Cos [ϕ], Sin [ϕ]},
{ϕ, 0, 2π}]}],
Show[{VectorPlot[Im[FSolu[{{-3, 0, 0}, 2, {0, 1, 0}}, {x, 0, z}][[1, {1, 3}]]], {x, -4/3,
4/3}, {z, -4/3, 4/3}, Axes→True, AxesLabel→{"x", "z"}, PlotLabel→"Im[$\vec{E}$]",
ParametricPlot[{Cos [ϕ], Sin [ϕ]}, {ϕ, 0, 2π}]}],
PlotLabel→"FIG. 49"]//Quiet All of these look excellent, with all boundary conditions well obeyed. Recall that the permittivity and permeability inside the sphere are 3 $\epsilon_0$ and 5$\mu_0$ (and $\epsilon_0$ and $\mu_0$ outside), so we expect that the normal component of $\vec{E}$ (or of $\epsilon_0 \vec{E}$, as plotted here) will be 3 times larger on the outside of the spherical surface, and the tangential component of $\vec{B}$ (or of $(1/c)\vec{B}/\mu_0$, as plotted here) will be 5 times larger on the inside of the spherical surface.

In the last plots of this section, FIG. 50 below, the magnetic dipole axis is pointed out of the paper (since it is along the y axis). The imaginary part of the E field gets very large near the dipole, and so imaginary E vectors near the dipole are not plotted, resulting in a more intelligible plot. This physical magnetic dipole source is represented as a red dot.

Figure 50:
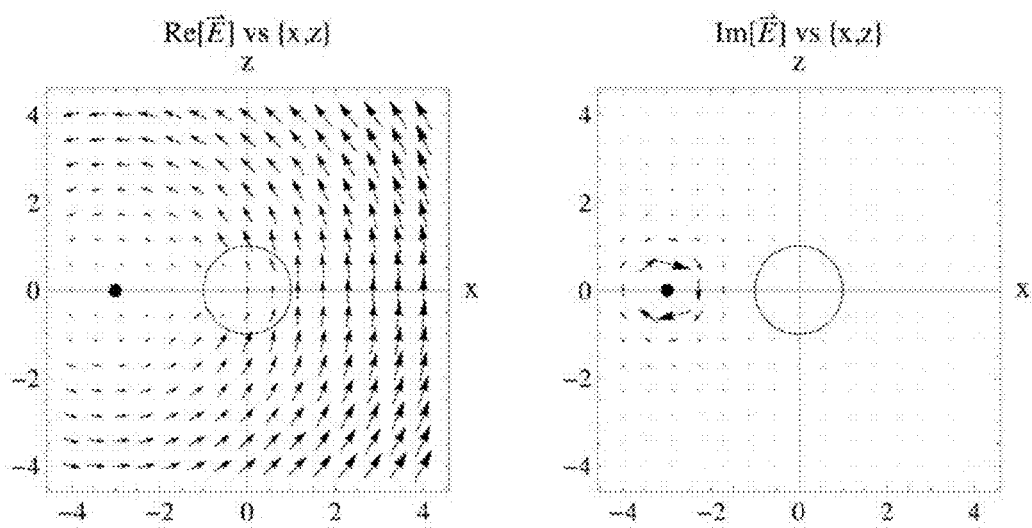
FIG. 50 shows plots in which the magnetic dipole axis is pointed out of the paper (since it is along the y axis).

GraphicsRow[
{Show[VectorPlot[Re[FSolu[{{-3, 0, 0}, 2, {0, 1, 0}}, {x, 0, z}][[1, {1, 3}]]], {x, -4, 4},
{z, -4, 4}, Axes→True, AxesLabel→{"x", "z"}], ParametricPlot[{Cos [ϕ], Sin [ϕ]},
{ϕ, 0, 2π}], Graphics[{Red, PointSize[Medium], Point
[{-3, 0}]}]],
PlotLabel→"Re[$\vec{E}$]", Show[VectorPlot[If[Norm[#]>1/
30, {0, 0}, #]& @
Im[FSolu[{{-3, 0, 0}, 2, {0, 1, 0}}, {x, 0, z}][[1, {1, 3}]]], {x, -4, 4}, {z, −4, 4}, Axes→True, AxesLabel→, {"x", "z"},
   PlotLabel→"Im[$\vec{E}$]"],
ParametricPlot[{Cos [ϕ], Sin [ϕ]}, {ϕ, 0, 2π}],
Graphics [{Red, PointSize[Medium], Point [{−3, 0}]}]]},
   PlotLabel→"FIG. 50"]//Quiet Notes for Development of Algebraic Details and the Numerical Implementation Introduction The notes below are not needed to use and apply the methods of this provisional patent application, but may help to understand the motivation for some aspects of these methods. These notes are not well polished but may still be helpful.

Maxwell's Equation in Empty Space and in Polarizable Media Using Geometric Algebra A summary of important geometric algebra equations used in the derivation of the numerical algorithms of the implementation example is useful, largely because it implicitly defines or at least constrains the meaning of various symbols, and because it gives various factors that depend on the units used (SI units are used here throughout—except for occasionally choosing the unit of time so that c=1).

The most important use of these equations is for the calculation of electromagnetic field F and potential A in each piecewise uniform region of polarizable media. We do this by first calculating $A_m$ and $F_m$ since these may be easily calculated using the greens expressions, then applying the simple linear transform needed to get A and F from $A_m$ and $F_m$. In particular, this is how the potentials within each piecewise uniform region of space are calculated, before appropriate linear combinations are stitched together at the boundaries to make approximately continuous potentials. Details are not given here, but will be clear to anyone skilled in the relevant arts of electrodynamics and geometric algebra.

The same results may alternatively be found using vector algebra, but with more work.

A useful summary follows. I have attempted to avoid sign and other minor errors, but many not have caught all.

spacetime frame vectors: $\gamma_0, \gamma_1, \gamma_2, \gamma_3$, $\gamma_0^2=1$, $\gamma_i^2=-1$ for $i$ from 1 to 3, no implied sum (52)

spacetime reciprocal frame vectors: $\gamma^0, \gamma^1, \gamma^2, \gamma^3$, $\gamma^\alpha \gamma_\alpha = 1$ for α from 0 to 3, no implied sum (53)

space frame vectors for inertial frame associated with $\gamma_0$:

$\vec{\sigma}_1 = \gamma_1\gamma_0, \vec{\sigma}_2 = \gamma_2\gamma_0, \vec{\sigma}_3 = \gamma_3\gamma_0, \vec{\sigma}_i^2 = 1$ (54)

unit pseudoscalar: $\gamma_0\gamma_1\gamma_2\gamma_3 = \gamma_1\gamma_0\gamma_2\gamma_0\gamma_3\gamma_0 = \vec{\sigma}_1\vec{\sigma}_2\vec{\sigma}_3 = III$ (55)

Maxwell in free space (note that I am representing the d'Alembertian operator with $\Box^2$, and using $\Box$ to represent the space-time vector derivative of geometric algebra):

$\Box F = J$ (56)

$\Box = \gamma^\alpha \partial_\alpha = \gamma_0(\gamma_0 \cdot \Box + \gamma_0 \wedge \Box) =$ $\gamma_0(\partial_0 + \gamma_0\gamma^i\partial_i) =$ (57)

$\gamma_0(\partial_0 + \gamma_i\gamma_0\partial_i) = \gamma_0(\partial_0 + \vec{\sigma}_i\partial_i) = \gamma_0\left(\frac{1}{c}\partial_t + \vec{\nabla}\right) = \left(\frac{1}{c}\partial_t + \vec{\nabla}\right)\gamma_0$ -continued $F = \epsilon_0 \vec{E} + III\frac{1}{c}\frac{1}{\mu_0}\vec{B} = \epsilon_0 E^i\vec{\sigma}_i III\frac{1}{c}\frac{1}{\mu_0}B^i\vec{\sigma}_i =$ (58)

$\epsilon_0 E^i\gamma_i\gamma_0 + \frac{1}{c}\frac{1}{\mu_0}\epsilon_i^{j,k}B^i\gamma_j\gamma_k$ $J = \gamma_0\gamma_0 J = \gamma_0(\gamma_0 \cdot J + \gamma_0 \wedge J) = \gamma_0(J \cdot \gamma_0 - J \wedge \gamma_0) = \gamma_0\left(\rho - \frac{1}{c}\vec{J}\right)$ (59)

where {β, $\vec{J}$} is all charge and current density

Maxwell in polarizable medium m with 4-velocity $\gamma_0$:

$\Box_m F_m = J_m$ (60)

$\Box_m = \left(\frac{1}{v_m}\partial_t - \vec{\nabla}\right)\gamma_0$ (61)

$F_m = \epsilon_m \vec{E} + III\frac{1}{v_m}\frac{1}{\mu_m}\vec{B}$ (62)

$J_m = \gamma_0\left(\rho_m - \frac{1}{v_m}\vec{J}_m\right)$ (63)

where {$\rho_m, \vec{J}_m$} is all
   charge and current density that is
   not associated with polarization of the medium $m$ Maxwell in polarizable medium m with 4-velocity $\gamma_0$ written as two multivector equations corresponding directly to the common Gibbs' vector expression of Maxwell using four equations:

$\Box \cdot G = J_f$ (64)

$\Box \wedge F = 0$ (65)

$G = \epsilon_m \vec{E} + III\frac{1}{c}\frac{1}{\mu_m}\vec{B} = \vec{D} + III\frac{1}{c}\vec{H}$ (66)

$J_f = \gamma_0\left(\rho_m - \frac{1}{c}\vec{J}_m\right)$ (67)

where {$\rho_m, \vec{J}_m$} is all charge and current density that
is not associated with polarization of the medium $m$ Potential both in free space and in polarizable media—

$\Box^2 A = J$ (68)

$A = A^\alpha \gamma_\alpha$ (69)

$A = \gamma_0\gamma_0 A = \gamma_0(\gamma_0 \cdot A + \gamma_0 \wedge A) =$ (70)

$\gamma_0(A \cdot \gamma_0 - A \wedge \gamma_0) = \gamma_0\left(\epsilon_0 \phi - \frac{1}{c}\frac{1}{\mu_0}\vec{A}\right) = \left(\epsilon_0 \phi + \frac{1}{c}\frac{1}{\mu_0}\vec{A}\right)\gamma_0$ $F = \Box A = \Box \wedge A$ (71)

Auxiliary or Media Potential, typically defined and used in polarizable media—

$\Box_m^2 A_m = J_m$ (72)

$$A_m = \gamma_0\left(\in_m \phi - \frac{1}{v_m}\frac{1}{\mu_m}\vec{A}\right) = \left(\in_m \phi + \frac{1}{v_m}\frac{1}{\mu_m}\vec{A}\right)\gamma_0 \quad (73)$$

where $\phi$ and $\vec{A}$ are the same as used in A $$F = \Box A = \Box \hat{} A \quad (74)$$

Complex notation, allowed in a specified or implied frame associated with $\gamma_0$—

$$a[\vec{r},t] = a[\vec{r}]Exp[-i\omega t], \omega \geq 0 \quad (75)$$

Greens' functions gw and gm and use of greens functions:

$$-(\nabla^2 + (\omega/c)^2)gw[R] = -\delta[R] \quad (76)$$

$$gw[R] = \frac{-1}{4\pi R}Exp[+ikR] \text{(retarded) with } \omega = Abs[kc] \quad (77)$$

$$\Box gm[R] = -\delta[R] \quad (78)$$

$$gm[R] = (\nabla - i\omega/c)gw[R] = \frac{1}{4\pi R^3}Exp[+ikR](\vec{R}(1-ikR) + i\omega/cR^2) \quad (79)$$

$$A[r'] = \int_{\partial\Omega} gw[r-r']\overline{d\Sigma}A[r] - \int_{\Omega} gw[r-r']d\Omega J[r] \quad (80)$$

$$F[r'] = \int_{\partial\Omega} gm[r-r']\overline{d\Sigma}F[r] - \int_{\Omega} gm[r-r']d\Omega J[r] \quad (81)$$

Signs from Space-Time to Space

It is convenient to summarize signs relating some 4D space-time and 3D space quantities:

$$A = A^\alpha \gamma_\alpha = A_0\gamma_0 + A^i\gamma_i \quad (82)$$

$$A\gamma_0 = A\alpha\gamma_\alpha\gamma_0 = A_0\gamma_0\gamma_0 + A^i\gamma_i\gamma_0 = A^0 + A^i\vec{\sigma}_i \quad (83)$$

$$\Box = \gamma^\alpha \partial_\alpha = \gamma^0 \partial_0 + \gamma^i \partial_i = \gamma_0 \partial_0 - \gamma_i \partial_i \quad (84)$$

$$\Box \gamma_0 = \gamma^\alpha \gamma_0 \partial_\alpha = \gamma^0 \gamma_0 \partial_0 + \gamma^i \gamma_0 \partial_i = \gamma_0 \gamma_0 \partial_0 - \gamma_i \gamma_0 \partial_i = \partial_0 - \vec{\sigma}_i \partial_i \quad (85)$$

Spacetime Splits

We will use complex valued representations of various quantities, in which quantities with space and time dependence are represented as the Real parts of products of one factor with only space dependence and one factor with only the time dependence $Exp[-i\omega t]$.

This representation requires that we first identify a space-time split associated with a time-like frame vector $\gamma_0$. For the position vector (displacement from a reference body) x, we have $$x = x^\alpha \gamma_\alpha = x^0 \gamma_0 + x^i \gamma_i \quad (86)$$

$$x\gamma_0 = x\cdot\gamma_0 + x\wedge\gamma_0 = x^0 + x^i\gamma_i\gamma_0 = x^0 + x^i\vec{\sigma}_i = t + \vec{x} \quad (87)$$

For the potential A, we have $$A\gamma_0 = A\cdot\gamma_0 + A\wedge\gamma_0 = \phi + \vec{A} \quad (88)$$

Time Reversal without Using a Complex Representation

An "active" interpretation of time reversal is used, in which we leave the space and frame and observer unchanged, but change the physical system being observed. Time reversal may also be developed using a passive interpretation, in which the physical system is unchanged but the space, frame, or observer are changed. Either might be used; very important it not to mix them.

This section outlines some basic ideas of time reversal needed to define time reversed charge-current sources and associated potentials and fields, without using a complex number representation of time dependence.

Time reversal is defined with implicit reference to a particular frame and origin as follows.

For a space-time position vector function of proper time $$x[\tau] = \gamma_0 x^0[\tau] + \gamma_i x^i[\tau] \quad (89)$$

the associated time-reversed space-time function is $$x'[\tau] = -\gamma_0 x[-\tau]\gamma_0 = -\gamma_0 x^0[-\tau] + \gamma_i x^i[-\tau] = -\gamma_0 x^0[\tau] + \gamma_i x^i[-\tau] \quad (90)$$

This is equivalent to saying that for a position vector function of time j[t], the associated time-reversed function is $$\vec{x}'[t] = \vec{x}[-t] \quad (91)$$

For a scalar function of time s[t], the associated time-reversed function is $$s'[t] = s[-t] \quad (92)$$

For a velocity vector function of time $\vec{v}[t] = \partial_t \vec{x}[t]$, the associated time-reversed function is $$\vec{v}'[t] = \vec{v}[-t] \quad (93)$$

For a charge-current source function of time $$J[t] = \gamma_0(\rho[t] - \vec{J}[t]) \quad (94)$$

the associated time-reversed function is $$J'[t] = \gamma_0(\rho[-t] + \vec{J}[-t]) \quad (95)$$

For space-time vector derivative $\Box = x^0\partial_0 + x^i\partial_i$, the associated time-reversed space-time vector derivative is unchanged in this active definition of time reversal.

For the wave equation $\Box^2 A = J$, (96)

if $\quad A[t] = \gamma_0(\phi[t] - \vec{A}[t])$ is a solution with $\quad J[t] = \gamma_0(\rho[t] - \vec{J}[t])$ then $\quad A'[t] = \gamma_0(\phi[-t] + \vec{A}[-t])$ is a solution with the time-reversed source $\quad J'[t] = \gamma_0(\rho[-t] + \vec{J}[-t])$.

For the quantity $\quad F = \Box \wedge A$, if $\quad A[t] = \gamma_0(\phi[t] - \vec{A}[t])$, For the wave equation
if
is a solution with
then
is a solution with the
time-reversed source $J'[t] = \gamma_0(\rho[-t] + \vec{J}[-t])$.

For the quantity $F = \Box \hat{} A$, if $A[t] = \gamma_0(\phi[t] - \vec{A}[t])$, then the associated time-revrse quantity is $$F' = \langle \Box\, A' \rangle_2 = \langle \Box\gamma_0\gamma_0 A' \rangle_2 = \langle ((1/c)\partial_t - \vec{\nabla})(\phi[-t] + \vec{A}[-t]) \rangle_2 = \qquad (97)$$

$$\langle (-(1/c)\partial_t - \vec{\nabla})(\phi[t] + \vec{A}[t]) \rangle_2 / \cdot \{t \to -t\} =$$

$$(-\vec{\nabla}\phi[t] - (1/c)\partial_t \vec{A}[t] - \vec{\nabla} \wedge \vec{A}[t]) / \cdot \{t \to -t\} =$$

$$\langle F \rangle_1 - \langle F \rangle_2 / \cdot \{t \to -t\}$$

Complex Representation, Time Reversal, and Divergence of Potential A

When we use a complex number representation of time, we assume a particular space-time split with a particular frame vector $\gamma_0$, and then we factor any function of space-time x, such as the electromagnetic potential A[x], into one factor that depends only on $x\hat{\gamma}_0 = \vec{x}$ and one that depends only on $x \cdot \gamma_0 = t$:

$$\mathcal{A}\,[x] = A[\vec{x}\,]\mathrm{Exp}[-i\omega t] = \gamma_0(\phi[\vec{x}] - \vec{A}[\vec{x}])\mathrm{Exp}[-i\omega t] \qquad (98)$$

We assume that the only the Real part of this is physically significant, but it turns out to be simpler to nevertheless do the math for both Real and Imaginary parts.

With this complex representation, and in a particular frame $\gamma_0$, we have the divergence of the potential $$\Box \cdot \mathcal{A} \;=\; \langle \Box \mathcal{A} \rangle = \langle \Box \gamma_0 \gamma_0 \mathcal{A} \rangle = \qquad (99)$$

$$\langle \Box \gamma_0 \gamma_0 A[\vec{X}]\mathrm{Exp}[-i\omega t] \rangle = \langle (\partial_0 - \vec{\nabla})(\phi[\vec{x}] - \vec{A}[\vec{x}])\mathrm{Exp}[-i\omega t] \rangle =$$

$$\langle (-i\omega - \vec{\nabla})(\phi[\vec{x}])\rangle\mathrm{Exp}[-i\omega t] =$$

$$(-i\omega\phi[\vec{x}] + \vec{\nabla} \cdot \vec{A}[\vec{x}])\mathrm{Exp}[-i\omega t]$$

Define a potential $\mathcal{A}\,'$ in terms of $\mathcal{A}$ by $$\mathcal{A}\,'[x] = \gamma_0(\mathcal{A}\,[-\gamma_0 x \gamma_0])^\dagger \gamma_0 = \gamma_0 A^\dagger[\vec{x}]\gamma_0 \mathrm{Exp}[-i\omega t] = \qquad (100)$$

$$\gamma_0(\phi^*[\vec{x}] + \vec{A}^*[\vec{x}])\mathrm{Exp}[-i\omega t] = A'[\vec{x}]\mathrm{Exp}[-i\omega t]$$

where we have used the definition $$A'[\vec{x}] = \gamma_0 A^\dagger[\vec{x}]\gamma_0 \qquad (101)$$

Then the divergence of $\mathcal{A}\,'$ is $$\Box \cdot \mathcal{A}\,' = (-i\omega\phi^*[\vec{x}] - \vec{\nabla}\cdot\vec{A}^*[\vec{x}])\mathrm{Exp}[-i\omega t] = (i\omega\phi[\vec{x}] - \vec{\nabla}\cdot\vec{A}[\vec{x}])^*\mathrm{Exp}[-i\omega t] \qquad (102)$$

Let the divergence of $\mathcal{A}$ (be called $\mathcal{K} = K\,\mathrm{Exp}[-i\omega t]$ and the divergence of $\mathcal{A}\,'$ be called $\mathcal{K}' = K'\mathrm{Exp}[-i\omega t]$. Then $K' = K^*$; in particular, if $K=0$ then $K'=0$.

Suppose A is written as an integral of a green function g times a source J:

$$\gamma_0 A[\vec{x}'] = -\int g[\vec{x} - \vec{x}'] dv \gamma_0 J[\vec{x}] = -\int g[\vec{x} - \vec{x}'] dv (\rho[\vec{x}] - \vec{J}[\vec{x}]) \qquad (103)$$

Then $$\gamma_0 A'[\vec{x}'] = \gamma_0(\gamma_0 A^*[\vec{x}']\gamma_0) = \qquad (104)$$

$$-\int g^*[x - x'] dv J^*[x]\gamma_0 = -\int g^*[x - x'] dv (\rho[\vec{x}] - \vec{J}^{\,*}[\vec{x}])$$

Since g is scalar, g* also equals $\gamma_0\,g^*\,\gamma_0$ and we have that the potential $A'[\vec{x}]$ due to the time-reversed source J' and the advanced green function is $\gamma_0 A^*\,[\vec{x}]\gamma_0$.

That is, if the potential $A[\vec{x}]$ is due to the source $J[\vec{x}] = \gamma_0(\beta - \vec{J})$ and the retarded Green's functions g, then the potential $A'[\vec{x}] = \gamma_0 A^\dagger[\vec{x}]\gamma_0$ is due to the time-reversed source $J'[\vec{x}] = \gamma_0 J^*[\vec{x}]\gamma_0 = \gamma_0(\rho^* + \vec{J}^*)$ and the advanced Green's function $\gamma_0 g^*\gamma_0$.

Complex Representation, Time Reversal, and Divergence of Field F

Time reversal of scalars like the charge density $\rho$:

$$Re[\rho\mathrm{Exp}[-i\omega t]] \to Re[\rho\mathrm{Exp}[+i\omega t]] = Re[\rho^*\mathrm{Exp}[-i\omega t]] \qquad (105)$$

Time reversal of vector velocities like the 3D current density $\vec{J}$:

$$Re[\vec{J}\mathrm{Exp}[-i\omega t]] \to Re[-\vec{J}\mathrm{Exp}[+i\omega t]] = Re[-\vec{J}^*\mathrm{Exp}[-i\omega t]] \qquad (106)$$

So a source $J = (\rho - \vec{J})\gamma_0$ reverses like $$Re[J\,\mathrm{Exp}[-i\omega t]] \to Re[\gamma_0 J \gamma_0 \mathrm{Exp}[+i\omega t]] = Re[\gamma_0 J^*\gamma_0 \mathrm{Exp}[-i\omega t]] \qquad (107)$$

For example, for an oscillating charge density, $$Re[(\rho - I\omega\vec{\nabla}\rho)\mathrm{Exp}[-i\omega t]] \to Re[\gamma_0(\rho - I\omega\vec{\nabla}\rho)\gamma_0 \mathrm{Exp}[+i\omega t]] = \qquad (108)$$

$$Re[\gamma_0(\rho - I\omega\vec{\nabla}\rho)^*\gamma_0 \mathrm{Exp}[i\omega t]] =$$

$$Re[\gamma_0(\rho^* + I\omega\vec{\nabla}\rho^*)\gamma_0 \mathrm{Exp}[-i\omega t]] = Re[(\rho^* - I\omega\vec{\nabla}\rho^*)\mathrm{Exp}[-i\omega t]].$$

This is as expected: any real charge density as a peak charge density value at t=0, and the charge does the same thing both forward and backward in time.

Also, for an oscillating current like in a current ring, $$Re[\vec{J}\mathrm{Exp}[-i\omega t]] \to Re[\gamma_0 \vec{J}\gamma_0 \mathrm{Exp}[+i\omega t]] = \qquad (109)$$

$$Re[\gamma_0 \vec{J}^*\gamma_0 \mathrm{Exp}[-i\omega t]] = Re[-\vec{J}^*\mathrm{Exp}[-i\omega t]]$$

The time reversed green function for the wave equation may be obtained by conjugation:

$$Re\left[\frac{e^{Ikr}}{4\pi r}(\rho - I\omega\vec{\nabla}\rho)\mathrm{Exp}[-i\omega t]\right] \to \qquad (110)$$

$$Re\left[\frac{e^{Ikr}}{4\pi r}\gamma_0(\rho - I\omega\vec{\nabla}\rho)\gamma_0 \mathrm{Exp}[+i\omega t]\right] =$$

$$Re\left[\gamma_0\left(\frac{e^{Ikr}}{4\pi r}(\rho - I\omega\vec{\nabla}\rho)\right)^*\gamma_0 \mathrm{Exp}[-i\omega t]\right]$$

So the potential A' associated with the time-reversed source is the original potential A transformed in the same way as J, $A' = \gamma_0 A^*\,\gamma_0$.

The time reversed green function for Maxwell's equation is obtained as follows.

From Doran and Lasenby we write the wave equation retarded green function as $$g[\vec{r}] = -\frac{e^{i\omega r}}{4\pi r} \quad (111)$$

and the associated retarded green function for Maxwell as $$G[\vec{r}] = \quad (112)$$
$$(\vec{\nabla} - i\omega)\frac{-e^{i\omega r}}{4\pi r} = \frac{e^{i\omega r}}{4\pi r}\left(\frac{i\omega}{r}(1-\hat{r}) + \frac{\vec{r}}{r^3}\right) = \frac{e^{i\omega r}}{4\pi r^3}(\vec{r}(1-i\omega r) + i\omega r^2)$$

(This G is not related to the often used notation for the electromagnetic field G~D+iII H.)
But more clear for this application of using both retarded and advanced functions would be to write $$g[\vec{r}] = -\frac{e^{ikr}}{4\pi r} \quad (113)$$

and write $|k|=\omega$ so that $$G[\vec{r}] = \quad (114)$$
$$(\vec{\nabla} - i\omega)\frac{-e^{ikr}}{4\pi r} = \frac{e^{ikr}}{4\pi}\left(\frac{i}{r}(\omega - k\hat{r}) + \frac{\vec{r}}{r^3}\right) = \frac{e^{ikr}}{4\pi r^3}(\vec{r}(1-ikr) + i\omega r^2)$$

Then positive k describes retarded (outward propagating) waves and negative k describes advanced (converging) waves.

Time reversal for this may be obtained by replacing k with −k, but leaving ω unchanged. However, instead we write this as follows. We use the following mapping from retarded to advanced green functions, for positive k:

$$\text{Re}\left[\frac{e^{ikr}}{4\pi r^3}(\vec{r}(1-ikr) + i\omega r^2)\text{Exp}[-i\omega t]\right] \to \quad (115)$$
$$\text{Re}\left[\frac{e^{-ikr}}{4\pi r^3}(\vec{r}(1+ikr) + i\omega r^2)\text{Exp}[-i\omega t]\right] =$$
$$\text{Re}\left[-\gamma_0\left(\frac{e^{ikr}}{4\pi r^3}(\vec{r}(1-ikr) + i\omega r^2)\right)^*\gamma_0\text{Exp}[-i\omega t]\right]$$

or $$Re[G[\vec{r}]\text{Exp}[-i\omega t]] \to Re[-\gamma_0 G^*[\vec{r}]\gamma_0\text{Exp}[-i\omega t]] \quad (116)$$

Then the field F due to this advanced green function and a time reversed source goes like the integrand of the green integral:

$$F - \text{Re}[G[\vec{r}]J\text{ Exp}[-i\omega t]] \to \text{Re}[-\gamma_0 G^*[\vec{r}]\gamma_0\gamma_0 J^*\gamma_0\text{Exp}[-i\omega t]] = \quad (117)$$
$$\text{Re}[-\gamma_0(G[\vec{r}]J)^*\gamma_0\text{Exp}[-i\omega t]]$$

The integral of G J is a vector plus bivector electromagnetic field; the integral of $-\gamma_0(G[\vec{r}]J)^*\gamma_0$ may be obtained by taking the conjugate of the first field, and then negating the bivector part.
Summary:
Time reversal of the Maxwell green function G is obtained by $$Re[G[\vec{r}]\text{Exp}[-i\omega t]] \to Re[-\gamma_0 G[\vec{r}]\gamma_0\text{Exp}[+i\omega t]] = Re[-\gamma_0 G^*[\vec{r}]\gamma_0\text{Exp}[-i\omega t]] \quad (118)$$

and the electromagnetic field F due to this advanced green function and a time reversed source goes like $$F - \text{Re}[G[\vec{r}]J[\vec{r}]\text{Exp}[-i\omega t]] \to \text{Re}[-\gamma_0 G\gamma_0\gamma_0 J\gamma_0\text{Exp}[-i\omega t]] = \quad (119)$$
$$\text{Re}[-\gamma_0 G^*[\vec{r}]J^*\gamma_0\text{Exp}[-i\omega t]]$$

This rule says that to calculate the time-reversed field associated with a (not yet time-reversed) source J,
I can calc the non-time-reversed field F~∫G J dω due to J with the normal green function G,
then take the conjugate F*=∫G*J* dΩ of this field,
then take $-\gamma_0 F^*\gamma_0$ (which is equivalent to negating the bivector part).
This is exactly what works well numerically.
And it makes physical sense for waves.
It makes sense for magnetic dipoles: This rule for time-reversed field F is physically consistent with the rule for time-reversed potential A, and consistent with my algebra for the current of a current loop.
Potential and Field of Point Dipoles
This section contains derivations of the field and potential expressions for electric and magnetic dipoles.
Electric Dipole Field F
We take the convention that k may possibly be negative, while the frequency ω=Abs[k]/c is always positive. This corresponds to allow wave-vectors of any direction, but always using the complex number convention that the physical quantity associated with a complex quantity a is Re[a Exp[−iωt]] where ω is positive.

$$J = \rho - \vec{J} = \vec{d}\cdot(-\vec{\nabla}\delta^3[\vec{r}]) - (-i\omega\vec{d}) = \quad (120)$$
$$\vec{d}\cdot(-\vec{\nabla}\delta^3[\vec{r}]) - (-i\text{Abs}[k]\vec{d}) = -\vec{d}\cdot\vec{\nabla}\delta^3[\vec{r}] + i\text{Abs}[k]\vec{d}\delta^3[\vec{r}]$$

$$G[\vec{r}, k] = \quad (121)$$
$$(\vec{\nabla} - i\omega)\frac{e^{ikr}}{4\pi r} = \frac{e^{ikr}}{4\pi}\left(\frac{i(\omega - k\hat{r})}{r} + \frac{\vec{r}}{r^3}\right) = \frac{e^{ikr}}{4\pi r^3}(\vec{r}(1-ikr) + i\omega r^2) =$$
$$\frac{e^{ikr}}{4\pi r^3}(\vec{r}(1-ikr) + i\text{Abs}[k]r^2) = G1 + G0$$

$$G1[\vec{r}, k] = \frac{e^{ikr}}{4\pi r^3}\vec{r}(1-ikr) \quad (122)$$

$$G0[\vec{r}, k] = \frac{e^{ikr}}{4\pi r^3}i\text{Abs}[k]r^2 \quad (123)$$

$$F[\vec{r}'] = \quad (124)$$
$$-\int (G1[\vec{r} - \vec{r}'] + G0[\vec{r} - \vec{r}'])(-\vec{d}\cdot\vec{\nabla}\delta^3[\vec{r}] + i\text{Abs}[k]\vec{d}\delta^3[\vec{r}])|dX| =$$
$$-\int (G1[\vec{r} - \vec{r}'](-\vec{d}\cdot\vec{\nabla}\delta^3[\vec{r}] + i\text{Abs}[k]\vec{d}\delta^3[\vec{r}]) +$$
$$G0[\vec{r} - \vec{r}']i\text{Abs}[k]\vec{d}\delta^3[\vec{r}])|dX| =$$
$$-\int ((-\vec{d}\cdot\vec{\nabla}' G1[\vec{r} - \vec{r}']\delta^3[\vec{r}] + i\text{Abs}[k]G1[\vec{r} - \vec{r}']\vec{d}\delta^3[\vec{r}]) +$$
$$G0[\vec{r} - \vec{r}']i\text{Abs}[k]\vec{d}\delta^3[\vec{r}])|dX| =$$
$$-(-\vec{d}\cdot\vec{\nabla}' G1[-\vec{r}'] + i\text{Abs}\{k\}G1[-\vec{r}']\wedge\vec{d} +$$
$$G0[-\vec{r}']i\text{Abs}[k]\vec{d}) = \vec{d}\cdot\vec{\nabla}' G1[-\vec{r}', k] -$$
$$G0[-\vec{r}', k]i\text{Abs}[k]\vec{d} - i\text{Abs}[k]G1[-\vec{r}', k]\wedge\vec{d} =$$
$$\vec{d}\cdot\vec{\nabla}' G1[-\vec{r}', k] - i\text{Abs}[k]G[-\vec{r}', k]\wedge\vec{d}$$

After substitution of the expressions given for the Green's function G and its vector part G1, and simplification of the derivatives and algebraic product, this gives the expression shown earlier in the numerical implementation section. The same is true for the expressions below.

Magnetic Dipole Field F $$J = \rho - \vec{J} = -(\vec{m} \times (-\vec{\nabla}\delta^3[\vec{r}])) = \vec{m} \times \vec{\nabla}\delta^3[\vec{r}] = -III\vec{m} \wedge \vec{\nabla}\delta^3[\vec{r}] \quad (125)$$

Show that magnetic dipole field is like electric dipole field—

$$F[\vec{r}'] = -\int (G[\vec{r} - \vec{r}'])(-III\vec{m} \wedge \vec{\nabla}\delta^3[\vec{r}])|dX| = \quad (126)$$

$$-(-III)\int (G[\vec{r} - \vec{r}'])(\vec{m}\vec{\nabla}\delta^3[\vec{r}] - \vec{m} \cdot \vec{\nabla}\delta^3[\vec{r}])|dX| =$$

$$III\int (\dot{G}[\vec{r} - \vec{r}'])(-\vec{m}.\vec{\nabla}\delta^3[\vec{r}] - \vec{m} \cdot \vec{\nabla}\delta^3[\vec{r}])|dX| =$$

$$III\int (\dot{G}[\vec{r} - \vec{r}'])(-(-\vec{\nabla}\vec{m} + 2\vec{m} \cdot \dot{\vec{\nabla}})\delta^3[\vec{r}] - \vec{m} \cdot \vec{\nabla}\delta^3[\vec{r}])|dX|$$

Use $(\vec{\nabla} + i\omega)G = \delta$ so $\vec{\nabla}G = \delta - i\omega G$ and since G is scalar plus vector, the reverse is also true $\dot{G}\vec{\nabla} = \delta - i\omega G$ $$F[\vec{r}'] = III\int (\dot{G}[\vec{r} - \vec{r}'])((\dot{\vec{\nabla}}\vec{m} - 2\vec{m} \cdot \dot{\vec{\nabla}})\delta^3[\vec{r}] + \vec{m} \cdot \dot{\vec{\nabla}}\delta^3[\vec{r}])|dX| = \quad (127)$$

$$III\int \dot{G}[\vec{r} - \vec{r}'](\dot{\vec{\nabla}}\vec{m} - \vec{m} \cdot \dot{\vec{\nabla}})\delta^3[\vec{r}]|dX| =$$

$$III\int (\dot{\vec{\nabla}}\dot{G}[\vec{r} - \vec{r}']\vec{m} - \vec{m} \cdot \dot{\vec{\nabla}}\dot{G}[\vec{r} - \vec{r}'])\delta^3[\vec{r}]|dX| =$$

$$III\int (-i\omega G[\vec{r} - \vec{r}']\vec{m} - \vec{m} \cdot \dot{\vec{\nabla}}\dot{G}[\vec{r} - \vec{r}'])\delta^3[\vec{r}]|dX| =$$

$$III\int (-i\omega G[\vec{r} - \vec{r}'] \wedge \vec{m} + \vec{m} \cdot \vec{\nabla}' G[\vec{r} - \vec{r}'])\delta^3[\vec{r}]|dX| =$$

$$III(-i\text{Abs}[k]G[-\vec{r}', k] \wedge \vec{m} + \vec{m} \cdot \vec{\nabla}' G[\vec{r}', k])$$

So we have that the field of a magnetic dipole m equals III times the field of an electric dipole m.

Electric Dipole Potential a $$J = \rho - \vec{J} = \vec{d} \cdot (-\vec{\nabla}\delta^3[\vec{r}]) - (-i\omega \vec{d}) = \quad (128)$$
$$\vec{d} \cdot (-\vec{\nabla}\delta^3[\vec{r}]) - (-i\text{Abs}[k]\vec{d}) = -\vec{d} \cdot \vec{\nabla}\delta^3[\vec{r}] + i\text{Abs}[k]\vec{d}\delta^3[\vec{r}]$$

$$Gw[\vec{r}] = \frac{e^{ikr}}{4\pi r} \quad (129)$$

$$A[\vec{r}'] = -\int (Gw[\vec{r} - \vec{r}'])(-\vec{d} \cdot \vec{\nabla}\delta^3[\vec{r}] + i\text{Abs}[k]\vec{d}\delta^3[\vec{r}])|dX| = \quad (130)$$

$$-\int (-\vec{d} \cdot \vec{\nabla}' Gw[\vec{r} - \vec{r}']\delta^3[\vec{r}] + i\text{Abs}[k]Gw[\vec{r} - \vec{r}']\vec{d}\delta^3[\vec{r}])|dX| =$$

$$\vec{d} \cdot \vec{\nabla}' Gw[-\vec{r}'] - i\text{Abs}[k]Gw[-\vec{r}']\vec{d}.$$

Magnetic Dipole Potential A

I do not know of a simple relationship between the magnetic potential and electric potential, so I just work out the magnetic potential A. Since the wave green function Gw is scalar, this is simple:

$$J = \rho - \vec{J} = -(\vec{m} \times (-\vec{\nabla}\delta^3[\vec{r}])) = \vec{m} \times \vec{\nabla}\delta^3[\vec{r}] = -III\vec{m} \wedge \vec{\nabla}\delta^3[\vec{r}] \quad (131)$$

$$Gw[\vec{r}] = -\frac{e^{ikr}}{4\pi r} \quad (132)$$

$$A[\vec{r}'] = -\int (Gw[\vec{r} - \vec{r}'])(-III\vec{m} \wedge \vec{\nabla}\delta^3[\vec{r}])|dX| = \quad (133)$$

$$-\int (\dot{G}w[\vec{r} - \vec{r}'])(-III\vec{m} \wedge \dot{\vec{\nabla}}'\delta^3[\vec{r}])|dX| =$$

$$III\int \vec{m} \wedge \dot{\vec{\nabla}}' \dot{G}w[\vec{r} - \vec{r}']\delta^3[\vec{r}]|dX| =$$

$$III\vec{m} \wedge \vec{\nabla}' Gw[-\vec{r}'] = -\vec{m} \times \vec{\nabla}' Gw[-\vec{r}', k])$$

Boundary Matching Theory

The potential A has four components but is constrained to have zero divergence, so it has three degrees of freedom. Suppose for example these are chosen to be the three spatial components (i.e., the part perpendicular to $\gamma_0$). Then if these three components are given on the boundary of a region, they determine these three components everywhere in the region, and the Lorenz condition (zero space-time divergence) determines the fourth component at every point.

Now consider the same boundary and the same specification of $A\hat{}\gamma_0\gamma_0$ on the boundary, but now use these to determine A on the other side of the boundary. If the perm is different, then the value of $A \cdot \gamma_0\gamma_0$ off the boundary will be different compared with if the perm were the same. In particular, right at the surface, the normal derivative of $A \cdot n$ will generally be different from what it would be if the perm were the same as on the other side, while the tangential derivatives of the tangential part of $A \cdot \gamma_0\gamma_0$ will be the same; so by the Lorenz condition, the scalar potential will not be the same on the two sides of the boundary.

That is, if we specify 3 degrees of freedom of A on a boundary, and then find the associated A everywhere, the unspecified degree of freedom will generally be discontinuous at the boundary. With foresight, we choose these 3 degrees of freedom to be the scalar potential $\phi = A \cdot \gamma_0$ and the space vector part $\vec{A}_T = \vec{A} \cdot \vec{\sigma}_3 \vec{\sigma}_3 = (A \cdot \gamma_0\gamma_0)\hat{}(\gamma_3\gamma_0)(\gamma_3\gamma_0)$ that is tangential to the boundary with normal $\vec{\sigma}_3 = \gamma_3\gamma_0$. Then we might attempt to match only these 3 degrees of freedom at the boundary.

The second major step in the method of least action, after finding a suitable substantially continuous parameterized potential, is to satisfy the equation for extremizing the action, which is the integral over the boundary of $$A * (\gamma_3 \cdot \Delta G) = \quad (134)$$

$$\langle A\gamma_3\Delta G \rangle = -\langle A\gamma_0\gamma_3\gamma_0\Delta G \rangle = -\langle (\phi + \vec{A})(\vec{\sigma}_3(\Delta\vec{D}) + III(1/c)\Delta\vec{H})\rangle =$$

$$-\langle (\phi + \vec{A})(\vec{\sigma}_3 \cdot \Delta\vec{D} + III(1/c)\vec{\sigma}_3 \wedge \Delta\vec{H})\rangle =$$

$$-\langle \phi\vec{\sigma}_3 \cdot \Delta\vec{D} + III(1/c)\vec{A} \wedge \vec{\sigma}_3 \wedge \Delta\vec{H}\rangle =$$

$$-\langle \phi\vec{\sigma}_3 \cdot \Delta\vec{D} - (1/c)\vec{A} \cdot \vec{\sigma}_3 \times \Delta\vec{H}\rangle =$$

$$-\langle \phi\vec{\sigma}_3 \cdot \Delta\vec{D} - (1/c)\vec{A} \times \vec{\sigma}_3 \cdot \Delta\vec{H}\rangle$$

We see that we only need $\phi$ and the tangential part $\vec{A}\hat{}\vec{\sigma}_3$ $\vec{\sigma}_3$ of $\vec{A}$ here, and therefore only this part needs to be well defined and therefore made continuous across the boundary in the previous step. This justifies the procedure of matching only the 3 degrees of freedom in A at the boundary as described above.

The normal part of the vector potential, $\vec{A} \cdot \vec{\sigma}_3$, will become continuous at the boundary in the final solution. "God may be subtle but he is not malicious."

The invention claimed is:

1. A machine implemented method comprising:
iteratively solving, by a machine having a processor system including one or more processors and a memory system including a memory system having at least one or more nontransient-machine readable media, a set of equations, each equation being a result of taking a derivative of an action integral, which is an integral of a Lagrangian with respect to time, the derivate of the action integral being a derivative with respect to a parameter of a Lagrangian density associated with the Lagrangian, the Lagrangian density has a dependence on the parameters, each parameter of the Lagrangian density being part of a set of parameters of a parameterized potential function, the dependence of the Lagrangian density on the set of parameters being that of a representation of the Lagrangian density in terms of the potential function;
prior to the iteratively solving, the set of parameters include parameters that have values that are not known;
the iteratively solving of the set of equations determines solution values for the parameters;
computing, by the processor system, a value representative of an error associated with a current iteration of the iteratively solving; and
if the value representative of the error for the current iteration is on an opposite side of a predetermined threshold compared to the value representative of the error for a prior iteration, ending the iteratively solving.

2. The machine implemented method of claim 1, the potential being a linear function of the parameters, the linear function includes at least a sum of products, each product being one parameter of the set of parameters multiplied by a potential basis function of a set of basis functions.

3. The machine implemented method of claim 1 the electromagnetic displacement field and magnetic field of the Lagrangian density are equal to or approximated by a linear function of the potential function.

4. The machine implemented method of claim 1, each equation is expressed as a sum of integrals over regions and integrals over the boundaries of these regions, integrands of the integrals of the sum of products of the potential basis functions and do not include any derivatives of the potential basis function.

5. The machine implemented method of claim 1, an inertial frame for the equations is chosen that is at rest with respect to all polarizable media of the action integral.

6. The machine implemented method of claim 5, time variations of electromagnetic potentials, fields, and charge and current densities are approximated as varying harmonically with time; and
electrical conductivity is represented as having a complex permittivity.

7. The machine implemented method of claim 6, the potential is parameterized as a linear function of the parameters and equal to a sum of parameters multiplied by basis functions plus one non-parameterized basis function, the set of basis functions including two types of basis functions
each of a first the two types of basis functions being chosen to be zero at all boundary points of any boundary including an electrical conductor where the basis function of the first type is defined, or
each of a second the two types of basis functions being chosen to be zero at all boundary points of a boundary not including an electrical conductor basis function of the second type is defined basis function of the first type are multiplied by the frequency before computing a numerical solution to the equations, to cancel factors of frequency in numerators.

8. The machine implemented method of claim 4, the parameterized potential is chosen so that for any parameter values, one or more of the volume integrals are equal to zero or having a magnitude that is less than a predetermined threshold, resulting in correspondingly reduced computational demands.

9. The machine implemented method of claim 2, one or more basis function being defined and calculated within one or more regions as a solution to Maxwell's equations in a fictitious auxiliary space using a fictitious virtual charge-current sources.

10. The machine implemented method of claim 2, one or more regions are simplices and the parameterized potential in each simplex is a polynomial function of position.

11. The machine implemented method of claim 10, the polynomial function of position is a linear function of position.

12. The machine implemented method of claim 1, one of the two basis functions being a basis function of a field and another of the two basis functions being a basis function of potential, the integration including at least integrating a product of the basis function of the field and the basis function of the potential.

13. The machine implemented method of claim 12, the basis function of the potential extremizing of the action, within a predetermined tolerance, in an interior portion of a computation cell regardless of what value is assigned to the unknown parameters.

14. The machine implemented method of claim 12, the field being the displacement field, and the method comprising multiplying basis functions of the displacement field, that are associated with computation cells including a conductor, by a variable representing an angular frequency, while not multiplying basis functions of the displaced field, that are associated with computation cells not having a conductor, by the variable representing the angular frequency.

15. The machine implemented method of claim 1, in a first computation cell having a current, placing a fictitious charge on one or more boundaries of the computation cell sufficient to create the current; and
on each boundary having the fictitious charge, placing another fictitious charge of opposite polarity in an adjacent computation cell that cancels the charge of the boundary in the first computation cell.

16. The machine implemented method of claim 1, choosing a first set of basis functions that are nonzero at boundaries between computation cells that have a conductor are zero at boundaries not having conductors; and
choosing a second set of basis functions that are nonzero at boundaries between computation cells that do not having a conductor are zero at boundaries having conductors, therein decoupling computations of the unknown parameters that are coefficients of basis functions that are nonzero at boundaries that have conductors and basis functions that are nonzero at boundaries that do not have conductors.

17. The machine implemented method of claim 1, further comprising:
computing a first difference, which is a difference of at least scalar potential associated with an interior of a computation cell evaluated at a boundary between two computation cells and a scalar potential associated with the boundary evaluated at the boundary;
squaring the first different;

computing a second difference, which is a difference of at least vector potential associated with an interior of a computation cell evaluated at a boundary between two computation cells and a vector potential associated with the boundary evaluated at the boundary;

squaring the second difference;

computing a component of the second difference that is perpendicular to the boundary;

squaring the component;

subtracting results of the squaring of the component from results of the squaring of the second difference;

combining results of the subtracting and the results of squaring the first difference;

presenting a value resulting from the combining of the results as a measure of an accuracy of the solution values.

18. The machine implemented method of claim 17, the solving being performed by iteratively computing new values of the unknown parameters that are expected to be values of the unknown parameters that result in a new value of the value representative of the error that represents less error than in a prior iteration, the method further comprising:

if the value resulting from the combining is less than a predetermined tolerance, terminating solving; and if the value resulting from the combining is a value that is greater than the predetermined tolerance, performing at least another iterative improvement of the unknown parameters.

19. The machine implemented method of claim 1, the solving including solving $$\sum_{j \neq 0} \int (\phi_i \hat{n} \cdot \Delta \vec{d}_j - \vec{a}_i \cdot \hat{n} \times \Delta \vec{h}_j) dVc_j =$$

$$- \int \left( (\phi_i \hat{n} \cdot \Delta \vec{d}_0 - \sigma) - \vec{a}_i \cdot (\hat{n} \times \Delta \vec{h}_0 - \vec{K}) \right) dVc_0,$$

where $\Sigma_{j \neq 0}$ indicates to perform a summation over all values of indices j except j=0, $\int$ indicates to perform an integration, $\Phi_i$ is the ith scalar potential basis function $\hat{n}$ is a unit vector normal to a boundary of computation cell $\Delta \vec{d}_j$ is a difference between the jth displacement basis function on a first side of the boundary and the jth displacement basis function on a second side of the boundary, the jth displacement basis function on the first side of the boundary being a displacement vector resulting from the jth scalar potential basis function and vector potential basis function on the first side of the boundary, and the jth displacement basis function on the second side of the boundary being a displacement vector resulting from the jth scalar potential basis function and vector potential basis function on the second side of the boundary, $\vec{a}_i$ is an ith vector potential basis function, $\Delta \vec{h}_j$ is a difference between the jth magnetic intensity basis function on the first side of the boundary and the jth magnetic intensity basis function on the second side of the boundary, is a difference between the jth displacement basis function on one side of the boundary and the jth displacement basis function on another side of the boundary, the jth magnetic intensity basis function on the first side of the boundary being a magnetic intensity vector resulting from the jth vector potential basis function on the first side of the boundary, and the jth magnetic intensity basis function on the second side of the boundary being a magnetic intensity vector resulting from the jth vector potential basis function on the second side of the boundary, dV indicates that the integration is over the boundary of the computation cell;

$c_j$ are the unknown parameters that are being solved for, $\Delta \vec{d}_0$ is a difference between the $0^{th}$ displacement basis function on one side of the boundary and the $0^{th}$ displacement basis function on another side of the boundary, the $0^{th}$ displacement basis function is a displacement function with a coefficient that has a known value, $\Delta \vec{h}_0$ is a difference between the $0^{th}$ magnetic intensity basis function on one side of the boundary and the $0^{th}$ magnetic intensity basis function on another side of the boundary, the $0^{th}$ magnetic intensity basis function is a basis function with a known coefficient $\vec{K}$ is the surface charge density, $c_0$ is the coefficient that has the known value;

an elements of the array having indices i and j, being equal to $\int (\Phi_i \hat{n} \cdot \Delta \vec{d}_j - \vec{a}_i \cdot \hat{n} \times \Delta \vec{h}_j) dV$; and an ith element of the result values being $-\int (\Phi_i (\hat{n} \cdot \Delta \vec{d}_0 - \sigma) - \vec{a}_i \cdot (\hat{n} \times \Delta \vec{h}_0 - \vec{K})) dVc_0$.

\* \* \* \* \*